US011387484B2

(12) United States Patent
Kawakami et al.

(10) Patent No.: US 11,387,484 B2
(45) Date of Patent: *Jul. 12, 2022

(54) METHOD FOR PRODUCING LITHIUM FLUOROSULFONATE, LITHIUM FLUOROSULFONATE, NONAQUEOUS ELECTROLYTIC SOLUTION, AND NONAQUEOUS ELECTROLYTIC SOLUTION SECONDARY BATTERY

(71) Applicants: MITSUBISHI CHEMICAL CORPORATION, Chiyoda-ku (JP); MU IONIC SOLUTIONS CORPORATION, Chiyoda-ku (JP)

(72) Inventors: Daisuke Kawakami, Kanagawa (JP); Ryo Yamaguchi, Kanagawa (JP); Hiroyuki Tokuda, Ibaraki (JP); Masahiro Takehara, Kanagawa (JP)

(73) Assignees: Mitsubishi Chemical Corporation, Chiyoda-ku (JP); MU IONIC SOLUTIONS CORPORATION, Chiyoda-ku (JP)

( * ) Notice: Subject to any disclaimer, the term of this patent is extended or adjusted under 35 U.S.C. 154(b) by 220 days.

This patent is subject to a terminal disclaimer.

(21) Appl. No.: 16/690,729

(22) Filed: Nov. 21, 2019

(65) Prior Publication Data
US 2020/0106121 A1    Apr. 2, 2020

Related U.S. Application Data

(63) Continuation of application No. 14/051,883, filed on Oct. 11, 2013, now Pat. No. 10,530,008, which is a continuation of application No. PCT/JP2012/059816, filed on Apr. 10, 2012.

(30) Foreign Application Priority Data

Apr. 11, 2011   (JP) ................... 2011-087281
Apr. 13, 2011   (JP) ................... 2011-089341
Apr. 19, 2011   (JP) ................... 2011-093001

(51) Int. Cl.
*H01M 10/056*    (2010.01)
*H01M 10/0525*   (2010.01)
*H01M 10/0568*   (2010.01)
*H01M 10/0567*   (2010.01)
*H01M 10/0569*   (2010.01)
*C01D 15/04*     (2006.01)

(52) U.S. Cl.
CPC .......... *H01M 10/056* (2013.01); *C01D 15/04* (2013.01); *H01M 10/0525* (2013.01); *H01M 10/0567* (2013.01); *H01M 10/0568* (2013.01); *H01M 10/0569* (2013.01); *H01M 2300/0025* (2013.01)

(58) Field of Classification Search
CPC . H01M 10/056; H01M 10/0566–0569; H01M 10/0525; H01M 2300/0025–0042; C01D 15/04
See application file for complete search history.

(56) References Cited

U.S. PATENT DOCUMENTS

| | | |
|---|---|---|
| 5,797,144 A | 8/1998 | Ciccone |
| 6,013,394 A | 1/2000 | Gan et al. |
| 6,180,283 B1 | 1/2001 | Gan et al. |
| 6,265,106 B1 | 7/2001 | Gan et al. |
| 6,350,546 B1 | 2/2002 | Gan et al. |
| 6,555,078 B1 | 4/2003 | Mehta |
| 6,656,641 B1 | 12/2003 | Kumar |
| 2001/0006751 A1 | 7/2001 | Gan et al. |
| 2002/0102466 A1 | 8/2002 | Hwang et al. |
| 2008/0254358 A1 | 10/2008 | Takase et al. |
| 2008/0318131 A1 | 12/2008 | Watanabe et al. |
| 2010/0183917 A1 | 7/2010 | Holzapfel et al. |
| 2010/0209757 A1 | 8/2010 | Ooyama et al. |
| 2012/0009486 A1 | 1/2012 | Hayakawa et al. |
| 2012/0014859 A1 | 1/2012 | Honda et al. |
| 2012/0308881 A1 | 12/2012 | Tokuda et al. |
| 2013/0280622 A1 | 10/2013 | Tokuda et al. |
| 2014/0037529 A1 | 2/2014 | Tsunetoshi et al. |
| 2014/0038062 A1 | 2/2014 | Kawakami et al. |
| 2015/0311566 A1 | 10/2015 | Hayakawa et al. |

FOREIGN PATENT DOCUMENTS

| | | |
|---|---|---|
| CA | 1790780 | 6/2006 |
| CN | 1335652 | 2/2002 |
| CN | 1335653 | 2/2002 |
| CN | 1450684 A | 10/2003 |
| CN | 101084595 | 12/2007 |
| CN | 101207208 | 6/2008 |
| CN | 101310408 | 11/2008 |
| DE | 1 010 503 B | 6/1957 |
| DE | 101 07 384 | 9/2002 |
| JP | 55-144663 | 11/1980 |
| JP | 61-252619 A | 11/1986 |

(Continued)

OTHER PUBLICATIONS

Office Action dated Jul. 24, 2014, in Chinese Patent Application No. 201280018004.1, filed Apr. 10, 2012 (with English Translation).
European Search Report dated Sep. 22, 2014, in Application No. 12771049, filed Apr. 10, 2012.
Office Action dated Apr. 10, 2015 in Chinese Patent Application No. 201280018004.1 (with English language translation).
Combined Office Action and Search Report dated Nov. 4, 2015 in Chinese Patent Application No. 201510042344.3 (with English translation and English translation of category of cited Documents).
Information Offer Form issued Feb. 1, 2017 in Japanese Patent Application No. 2016-23960 (with English translation).

(Continued)

*Primary Examiner* — Eugenia Wang
(74) *Attorney, Agent, or Firm* — Oblon, McClelland, Maier & Neustadt, L.L.P.

(57) ABSTRACT

A nonaqueous electrolytic solution that includes lithium fluorosulfonate and a sulfate ion in an amount of from $1.0 \times 10^{-7}$ mol/L to $1.0 \times 10^{-2}$ mol/L.

20 Claims, No Drawings

(56) References Cited

FOREIGN PATENT DOCUMENTS

| | | | |
|---|---|---|---|
| JP | 7-296849 A | 11/1995 | |
| JP | 10-144348 A | 5/1998 | |
| JP | 2003-192661 | 7/2003 | |
| JP | 2005-209411 A | 8/2005 | |
| JP | 2008-091196 A | 4/2008 | |
| JP | 2008-544457 A | 12/2008 | |
| JP | 2009-187814 A | 8/2009 | |
| JP | 2009-269810 A | 11/2009 | |
| JP | 2010-192200 A | 9/2010 | |
| JP | 2010-225498 A | 10/2010 | |
| JP | 2010-225522 A | 10/2010 | |
| JP | 2010-254543 A | 11/2010 | |
| JP | 2012-218985 A | 11/2012 | |
| KR | 2001-0057562 A | 7/2001 | |
| KR | 2008-0114524 A | 12/2008 | |
| KR | 2012-230897 A | 11/2012 | |
| SU | 223070 | 8/1968 | |
| WO | 96-27908 | 9/1996 | |
| WO | WO 98/13297 A1 | 4/1998 | |
| WO | WO 2010/110159 A1 | 9/2010 | |
| WO | 2010/113483 | 10/2010 | |
| WO | WO 2011/021644 A1 | 2/2011 | |
| WO | 2011/099585 | 8/2011 | |
| WO | WO 2012/141180 A1 | 10/2012 | |

OTHER PUBLICATIONS

"Wako Pure Chemical Jiho", Wako Pure Chemical Industries, Ltd., vol. 79, No. 4, Oct. 15, 2011 (with partial English translation).

Combined Chinese Office Action and Search Report dated Feb. 27, 2017 in Patent Application No. 201510359045.2 (with partial English translation and English translation of categories of cited documents).

Office Action dated Jul. 3, 2017 in European Patent Application No. 12771049.9.

International Search Report dated Jul. 17, 2012 in PCT/JP2012/059816 (with English language translation).

Notification of Reasons for Refusal dated Jun. 23, 2015 in Japanese Patent Application No. 2011-087281 (with English language translation).

Wilhelm Traube, et al., "Über Fluor sulfonsäure, Fluor-sulfonate und Sulfurylfluorid" Berichte der Deutschen Chemischen Gesellshaft, 1919, pp. 1272-1285 (with partial English language translation).

Darryl D. Des Marteau, et al., "A New Method for the Preparation of Fluorodisulfate Salts" Inorganic Chemistry, vol. 6, No. 2, Feb. 1967, pp. 416-417.

B.S. Suresh, et al., "A study on the reaction of silicon tetrahalides with phosphorus pentoxide and of alkali metal fluorosilicates with phosphorus pentoxide and sulphur trioxide" Journal of Fluorine Chemistry, vol. 24, 1984, pp. 399-407.

D.K. Padma, et al., "Displacement of Lewis acid gases—$PF_5$, $BF_3$ and $SiF_4$ from their ammonium, alkali metal and pyridinium fluorocomplexes by sulphur trioxide at room temperature" Synthesis and Reactivity in Inorganic and Metal-Organic Chemistry, vol. 22, No. 10, 1992, pp. 1533-1549.

A. A. Woolf, "Fluorosulphuric Acid. Part IV. Preparation of Fluorosulphates of the First Transition Series by Displacement Reactions" Journal of the Chemical Society (A), 1967, pp. 355-358.

Office Action dated Jan. 12, 2016 in Japanese Patent Application No. 2012-092111 (with unedited computer generated English language translation).

Office Action dated Oct. 18, 2016 in Japanese Patent Application No. 2016-023960 (with English translation).

Combined Chinese Office Action and Search Report dated Jan. 10, 2017 in Patent Application No. 201510042344.3 (with English language translation).

Combined Office Action and Search Report dated Nov. 16, 2017 in Chinese Patent Application No. 201611010842.0 with partial unedited computer generated English translation and English translation of categories of cited documents.

Office Action dated Oct. 25, 2017 in Chinese Patent Application No. 201510359045.2 with unedited computer generated English translation.

Japanese Office Action (Notice of Reasons for Revocation) dated Apr. 27, 2018, in Japanese Patent No. 6128242 (Opposition No. 2017-701072) with its English Translation.

Chinese Office Action dated Jul. 5, 2018, in Chinese Patent Application No. 201611010842.0 (with English Translation).

European Third Party Observation dated Jul. 27, 2018, in European Patent Application No. 12771049.9.

Electrolyte Solution, Product Data Sheet (TARGRAY).

Liao Hongying, et al., Industrial Forum of Advanced Materials, Mo. 118, p. 34-37 (Sep. 2003).

Korean Office Action dated Aug. 15, 2018, in Korean Patent Application No. 10-2013-7026743 (with English Translation).

Korean Office Action dated Feb. 22, 2018, in Korean Patent Application No. 10-2013-7026743 (with English Machine Translation).

Notice of Opposition dated Dec. 4, 2017, in Japanese Patent No. 6,128,242 (Opposition No. 2017-701072) (with English Translation).

Sirenko et al., Russian Journal of Electrochemistry, Aprotic Electrolytes Containing Lithium Fluorosulfonate, vol. 35, No. 10, 1999, pp. 1133-1136.

Third Party Observation submitted on Aug. 9, 2018, in the corresponding Korean Patent Application No. 2013-7026743 with English Translation.

Korean Office Action (Notice of Final Rejection) dated Nov. 9, 2018, in Korean Patent Application No. 10-2013-7026743 (with English Machine Translation).

Chinese Office Action dated Jan. 3, 2019, in Chinese Patent Application No. 201611010842.0 (with English Machine Translation).

Korean Office Action dated Apr. 9, 2019, in Korean Patent Application No. 10-2019-7003689 (with English Translation).

Japanese Information Statement dated Apr. 9, 2019, in Japanese Patent Application No. 2018-138133 (with English Translation).

Chinese Office Action dated May 22, 2019, in Chinese Patent Application No. 201611010842.0 (with English Translation).

Extended European Search Report dated Jan. 20, 2021 in European Patent Application No. 20202523.5, 7 pages.

Combined Chinese Office Action and Search Report dated Nov. 15, 2019 in Patent Application No. 201810295231.8 (with partial unedited computer generated English translation and English translation of categories of cited documents) 20 pages.

European Office Action dated Dec. 4, 2019 in European Patent Application No. 12771049.9, 6 pages.

Korean Office Action dated Feb. 25, 2021 in Korean Patent Application No. 10-2020-7035876 (with unedited computer generated English translation), citing document AO therein, 9 pages.

Korean Office Action dated Apr. 14, 2020 in Patent Application No. 10-2020-7002293 (with English translation), citing document AO therein, 11 pages.

Korean Office Action dated Apr. 14, 2020 in Patent Application No. 10-2020-7002296 (with English translation), 13 pages.

Office Action dated Oct. 25, 2021 in corresponding Korean Patent Application No. 10-2021-7033177 (with English Translation), 8 pages.

Office Action as received in the corresponding CN patent application No. 202010371692.6 dated Mar. 2, 2022 w/English Translation, citing AW, 12 pages.

METHOD FOR PRODUCING LITHIUM FLUOROSULFONATE, LITHIUM FLUOROSULFONATE, NONAQUEOUS ELECTROLYTIC SOLUTION, AND NONAQUEOUS ELECTROLYTIC SOLUTION SECONDARY BATTERY

CROSS-REFERENCE TO RELATED APPLICATIONS

This application is a continuation of U.S. patent application Ser. No. 14/051,883, filed on Oct. 11, 2013 which is a continuation of International Patent Application No. PCT/JP2012/059816, filed on Apr. 10, 2012, the disclosures of which are incorporated herein by reference in their entireties. This application claims priority to Japanese Application Nos. 2011-093001, filed on Apr. 19, 2011, 2011-089341, filed on Apr. 13, 2011, and 2011-087281, filed on Apr. 11, 2011, the disclosures of which are incorporated herein by reference in their entireties.

TECHNICAL FIELD

The present invention relates to a method for producing lithium fluorosulfonate, and to lithium fluorosulfonate. Precisely, the present invention relates to a method for producing lithium fluorosulfonate which comprises reacting a lithium halide and fluorosulfonic acid in a nonaqueous solvent, and to lithium fluorosulfonate. Further, the present invention relates to a nonaqueous electrolytic solution containing lithium fluorosulfonate, and to a nonaqueous electrolytic solution secondary battery.

BACKGROUND ART

Nonaqueous electrolytic solution secondary batteries such as lithium secondary batteries and the like are being put into practical use in broad applications covering so-called civilian applications for notebook-size personal computers and others as well as in-vehicle power sources for driving for automobiles and others and large-scale stationary power sources, etc. However, the recent requirements for technical advantages of nonaqueous electrolytic solution secondary batteries are being much higher and higher, and it is now desired to attain high-level battery characteristics such as high capacity, high output power, high-temperature storage stability, cycle characteristics, etc.

In particular, in case where lithium secondary batteries are used as a power source for electric vehicles, the lithium secondary batteries are required to have high output characteristics and input characteristics since electric vehicles need large energy at startup and acceleration and must efficiently regenerate the large energy generated during deceleration. In addition, since electric vehicles are used outdoors, in particular, lithium secondary batteries are further required to have high input-output characteristics (that is, the internal impedance of the batteries is low) at a low temperature of −30° C. or so, in order that such electric vehicles can be rapidly started up and accelerated even in cold months. Furthermore, even in repeated charge/discharge in high-temperature environments, the capacity reduction must be small and the internal impedance increase must be small.

Not limited to use for electric vehicles, in addition, in case where lithium secondary batteries are used also for various backup applications as well as for large-scale stationary power sources, for example, for power supply load leveling application, natural energy generation output stabilization application or the like, not only electric cells are large-sized but also a large number of electric cells are connected in series-parallel combination. Consequently, there may occur various problems of reliability and safety to be caused by various types of non-uniformity including fluctuation of discharge characteristics of individual cells, temperature fluctuation between different cells and fluctuation of capacity and charge state of individual cells. When cell planning and management are unsuitable, then there may occur some problems in that a part of cells that constitute an assembled battery may be kept in a highly-charged state or some cells may be kept in a high temperature owing to increase in the internal temperature thereof.

Specifically, current nonaqueous electrolytic solution secondary batteries are required to satisfy various requirements at an extremely high level that the initial capacity and input-output characteristics must be high, the internal impedance must be low, the capacity retention rate after durability tests such as high-temperature storage test and cycle test must be high and the input-output characteristics and the impedance characteristics must be kept excellent even after durability tests.

Heretofore, as a means for improving the characteristics of nonaqueous electrolytic solution secondary batteries, various techniques have been investigated. For example, Patent Document 1 says that using lithium fluorosulfonate as an electrolyte brings about a battery having a high discharge capacity in 60° C. charge/discharge cycle evaluation. According to Patent Document 1, when $LiClO_4$ is used as the electrolyte, $LiClO_4$ is decomposed owing to the electropositive potential of the positive electrode active material in the battery to form active oxygen therein, and the active oxygen attacks the solvent in the battery to accelerate the reaction of solvent decomposition. In addition, the document also says that, when $CF_3SO_3Li$, $LiBF_4$ and $LiPF_6$ are used as the electrolyte, the electrolyte decomposition is promoted owing to the electropositive potential of the positive electrode active material to form fluorine, and the fluorine attacks the solvent to accelerate the reaction of solvent decomposition.

Regarding the method for producing lithium fluorosulfonate, only two methods mentioned below have been reported (Non-Patent Document 1, Patent Document 2).

Non-Patent Document 1 reports that ammonium fluorosulfonate is mixed with an aqueous solution of lithium hydroxide to give lithium fluorosulfonate trihydrate.

However, in the method, after the ammonium salt has been once synthesized, the salt is again cation-exchanged into the lithium salt, and therefore the method is complicated and in addition, the method may have a trouble of contamination with the released ammonia.

In the document, in addition, potassium fluorosulfonate is said to be hydrolysable and the lithium salt may also have the possibility of hydrolysis, and therefore there still remains a problem that the hydrate could be stored stably for a long period of time.

Furthermore, when dissolved in an electrolytic solution, the crystallization water may have some negative influence of decomposing lithium hexafluorophosphate to produce, as a by-product, hydrogen fluoride, and therefore, the crystallization water must be previously removed therefore requiring further complicated operation.

Patent Document 2 describes the possibility of production of various lithium salts through salt exchange reaction between lithium chloride or lithium sulfate and various sodium salts/potassium salts in various solutions, including production of lithium fluorosulfonate. However, in Examples of the patent document, only lithium nitrate and lithium bromide that are stable in water are produced, but the document reports no example of producing lithium fluorosulfonate that is suspected of being hydrolyzable. In addition, in the patent document, for separation of the intended products of various lithium salts from the by-products of sodium or potassium chlorides or sulfates, the solubility difference therebetween is utilized. In the document, the solution is concentrated to thereby first precipitate the by-product that has a low solubility, and this is separated through filtration to take out the solution in which the intended product of various lithium salts is dissolved, thereby isolating the product. According to the method, a high recovery rate could not be asked for unless a solvent in which the difference in solubility between the intended product, lithium salt and the by-product salt is used, and the recovery rate in the method applied to production of lithium fluorosulfonate is unknown.

On the other hand, regarding salts with sodium or potassium that is the same alkali metal as lithium and that is more widely used than lithium in the art, the following production methods are known.

(1) A method of reacting sodium/potassium fluoride with sulfur trioxide or fuming sulfuric acid (Patent Documents 3, 4 and Non-Patent Document 2).

(2) Reaction of inorganic fluoride and sulfur trioxide (Non-Patent Reference 3 (hexafluorosilicate), Non-Patent Document 4 (hexafluorophosphate)).

(3) Salt-exchange reaction between fluorosulfonic acid and potassium acetate in acetic acid solvent (Non-Patent Document 5).

CITATION LIST

Patent Documents

Patent Document 1: JP-A 7-296849
Patent Document 2: WO1998/013297
Patent Document 3: German Patent 1010503
Patent Document 4: Soviet Union Patent 223070

Non-Patent Documents

Non-Patent Document 1: Berichte der Deutschen Chemischen Gesellshaft (1919), 52B 1272
Non-Patent Document 2: Inorganic Chemistry (1967), 6(2), 416
Non-Patent Document 3: Journal of Fluorine Chemistry (1984), 24(4), 399
Non-Patent Document 4: Synthesis and Reactivity in Inorganic and Metal-Organic Chemistry (1992), 22(10), 1533
Non-Patent Document 5: Journal of the Chemical Society [Section] A, (1967), (3), 355

SUMMARY OF THE INVENTION

Problems that the Invention is to Solve

However, in the above-mentioned (1), sulfur trioxide (or fuming sulfuric acid containing it) having high reactivity must be used; and in (2), a gaseous inorganic fluoride is produced as a by-product that forms hydrogen fluoride through hydrolysis. Consequently, both the two are difficult to carry out in general reaction facilities, therefor providing a problem of production cost increase. In (3), there is a high possibility of adsorption of acetic acid to the product, and the removal thereof would be problematic. Given the situation and in consideration of the above-mentioned problems, an object of the present invention is to provide a method for stably producing high-purity lithium fluorosulfonate under a mild condition.

Another object of the present invention is to provide an additive to nonaqueous electrolytic solutions capable of providing nonaqueous electrolytic solution secondary batteries of which the initial charge capacity, the input-output characteristics and the impedance characteristics are improved and which therefore have good battery characteristics and durability not only in the early stages but also can still maintain good input-output characteristics and impedance characteristics even after duration, and to provide such a nonaqueous electrolytic solution. Still another object is to provide a nonaqueous electrolytic solution secondary battery that uses the nonaqueous electrolytic solution.

Means for Solving the Problems

The present inventors have assiduously studied for the purpose of solving the above-mentioned problems and, as a result, have found that, when fluorosulfonic acid is reacted with a specific lithium salt in a nonaqueous solvent, then high-purity lithium fluorosulfonic acid can be produced at high yield under a mild condition, and have completed the present invention.

The inventors have further found that, when lithium fluorosulfonate containing a specific amount of a sulfate ion is added to a nonaqueous electrolytic solution, then a nonaqueous electrolytic solution capable of providing nonaqueous electrolytic solution secondary batteries having improved initial charge capacity and input-output characteristics can be realized, and have completed the present invention.

Specifically, the present invention relates to the following:
<1>
A method for producing lithium fluorosulfonate, which comprises reacting a lithium salt and fluorosulfonic acid in a nonaqueous solvent, wherein the lithium salt is a lithium salt not generating water through the reaction step.
<2>
The method for producing lithium fluorosulfonate according to the item <1>, wherein the lithium salt is a lithium halide or a lithium carboxylate.
<3>
The method for producing lithium fluorosulfonate according to the item <1> or <2>, wherein the nonaqueous solvent to be used in the reaction step is a nonaqueous solvent except a carboxylic acid.
<4>
The method for producing lithium fluorosulfonate according to any one of the items <1> to <3>, wherein the nonaqueous solvent to be used in the reaction step is an aprotic polar organic solvent.
<5>
The method for producing lithium fluorosulfonate according to any one of the items <1> to <4>, wherein the nonaqueous solvent to be used in the reaction step is a linear carbonate ester.
<6>
The method for producing lithium fluorosulfonate according to any one of the items <1> to <5>, which comprises removing a carboxylic acid formed as a by-product, after the reaction step.

<7>

The method for producing lithium fluorosulfonate according to the item <6>, wherein the step of removing a carboxylic acid is carried out through a distillation operation.

<8>

The method for producing lithium fluorosulfonate according to the item <6> or <7>, wherein the step of removing a carboxylic acid is carried out from a solution of a nonaqueous solvent having a higher boiling point than the carboxylic acid formed as a by-product after the reaction step.

<9>

The method for producing lithium fluorosulfonate according to any one of the items <6> to <8>, wherein the nonaqueous solvent to be used in the step of removing the carboxylic acid is an aprotic polar organic solvent.

<10>

The method for producing lithium fluorosulfonate according to any one of the items <1> to <9>, which comprises a purification step after the reaction step or after the step of removing the carboxylic acid.

<11>

The method for producing lithium fluorosulfonate according to the item <10>, wherein the purification step includes an operation of further mixing a nonaqueous solvent to the solution containing the crude fluorosulfonic acid obtained in the reaction step.

<12>

The method for producing lithium fluorosulfonate according to any one of the items <1> to <11>, which comprises a solid-liquid separation step of collecting the crude lithium fluorosulfonate obtained in the reaction step, as a solid from the nonaqueous solvent.

<13>

The method for producing lithium fluorosulfonate according to any one of the items <1> to <12>, wherein an operation of bringing the crude lithium fluorosulfonate obtained in the reaction step, into contact with a nonaqueous solvent solution containing water, is carried out at least once.

<14>

The method for producing lithium fluorosulfonate according to the item <13>, which comprises at least one solid-liquid separation step of collecting the lithium fluorosulfonate obtained through the operation of bringing the crude lithium fluorosulfonate into contact with the nonaqueous solvent solution containing water, as a solid from the nonaqueous solvent solution.

<15>

The method for producing lithium fluorosulfonate according to the item <13> or <14>, wherein the nonaqueous solvent in the nonaqueous solvent solution containing water that is used in the operation of bringing the crude lithium fluorosulfonate into contact with the nonaqueous solvent solution containing water, is an aprotic polar organic solvent.

<16>

Lithium fluorosulfonate obtained according to the production method as described in any one of the items <1> to <15>, wherein the content of carboxylic acid in the lithium fluorosulfonate is $2.5 \times 10^{-2}$ mol/kg or less relative to the total amount of the lithium fluorosulfonate.

<17>

Lithium fluorosulfonate having the content of carboxylic acids of $2.5 \times 10^{-2}$ mol/kg or less relative to the total amount of the lithium fluorosulfonate.

<18>

A nonaqueous electrolytic solution comprising: lithium fluorosulfonate; and a carboxylate ion in an amount of from $1.0 \times 10^{-7}$ mol/L to $4.0 \times 10^{-3}$ mol/L.

<19>

Lithium fluorosulfonate obtained according to the production method for lithium fluorosulfonate as described in any one of the items <1> to <15>, wherein the content of halogen element is $1.5 \times 10^{-3}$ mol/kg or less.

<20>

Lithium fluorosulfonate having the content of halogen element of $1.5 \times 10^{-3}$ mol/kg or less.

<21>

A nonaqueous electrolytic solution comprising: lithium fluorosulfonate; and halide ion except fluoride ion in an amount of from $1.0 \times 10^{-7}$ mol/L to $1.0 \times 10^{-3}$ mol/L.

<22>

Lithium fluorosulfonate in which the molar content of sulfate ion is $2.5 \times 10^{-1}$ mol/kg or less relative to the weight of the lithium fluorosulfonate.

<23>

A nonaqueous electrolytic solution comprising: lithium fluorosulfonate; and sulfate ion in an amount of from $1.0 \times 10^{-7}$ mol/L to $1.0 \times 10^{-2}$ mol/L.

<24>

A nonaqueous electrolytic solution for use in a nonaqueous electrolytic solution battery that comprises a negative electrode capable of occluding and releasing lithium ion and a positive electrode, in which the nonaqueous electrolytic solution comprises the lithium fluorosulfonate as described in the item <16>, <17>, <19>, <20> or <22>.

<25>

A nonaqueous electrolytic solution for use in a nonaqueous electrolytic solution battery that comprises a negative electrode and a positive electrode capable of occluding and releasing lithium ion, wherein:

the nonaqueous electrolytic solution contains lithium fluorosulfonate, a lithium salt except lithium fluorosulfonate, and a nonaqueous solvent, the molar content of the lithium fluorosulfonate in the nonaqueous electrolytic solution is from 0.0005 mol/L to 0.5 mol/L, and the molar content of sulfate ion in the nonaqueous electrolytic solution is from $1.0 \times 10^{-7}$ mol/L to $1.0 \times 10^{-2}$ mol/L.

<26>

The nonaqueous electrolytic solution according to the item <24> or <25>, wherein the lithium salt except lithium fluorosulfonate is at least one of $LiPF_6$ and $LiBF_4$.

<27>

The nonaqueous electrolytic solution according to any one of the items <24> to <26>, wherein the nonaqueous electrolytic solution contains a cyclic carbonate having a fluorine atom.

<28>

The nonaqueous electrolytic solution according to the item <27>, wherein the cyclic carbonate having a fluorine atom is contained in the nonaqueous electrolytic solution in an amount of from 0.001% by mass to 85% by mass.

<29>

The nonaqueous electrolytic solution according to any one of the items <24> to <28>, which comprises a cyclic carbonate having a carbon-carbon unsaturated bond.

<30>

The nonaqueous electrolytic solution according to the item <29>, wherein the cyclic carbonate having a carbon-carbon unsaturated bond is contained in the nonaqueous electrolytic solution in an amount of from 0.001% by mass to 10% by mass.

<31>
The nonaqueous electrolytic solution according to any one of the items <24> to <30>, which comprises a cyclic sulfonate ester.
<32>
The nonaqueous electrolytic solution according to the item <31>, wherein the content of the cyclic sulfonate ester in the nonaqueous electrolytic solution is from 0.001% by mass to 10% by mass.
<33>
The nonaqueous electrolytic solution according to any one of the items <24> to <32>, which comprises a compound having a cyano group.
<34>
The nonaqueous electrolytic solution according to the item <33>, wherein the content of the compound having a cyano group in the nonaqueous electrolytic solution is from 0.001% by mass to 10% by mass.
<35>
The nonaqueous electrolytic solution according to any one of the items <24> to <34>, which comprises a diisocyanate compound.
<36>
The nonaqueous electrolytic solution according to the item <35>, wherein the content of the diisocyanate compound in the nonaqueous electrolytic solution is from 0.001% by mass to 5% by mass.
<37>
The nonaqueous electrolytic solution according to any one of the items <24> to <36>, which contains a lithium oxalate salt.
<38>
A nonaqueous electrolytic solution secondary battery comprising: a negative electrode and a positive electrode capable of occluding and releasing lithium ion; and the nonaqueous electrolytic solution as described in any one of the items <24> to <37>.
<39>
The nonaqueous electrolytic solution secondary battery according to the item <38>, wherein the negative electrode has a negative electrode active material layer on a current current collector, and the negative electrode active material layer contains a negative electrode active material that contains at least one of elementary metal, alloys and compounds of silicon, and elementary metal, alloys and compounds of tin.
<40>
The nonaqueous electrolytic solution secondary battery according to the item <38>, wherein the negative electrode has a negative electrode active material layer on a current current collector, and the negative electrode active material layer contains a negative electrode active material that contains a carbonaceous material.
<41>
The nonaqueous electrolytic solution secondary battery according to the item <38>, wherein the negative electrode has a negative electrode active material layer on a current current collector, and the negative electrode active material layer contains a negative electrode active material that contains a lithium titanium composite oxide.
<42>
The nonaqueous electrolytic solution secondary battery according to any one of the items <38> to <41>, wherein the positive electrode has a positive electrode active material layer on a current current collector, and the positive electrode active material layer contains at least one selected from a group consisting of lithium/cobalt composite oxides, lithium/cobalt/nickel composite oxides, lithium/manganese composite oxides, lithium/cobalt/manganese composite oxides, lithium/nickel composite oxides, lithium/cobalt/nickel composite oxides, lithium/nickel/manganese composite oxides and lithium/nickel/cobalt/manganese composite oxides.
<43>
The nonaqueous electrolytic solution secondary battery according to any one of the items <38> to <41>, wherein the positive electrode has a positive electrode active material layer on a current current collector, and the positive electrode active material layer contains $Li_xMPO_4$ (wherein M represents at least one element selected from a group consisting of transition metals of Group 4 to Group 11 of the 4th Period of the Periodic Table; and x falls $0<x<1.2$).

Advantage of the Invention

According to the production method of the present invention, high-purity lithium fluorosulfonic acid can be produced at high yield under a mild condition.

Further, the inventors have found that, when lithium fluorosulfonic acid containing a specific amount of a sulfate ion is contained in a nonaqueous electrolytic solution, then the nonaqueous electrolytic solution can express excellent characteristics that the internal impedance of batteries is lowered and the low-temperature output characteristics thereof is improved, and have obtained an additional finding that the initial internal impedance characteristics of batteries and the high output characteristics thereof can be maintained as such even after duration, therefore having completed here the present invention. Though the details are not clear, it may be considered that adding a sulfate ion in a specific ratio to lithium fluorosulfonate could express the synergistic effect.

Specifically, according to the present invention, there can be provided a nonaqueous electrolytic solution capable of providing nonaqueous electrolytic solution secondary batteries having improved initial charge capacity, input-output characteristics and internal impedance characteristics. In addition, according to the present invention, there can also be provided a nonaqueous electrolytic solution capable of providing nonaqueous electrolytic solution batteries still having high capacity retention rate, excellent input-output performance and excellent impedance characteristics even after durability tests such as high-temperature storage test and cycle test. Accordingly, from the viewpoint of industry, the present invention can provide excellent batteries usable in various fields, for example, for application to mobile appliances, application to electric vehicles, application to large-scale stationary power sources, etc.

MODE FOR CARRYING OUT THE INVENTION

Embodiments of the present invention are described in detail hereinunder, to which, however, the present invention is not limited but can be carried out through modification in any manner.

As used herein, "weight %" and "mass %", "parts by weight" and "parts by mass", and "ppm by weight" and "ppm by mass" are synonymous to each other. Further, the unit "ppm" used alone means "ppm by weight".

<Method for Producing Lithium Fluorosulfonate>

The present invention relates to a method for producing lithium fluorosulfonate that includes a reaction step of reacting a lithium salt and fluorosulfonic acid in a nonaqueous solvent. Here the lithium salt is characterized in that it does not generate water through the reaction step. As a lithium salt that generates water, there are mentioned lithium salts such as lithium hydroxide, lithium carbonate, lithium hydrogencarbonate, etc. The lithium salt for use in the present invention may be any one except the above, for which, however, preferably mentioned are lithium carboxylates, lithium halides, lithium phosphates, lithium phosphites, lithium sulfate, lithium sulfite, lithium borate, lithium nitrate, lithium hydride, etc. Especially preferred are lithium carboxylates and lithium halides as facilitating removal of by-products.

The production method of a case where a lithium carboxylate or a lithium halide is used as the lithium salt is described in detail hereinunder.

<Production Method a for Lithium Fluorosulfonate, Starting Material: Lithium Carboxylate>

<A1: Reaction Step between Lithium Carboxylate and Fluorosulfonic Acid>

The present invention relates to a method for producing lithium fluorosulfonate, wherein lithium fluorosulfonate is obtained through a reaction step between a lithium carboxylate and fluorosulfonic acid in a nonaqueous solvent.

Not specifically defined, the lithium carboxylate for use in the present invention concretely includes the following:

1) Aliphatic Monocarboxylic Acid

Lithium formate, lithium acetate, lithium propionate, lithium butyrate, lithium isobutyrate, lithium phenylacetate, etc.

2) Aliphatic Dicarboxylic Acid Monolithium Salt

Lithium hydrogenoxalate, lithium hydrogenmalonate, lithium hydrogensuccinate, lithium hydrogenfumarate, lithium hydrogenmaleate, etc.

3) Aliphatic Dicarboxylic Acid Dilithium Salt

Lithium oxalate, lithium malonate, lithium succinate, lithium fumarate, lithium maleate, etc.

4) Aromatic Monocarboxylic Acid

Lithium benzoate, etc.

5) Aromatic Dicarboxylic Acid Monolithium Salt

Lithium hydrogenphthalate, lithium hydrogenterephthalate, etc.

6) Aromatic Dicarboxylic Acid Dilithium Salt

Lithium phthalate, lithium terephthalate, etc.

Of these lithium carboxylate, preferred are aliphatic monocarboxylic acid lithium salts and aliphatic dicarboxylic acid dilithium salts since inexpensive and high-purity products thereof are available with ease.

Further, as monocarboxylic acid lithium salts, those that form an aliphatic monocarboxylic acid having a low boiling point as a by-product are preferred since the by-product is easy to remove. Concretely, preferred are lithium formate and lithium acetate.

As dicarboxylic acid dilithium salts, those having a high lithium content ratio among the intramolecular elements are preferred from the viewpoint that the amount of the waste can be reduced. Concretely, preferred are lithium oxalate, lithium malonate and lithium succinate.

Of the above, more preferred are lithium formate and lithium acetate; and most preferred is lithium acetate in view of the availability thereof.

One alone or two or more of these lithium carboxylates may be used here either singly or as combined, but preferably one alone is used so as not to make the operation complicated.

As the lithium carboxylate for use in the reaction in the present invention, commercially-available ones may be used directly as they are or after they are purified, or those produced from other compounds may also be used here. The purity is not specifically defined; however, when lithium halide-derived impurities remain in lithium fluorosulfonate, then they may worsen the performance of batteries and others, and consequently, preferred are those having a higher purity, and concretely preferred are those having a purity of at least 99% by mass.

As the fluorosulfonic acid for use in the reaction in the present invention, commercially-available ones may be used directly as they are or after they are purified, or those produced from other compounds may also be used here. The purity is not specifically defined; however, when fluorosulfonic acid-derived impurities remain in lithium fluorosulfonate, then they may worsen the performance of batteries and others, and consequently, preferred are those having a higher purity, and concretely preferred are those having a purity of at least 99% by mass.

The blend ratio of the fluorosulfonic acid and lithium in the lithium carboxylate for use in the reaction step of the present invention is not specifically defined. Preferably, the ratio does not deviate greatly from 1/1 from the viewpoint of the starting materials consumption efficiency.

Regarding the lower limit of the blend ratio of the fluorosulfonic acid and lithium in the lithium carboxylate for use in the reaction step of the present invention (the ratio of lithium halide to fluorosulfonic acid), when the amount of the fluorosulfonic acid is large relative to lithium in the lithium carboxylate, then the fluorosulfonic acid may remain in lithium fluorosulfonate to provide a problem of lowering the purity of the product; and consequently, the blend ratio of the fluorosulfonic acid and lithium in the lithium carboxylate (the ratio of lithium halide to fluorosulfonic acid) is preferably at least 1 molar time, more preferably at least 1.01 molar times, even more preferably at least 1.05 molar times. The upper limit of the ratio is preferably at most 2 molar times, more preferably at most 1.5 molar times, even more preferably at most 1.2 molar times. Controlling the ratio of lithium halide to fluorosulfonic acid to fall within the above-mentioned range is preferred since high-purity lithium fluorosulfonate can be produced at high yield not via any complicated purification step.

Not specifically defined, the nonaqueous solvent for use in the reaction step in the present invention may be any one except water; however, from the viewpoint of easy removal of carboxylic acid to be formed as a by-product, preferred are nonaqueous solvents except carboxylic acids. In addition, since fluorosulfonic acid is a strong protic acid, also preferred are aprotic polar organic solvents having low reactivity with protic acids. Also preferred are those in which the solubility of the formed lithium fluorosulfonate is not extremely low, as securing stable reaction. The solubility of lithium fluorosulfonate in the nonaqueous solvent to be used in the reaction step is preferably at least 0.1% by mass at room temperature, more preferably at least 1% by mass, even more preferably at least 5% by mass.

The boiling point of the nonaqueous solvent to be used in the reaction step is preferably not too high in order that the solvent could not remain to worsen the performance of batteries and others; and concretely, the boiling point is preferably 300° C. or lower under normal pressure, more preferably 200° C. or lower, even more preferably 150° C. or lower. When used here, some nonaqueous solvents of which the boiling point falls outside the range may remain in the produced lithium fluorosulfonate to have some negative influence on battery performance.

Concretely, the nonaqueous solvent for use in the reaction step in the present invention is preferably anhydrous hydrofluoric acid or an organic solvent; and among these, more preferred is an organic solvent. Especially preferred is an aprotic polar organic solvent. Concretely, the aprotic polar organic solvent includes linear carbonate esters such as dimethyl carbonate, ethylmethyl carbonate, diethyl carbonate, etc.; linear carboxylate esters such as methyl acetate, ethyl acetate, methyl propionate, etc.; linear sulfonate esters such as methyl methanesulfonate, ethyl methanesulfonate, methyl ethanesulfonate, etc.; linear nitriles such as acetonitrile, propionitrile, etc.; linear ethers such as diethyl ether, diisopropyl ether, t-butyl methyl ether etc.; cyclic ethers such as tetrahydrofuran, tetrahydropyran, 1,3-dioxolane, 1,3-dioxane, 1,4-dioxane, etc.

Of the above, preferred are linear carbonate esters such as dimethyl carbonate, ethylmethyl carbonate, diethyl carbonate, etc.; linear carboxylate esters such as methyl acetate, ethyl acetate, methyl propionate, etc.; linear nitriles such as acetonitrile, propionitrile, etc.; and from the viewpoint of easy availability thereof, more preferred are dimethyl carbonate, diethyl carbonate, ethyl acetate and acetonitrile.

On the other hand, from the viewpoint of the influence thereof on battery characteristics and others when remaining in the product, also preferred are linear carbonate esters such as dimethyl carbonate, ethylmethyl carbonate, diethyl carbonate, etc. In view of these, preferred here are dimethyl carbonate and diethyl carbonate. Further, diethyl carbonate is most preferred since there exist carboxylic acids having a lower boiling point than diethyl carbonate.

One alone or two or more of these nonaqueous solvents may be used here either singly or as combined, but preferred is using one alone as not complicating the operation.

Not specifically defined, the ratio of the nonaqueous solvent to fluorosulfonic acid to be used in the reaction step in the present invention is preferably at most 100 times by volume, more preferably at most 50 times, even more preferably at most 25 times. The ratio of the solvent to fluorosulfonic acid to be used in the reaction is preferably at least 2 times by volume, more preferably at least 3 times, even more preferably at least 5 times. When the ratio falls within the above-mentioned range, then the production efficiency is excellent and the formed lithium fluorosulfonate does not precipitate too much during the reaction so that there may hardly occur a problem of interfering with stirring the system.

Not specifically defined, the temperature at the start of the reaction step in the present invention is preferably 100° C. or lower, more preferably 80° C. or lower, even more preferably 60° C. or lower. The temperature at the start of the reaction is preferably −20° C. or higher, more preferably −10° C. or higher, even more preferably 0° C. or higher. When the temperature at the start of the reaction step in the present invention falls within the above-mentioned range, then there may hardly occur problems of solvent vaporization and occurrence of any unexpected side reaction and, in addition, a problem of reaction speed reduction or the like may also be prevented.

The sequence of inputting the reactants into the system in the reaction step in the present invention is not specifically defined. While a solution of fluorosulfonic acid is stirred in the system, a solid lithium carboxylate may be put thereinto; or while a solid lithium carboxylate is suspended in a solvent, fluorosulfonic acid may be dropwise added thereto. The fluorosulfonic acid to be dropwise added may not be diluted in a solvent or may be diluted therein. Here in case where fluorosulfonic acid is diluted in a solvent and dropwise added to the reaction system, the ratio by volume thereof is preferably at most 5 times, more preferably at most 3 times, even more preferably at most 2 times. When the amount of the diluting solvent falls within the above range, then the total amount of the solvent in the reaction system may be a suitable one.

The time within which the reactants are put into the system in the reaction step in the present invention is not specifically defined. Preferably, the reactants are put thereinto within 10 hours, more preferably within 5 hours, even more preferably within 1 hour. The time within which the reactants are put in the reaction in the present invention is preferably not shorter than 1 minute, more preferably not shorter than 5 minutes, even more preferably not shorter than 10 minutes. When the time within which the reactants are put into the system in the reaction step in the present invention falls within the above-mentioned range, then the production efficiency is excellent.

The temperature at which the reactants are put into the system in the reaction step in the present invention is not specifically defined. Preferably, the temperature is the temperature at the start of the reaction+20° C. or lower, more preferably +10° C. or lower, even more preferably +5° C. or lower. Also preferably, the temperature at which the reactants are put into the system in the reaction step in the present invention is the temperature at the start of the reaction−20° C. or higher, more preferably −10° C. or higher, even more preferably −5° C. or higher. Especially preferably, the reaction system is kept at around the temperature at the start of the reaction. When the temperature at which the reactants are put into the system in the reaction step in the present invention falls within the above-mentioned range, then there may hardly occur problems of solvent vaporization and occurrence of any unexpected side reaction and additionally other problems of reaction speed reduction, etc.

Preferably, the reaction step in the present invention includes a ripening step after introduction of reactants thereinto. Not specifically defined, the ripening temperature in the ripening step is preferably the reaction temperature+100° C. or lower, more preferably +80° C. or lower, even more preferably +50° C. or lower. Also preferably, the ripening temperature is the reaction temperature+5° C. or higher, more preferably +10° C. or higher, even more preferably +20° C. or higher. When the ripening temperature in the ripening step falls within the above-mentioned range, then there may hardly occur problems of solvent vaporization and occurrence of any unexpected side reaction and additionally other problems of reaction speed reduction, etc.

The ripening temperature may be higher or lower than the reactants introduction temperature; however, for enhancing the ripening effect, the temperature is preferably higher.

When the temperature in the ripening step falls within the above-mentioned range, then solvent vaporization and occurrence of any unexpected side reaction can be prevented and, in addition, the production efficiency may be bettered and the ripening effect can be secured sufficiently.

Not specifically defined, the time of the ripening step in the reaction step in the present invention is preferably not longer than 20 hours, more preferably not longer than 10 hours, even more preferably not longer than 5 hours. Also preferably, the reaction time for the reaction in the present invention is not shorter than 1 minute, more preferably not shorter than 10 minutes, even more preferably not shorter than 30 minutes. When the time for the ripening step falls within the above-mentioned range, then the production efficiency can be bettered and the ripening effect can be secured sufficiently.

The atmosphere for the reaction step in the present invention is not specifically defined. Since there may be a risk of decomposition of the starting material fluorosulfonic acid and the product lithium fluorosulfonate in water, it is desirable that the reactants are mixed in an atmosphere shielded from open air. More preferably, the reactants are mixed in dry air or in an inert atmosphere such as nitrogen atmosphere, argon atmosphere or the like. The vapor of the type may be introduced into the reactor at the start of the reaction step and then the reactor may be sealed up, or may be continuously fed in and discharged out of the apparatus.

The reaction facilities for the reaction step in the present invention are not specifically defined so far as they are formed of materials for use for production of general chemical products. By any chance, however, water in open air could gain entrance into the reaction system so that fluorosulfonic acid therein would be hydrolyzed to form hydrofluoric acid, and for preventing the possibility, it is desirable to use here a material that may be hardly corroded by hydrofluoric acid. Especially, it is desirable to use a material not corroded by hydrofluoric acid in the site such as the reaction tank and the like that would be kept in contact with the reaction solution for a long period of time. Concretely, it is desirable to use any others than glass for the reaction tank.

<A2. Removal of Excessive Lithium Carboxylate>

The method of recovering (crude) lithium fluorosulfonate from the nonaqueous solution after the above-mentioned reaction step is not specifically defined.

When an excessive lithium carboxylate is used in the reaction step, the excessive lithium carboxylate may remain in the system as an insoluble, depending on the combination of the type of the selected lithium carboxylate and the type of the nonaqueous solvent. In such a case, preferably, the insoluble of the excessive lithium carboxylate is previously separated prior to the purification step. The method of separating the insoluble lithium carboxylate is not specifically defined, for which employable here is filtration such as reduced-pressure filtration, pressure filtration, centrifugal filtration or the like as well as precipitation through still standing or centrifugation followed by supernatant removal. These methods may be combined, or one and the same method may be repeated. Here this step may be carried out in any stage after the reaction step, or after or during the step of removing the nonaqueous solvent used in the reaction step, or during the step of removing carboxylic acid.

Next, the step of removing the nonaqueous solvent used in the reaction step and the method of removing the by-product carboxylic acid are described. Depending on the type of the by-product carboxylic acid and the type of the nonaqueous solvent to be selected, the sequence of the steps may be changed, or the two steps may be combined into one step.

<A3. Step of Removing Nonaqueous Solvent Used in Reaction Step>

The method of removing the nonaqueous solvent used in the reaction step is not specifically defined, for which employable here is concentration distillation or the like. Not specifically defined, the temperature of concentration distillation is preferably so controlled as not to be too much higher than the temperature in the reaction step. Too high temperature of concentration distillation is unfavorable as possibly providing a problem of occurrence of any unexpected side reaction, etc. Preferred is the ripening temperature+50° C. or lower, more preferred is +40° C. or lower, and even more preferred is +30° C. or lower. The pressure of concentration distillation may be any of normal pressure or reduced pressure, but must be set in accordance with the preferred temperature of concentration.

The amount of the nonaqueous solvent used in the reaction step and to be removed here is not specifically defined. The solvent may be completely removed to dryness, or may be partly left. Not completely removing to dryness is preferred as providing the possibility of a purification effect through crystallization.

Regarding the amount of the solvent used in reaction and to be left in the reaction system, when the amount to be left is too much, the amount of the solvent to be recovered as a solid would reduce. Preferably, therefore, the amount of the solvent to be left in the system is at most 20 times by volume the amount of the fluorosulfonic acid put into the system, more preferably at most 15 times by volume, even more preferably at most 10 times by volume. On the other hand, when the amount of the solvent to be left is too small, then the reaction system would be in a viscous slurry state and would be difficult to handle. Preferably, therefore, the amount of the solvent used in reaction and to be left in the reaction system is at least 0.3 times by volume the amount of the fluorosulfonic acid put into the system, more preferably at least 0.5 times by volume, even more preferably at least 1 time by volume.

However, the above does not apply to the case of evaporation to dryness until the dried matter could be handleable as a solid.

In a case where the nonaqueous solvent used in the reaction step is left in the system, the solvent must be separated from the solid. The separation method is not specifically defined, for which employable here is filtration such as reduced-pressure filtration, pressure filtration, centrifugal filtration or the like as well as precipitation through still standing or centrifugation followed by supernatant removal.

Depending on the type of the by-product carboxylic acid and the type of the solvent to be selected, the two steps of the present step and the step to be mentioned in the next section may be combined into one step.

<A4. Step of Removing Carboxylic Acid>

For the method of removing the by-product carboxylic acid, any of the following two methods may be suitably selected depending on the physical properties of the by-product carboxylic acid.

1) In a Case where the by-Product Carboxylic Acid is Liquid at the Operation Temperature:

The carboxylic acid is removed through distillation.

2) In a Case where the by-Product Carboxylic Acid is Solid at the Operation Temperature:

Lithium fluorosulfonate is dissolved in a solvent in which lithium fluorosulfonate is soluble but in which the by-product carboxylic acid is hardly soluble or insoluble and can be readily removed, and the by-product carboxylic acid is separated from the resulting slurry in various methods of liquid-solid separation.

In the case 1), the pressure and the temperature in removal through distillation are not specifically defined. Preferably, the temperature is so controlled as not to be greatly higher than the temperature in the reaction step. Too high temperature in removal is unfavorable as possibly providing a problem of occurrence of any unexpected side reaction, etc. Preferred is the ripening temperature+50° C. or lower, more preferred is +40° C. or lower, and even more preferred is +30° C. or lower. The pressure in removal may be any of normal pressure or reduced pressure, but must be set in accordance with the preferred temperature in removal.

Further, for more completely removing the by-product carboxylic acid, preferably used here is a solvent in which lithium fluorosulfonate is soluble and which has a boiling point higher than the boiling point of the by-product carboxylic acid and is easily removable; and preferably, a part or all of the solvent of the type used is removed.

After the reaction step, a nonaqueous solvent, in which lithium fluorosulfonate is soluble and which has a boiling point higher than the boiling point of the by-product carboxylic acid and is easily removable, may be further added to the system for the operation; and such a nonaqueous solvent, in which lithium fluorosulfonate is soluble and which has a boiling point higher than the boiling point of the by-product carboxylic acid and is easily removable, may be previously selected as the reaction solvent, and the removal of the reaction solvent and the removal of the by-product carboxylic acid may be carried out in one step. For simplifying the process, it is more desirable that the two operations are carried out in one step.

Prior to the present operation, a nonaqueous solvent that is azeotropic to carboxylic acid and is easily removable may be added to the system, and an operation of azeotropically removing the carboxylic acid may be carried out after the previous operation. Preferably, the nonaqueous solvent to be used in the additional operation has a lower boiling point than the nonaqueous solvent used in the present step, in which lithium fluorosulfonate is soluble and which has a boiling point higher than the boiling point of the by-product carboxylic acid and is easily removable. In the preferred case, the solvent that is azeotropic to the carboxylic acid used in the step and is easily removable can be removed with ease.

The nonaqueous solvent to be used in this step, in which lithium fluorosulfonate is soluble and which has a boiling point higher than the boiling point of the by-product carboxylic acid and is easily removable, may vary depending on the type of the by-product carboxylic acid. For example, for lithium formate, preferred are ethylmethyl carbonate, diethyl carbonate and the like; and for lithium acetate, preferred are diethyl carbonate, etc.

In removing the solvent through distillation, more preferably used is a multi-stage rectifier having a multiple number of theoretical stages.

The structure of the rectifier is not specifically defined, and any ordinary industrial one is suitably usable here. Regarding the number of theoretical stages of the rectifier, when the number is too small, then the rectification effect could not be attained. Therefore, the rectifier preferably has at least two stages, more preferably at least 3 stages, even more preferably at least 5 stages. However, when the number is too large, the industrial productivity may lower. Therefore, the rectifier preferably has at most 50 stages, more preferably at most 30 stages, even more preferably at most 10 stages.

In the case 2), the method for removal is not specifically defined, for which employable here is filtration such as reduced-pressure filtration, pressure filtration, centrifugal filtration or the like as well as precipitation through still standing or centrifugation followed by supernatant removal. These methods may be combined, or one and the same method may be repeated.

After the excessive lithium carboxylate has been removed, the nonaqueous solvent used in the reaction is once removed, and a nonaqueous solvent in which lithium fluorosulfonate is soluble but the by-product carboxylic acid is hardly soluble or insoluble and which is easily removable may be added anew to the system to be processed further. Alternatively, such a nonaqueous solvent in which lithium fluorosulfonate is soluble but the by-product carboxylic acid is hardly soluble or insoluble and which is easily removable may be previously used as the nonaqueous solvent in the reaction step, and the excessive lithium carboxylate and the by-product carboxylic acid may be removed all at a time. The solvent removal after removal of the by-product carboxylic acid may be carried out in the same manner as in the step of removing the nonaqueous solvent used in the reaction step.

The nonaqueous solvent for use in the present step, in which lithium fluorosulfonate is soluble but the by-product carboxylic acid is hardly soluble or insoluble and which is easily removable, may vary depending on the type of the by-product carboxylic acid. For example, when lithium oxalate, lithium malonate or lithium succinate is used, preferred are dimethyl carbonate, ethylmethyl carbonate, diethyl carbonate and the like, though not limited thereto.

<A5. Purification Step>

Preferably, the present invention includes a purification step for further increasing the purity of lithium fluorosulfonate. Concretely, after (crude) lithium fluorosulfonate obtained in the reaction step is brought into contact with a nonaqueous solvent, this is further processed through washing, recrystallization, reprecipitation or the like so that the purity of the product can be further increased. Among those operations, more preferred is a recrystallization method. Further, after the recrystallization method, it is also desirable that the product is washed. The frequency of recrystallization is not specifically defined. The recrystallization may be repeated. The frequency of washing is not also specifically defined, and the washing may be repeated. When the recrystallization is repeated, preferably, the system is washed at least once or more after every recrystallization, which, however, is not limitative.

Not specifically defined, the solvent for use in the purification step may be any one except water. Preferred is an organic solvent, and more preferred is an aprotic polar organic solvent.

Concretely, the aprotic polar organic solvent includes linear carbonate esters such as dimethyl carbonate, ethylmethyl carbonate, diethyl carbonate, etc.; linear carboxylate esters such as methyl acetate, ethyl acetate, methyl propionate, etc.; linear sulfonate esters such as methyl methanesulfonate, ethyl methanesulfonate, methyl ethanesulfonate, etc.; linear nitriles such as acetonitrile, propionitrile, etc.; linear ethers such as diethyl ether, diisopropyl ether, t-butyl methyl ether etc.; cyclic ethers such as tetrahydrofuran, tetrahydropyran, 1,3-dioxolane, 1,3-dioxane, 1,4-dioxane, etc.

Of the above, preferred are linear carbonate esters such as dimethyl carbonate, ethylmethyl carbonate, diethyl carbonate, etc.; linear carboxylate esters such as methyl acetate, ethyl acetate, methyl propionate, etc.; linear nitriles such as acetonitrile, propionitrile, etc.; and from the viewpoint of easy availability thereof, more preferred are dimethyl carbonate, diethyl carbonate, ethylmethyl carbonate, ethyl acetate and acetonitrile. On the other hand, from the viewpoint of the influence thereof on battery characteristics and others when remaining in the product, also preferred are linear carbonate esters such as dimethyl carbonate, ethylmethyl carbonate, diethyl carbonate, etc. In view of these, most preferred are dimethyl carbonate and diethyl carbonate. One alone or two or more of these solvents may be used here either singly or as combined.

The above does not apply to poor solvents for use in reprecipitation. Not specifically defined, the poor solvents may be any ones having a lower polarity than the solvent used for product dissolution.

The amount of the solvent in recrystallization in the purification step is not specifically defined, but must be such that (crude) lithium fluorosulfonate could be at least once dissolved therein. However, using too much solvent is unfavorable since the recovery efficiency in recrystallization would lower. The preferred amount of the solvent is not specifically defined since the solubility of lithium fluorosulfonate therein varies depending on the solvent to be used. For example, when dimethyl carbonate is used, its amount is preferably at least 2 times by mass the solid of crude lithium fluorosulfonate, more preferably at least 3 times by mass, even more preferably at least 5 times by mass. Also when dimethyl carbonate is used, the amount thereof is preferably at most 20 times by mass the solid of crude lithium fluorosulfonate, more preferably at most 15 times by mass, even more preferably at most 10 times by mass.

The temperature in dissolution for crystallization for purification is not specifically defined. However, when the temperature is too high, it is unfavorable since there may occur a risk of decomposition by heating; but when too low, it is also unfavorable since a large amount of the solvent is needed for almost complete dissolution. The temperature in dissolution for crystallization for purification is preferably 100° C. or lower, more preferably 80° C. or lower, even more preferably 70° C. or lower.

In carrying out the recrystallization, any insoluble impurities may remain in the system after dissolution and before crystallization, and therefore it is desirable that the insolubles are removed through filtration or the like.

The crystallization temperature in recrystallization is not specifically defined so far as it is lower than the dissolution temperature; however, for increasing the recovery efficiency, the crystallization temperature is preferably lower. On the other hand, when the recovery efficiency is increased too much, then the soluble impurities that are desired to be removed would also be precipitated. The preferred temperature in crystallization varies depending on the recrystallization solvent to be used and is therefore not specifically defined. For example, when dimethyl carbonate is used, the temperature is preferably 50° C. or lower, more preferably 40° C. or lower, even more preferably 30° C. or lower. Also preferably, the temperature is −50° C. or higher, more preferably −20° C. or higher, even more preferably 0° C. or higher.

<A6. Treatment after Purification Step>

The nonaqueous solvent used in the purification step may remain on the solid of lithium fluorosulfonate obtained through the purification step, and is preferably removed by drying. The solvent removing method is not specifically defined; however, applying a too high temperature to the system during the removal operation is unfavorable as providing the possibility of thermal decomposition of the product. On the other hand, a too low temperature is also unfavorable as providing the possibility of insufficient removal. The temperature for removal is preferably 100° C. or lower, more preferably 80° C. or lower, even more preferably 50° C. or lower. Also preferably, the temperature is 0° C. or higher, more preferably 10° C. or higher, even more preferably 20° C. or higher. Regarding the time for removal, a longer time would be favorable as increasing the removal efficiency, but would lower the production efficiency. From these, it is desirable that the removal is carried out for a period of time falling within a suitable range. The time for removal is preferably 30 minutes or more, more preferably 1 hour or more, even more preferably 2 hours or more. Also preferably, the time for removal is 24 hours or less, more preferably 10 hours or less, even more preferably 5 hours or less.

<Production Method B for Lithium Fluorosulfonate, Starting Material: Lithium Halide>
<B1. Reaction Step Between Lithium Halide and Fluorosulfonic Acid>

The present invention relates to a method for producing lithium fluorosulfonate, wherein lithium fluorosulfonate is obtained through a reaction step between a lithium halide and fluorosulfonic acid in a nonaqueous solvent.

The lithium halide for use in the present invention is not specifically defined. In view of the easy availability thereof, preferred are lithium fluoride, lithium chloride, lithium bromide and lithium iodide. Further, in view of the high reactivity thereof, preferred are lithium chloride, lithium bromide and lithium iodide. In view of the inexpensiveness thereof, preferred are lithium chloride and lithium bromide. Further, from the viewpoint that the mass of by-products to be formed during the production process is small, most preferred is lithium chloride.

One alone or two or more of these lithium halides may be used here either singly or as combined, but preferably one alone is used so as not to make the operation complicated.

As the lithium halide for use in the reaction in the present invention, commercially-available ones may be used directly as they are or after they are purified, or those produced from other compounds may also be used here. The purity is not specifically defined; however, when lithium halide-derived impurities remain in lithium fluorosulfonate, then they may worsen the performance of batteries and others, and consequently, preferred are those having a higher purity, and concretely preferred are those having a purity of at least 99% by mass.

As the fluorosulfonic acid for use in the reaction step in the present invention, commercially-available ones may be used directly as they are or after they are purified, or those produced from other compounds may also be used here. The purity is not specifically defined; however, when fluorosulfonic acid-derived impurities remain in lithium fluorosulfonate, then they may worsen the performance of batteries and others, and consequently, preferred are those having a higher purity, and concretely preferred are those having a purity of at least 99% by mass.

The blend ratio of the fluorosulfonic acid and the lithium halide for use in the reaction step of the present invention is not specifically defined. Preferably, the ratio does not deviate greatly from 1/1 from the viewpoint of the starting materials consumption efficiency.

Regarding the ratio of the fluorosulfonic acid and the lithium halide for use in the reaction step in the present invention, the ratio of the lithium halide to the fluorosulfonic acid is preferably at least 1 molar time, more preferably at least 1.01 molar times, even more preferably at least 1.05 molar times. On the other hand, the upper limit of the ratio is preferably at most 2 molar times, more preferably at most 1.5 molar times, even more preferably at most 1.2 molar times.

Controlling the ratio of lithium halide to fluorosulfonic acid to fall within the above-mentioned range is preferred since high-purity lithium fluorosulfonate can be produced at high yield not via any complicated purification step.

Not specifically defined, the nonaqueous solvent for use in the reaction step in the present invention may be any one except water; however, since fluorosulfonic acid is a strong protic acid, preferred are nonaqueous solvents having low reactivity with protic acids. Also preferred are those in which the solubility of the formed lithium fluorosulfonate is not extremely low, as securing stable reaction. The solubility of lithium fluorosulfonate in the nonaqueous solvent to be used in the reaction step is preferably at least 0.1% by mass at room temperature, more preferably at least 1% by mass, even more preferably at least 5% by mass.

The boiling point of the nonaqueous solvent to be used in the reaction step is preferably 300° C. or lower under normal pressure, more preferably 200° C. or lower, even more preferably 150° C. or lower. When used here, some nonaqueous solvents of which the boiling point falls outside the range may remain in the produced lithium fluorosulfonate to have some negative influence on battery performance.

Concretely, the nonaqueous solvent for use in the reaction step in the present invention is preferably anhydrous hydrofluoric acid or an organic solvent; and among these, more preferred is an organic solvent. Especially preferred is an aprotic polar organic solvent. Concretely, the aprotic polar organic solvent includes linear carbonate esters such as dimethyl carbonate, ethylmethyl carbonate, diethyl carbonate, etc.; linear carboxylate esters such as methyl acetate, ethyl acetate, methyl propionate, etc.; linear sulfonate esters such as methyl methanesulfonate, ethyl methanesulfonate, methyl ethanesulfonate, etc.; linear nitriles such as acetonitrile, propionitrile, etc.; linear ethers such as diethyl ether, diisopropyl ether, t-butyl methyl ether etc.; cyclic ethers such as tetrahydrofuran, tetrahydropyran, 1,3-dioxolane, 1,3-dioxane, 1,4-dioxane, etc.

Of the above, preferred are linear carbonate esters such as dimethyl carbonate, ethylmethyl carbonate, diethyl carbonate, etc.; linear carboxylate esters such as methyl acetate, ethyl acetate, methyl propionate, etc.; linear nitriles such as acetonitrile, propionitrile, etc.; and from the viewpoint of easy availability thereof, more preferred are dimethyl carbonate, diethyl carbonate, ethyl acetate and acetonitrile.

On the other hand, from the viewpoint of the influence thereof on battery characteristics and others when remaining in the product, also preferred are linear carbonate esters such as dimethyl carbonate, ethylmethyl carbonate, diethyl carbonate, etc. In view of these, most preferred here are dimethyl carbonate and diethyl carbonate.

One alone or two or more of these nonaqueous solvents may be used here either singly or as combined, but preferred is using one alone as not complicating the operation.

Not specifically defined, the ratio of the nonaqueous solvent to fluorosulfonic acid to be used in the reaction step in the present invention is preferably at most 100 times by volume, more preferably at most 50 times, even more preferably at most 25 times. The ratio of the solvent to fluorosulfonic acid to be used in the reaction is preferably at least 2 times by volume, more preferably at least 3 times, even more preferably at least 5 times. When the ratio falls within the above-mentioned range, then the production efficiency is excellent and the formed lithium fluorosulfonate does not precipitate too much during the reaction so that there may hardly occur a problem of interfering with stirring the system.

Not specifically defined, the temperature at the start of the reaction step in the present invention is preferably 100° C. or lower, more preferably 80° C. or lower, even more preferably 60° C. or lower. The temperature at the start of the reaction is preferably −20° C. or higher, more preferably −10° C. or higher, even more preferably 0° C. or higher. When the temperature at the start of the reaction step in the present invention falls within the above-mentioned range, then there may hardly occur problems of solvent vaporization and occurrence of any unexpected side reaction and, in addition, a problem of reaction speed reduction or the like may also be prevented.

The sequence of inputting the reactants into the system in the reaction step in the present invention is not specifically defined. While a solution of fluorosulfonic acid is stirred in the system, a solid lithium halide may be put thereinto; or while a solid lithium halide is suspended in a solvent, fluorosulfonic acid may be dropwise added thereto. The fluorosulfonic acid to be dropwise added may not be diluted in a solvent or may be diluted therein. Here in case where fluorosulfonic acid is diluted in a solvent and dropwise added to the reaction system, the ratio by volume thereof is preferably at most 5 times, more preferably at most 3 times, even more preferably at most 2 times. When the amount of the diluting solvent falls within the above range, then the total amount of the solvent in the reaction system may be a suitable one.

The time within which the reactants are put into the system in the reaction step in the present invention is not specifically defined. Preferably, the reactants are put thereinto within 10 hours, more preferably within 5 hours, even more preferably within 1 hour. The time within which the reactants are put in the reaction in the present invention is preferably not shorter than 1 minute, more preferably not shorter than 5 minutes, even more preferably not shorter than 10 minutes. When the time within which the reactants are put into the system in the reaction step in the present invention falls within the above-mentioned range, then the production efficiency is excellent.

The temperature at which the reactants are put into the system in the reaction step in the present invention is not specifically defined. Preferably, the temperature is the temperature at the start of the reaction+20° C. or lower, more preferably +10° C. or lower, even more preferably +5° C. or lower. Also preferably, the temperature at which the reactants are put into the system in the reaction step in the present invention is the temperature at the start of the reaction−20° C. or higher, more preferably −10° C. or higher, even more preferably −5° C. or higher. Especially preferably, the reaction system is kept at around the temperature at the start of the reaction. When the temperature at which the reactants are put into the system in the reaction step in the present invention falls within the above-mentioned range, then there may hardly occur problems of solvent vaporization and occurrence of any unexpected side reaction and additionally other problems of reaction speed reduction, etc.

Preferably, the reaction step in the present invention includes a ripening step after introduction of reactants thereinto. Not specifically defined, the ripening temperature in the ripening step is preferably the reaction temperature+100° C. or lower, more preferably +80° C. or lower, even more preferably +50° C. or lower. Also preferably, the ripening temperature is the reaction temperature+5° C. or higher, more preferably +10° C. or higher, even more preferably +20° C. or higher. When the ripening temperature in the ripening step falls within the above-mentioned range, then there may hardly occur problems of solvent vaporization and occurrence of any unexpected side reaction and additionally other problems of reaction speed reduction, etc.

The ripening temperature may be higher or lower than the reactants introduction temperature; however, for enhancing the ripening effect, the temperature is preferably higher.

When the temperature in the ripening step falls within the above-mentioned range, then solvent vaporization and occurrence of any unexpected side reaction can be prevented and, in addition, the production efficiency may be bettered and the ripening effect can be secured sufficiently.

Not specifically defined, the time of the ripening step in the reaction step in the present invention is preferably not longer than 20 hours, more preferably not longer than 10 hours, even more preferably not longer than 5 hours. Also preferably, the reaction time for the reaction in the present invention is not shorter than 1 minute, more preferably not shorter than 10 minutes, even more preferably not shorter than 30 minutes. When the time for the ripening step falls within the above-mentioned range, then the production efficiency can be bettered and the ripening effect can be secured sufficiently.

The atmosphere for the reaction step in the present invention is not specifically defined. Since there may be a risk of decomposition of the starting material fluorosulfonic acid and the product lithium fluorosulfonate in water, it is desirable that the reactants are mixed in an atmosphere shielded from open air. More preferably, the reactants are mixed in dry air or in an inert atmosphere such as nitrogen atmosphere, argon atmosphere or the like. The vapor of the type may be introduced into the reactor at the start of the reaction step and then the reactor may be sealed up, or may be continuously fed in and discharged out of the apparatus.

The reaction facilities for the reaction step in the present invention are not specifically defined so far as they are formed of materials for use for production of general chemical products. By any chance, however, water in open air could gain entrance into the reaction system so that fluorosulfonic acid therein would be hydrolyzed to form hydrofluoric acid, and for preventing the possibility, it is desirable to use here a material that may be hardly corroded by hydrofluoric acid. Especially, it is desirable to use a material not corroded by hydrofluoric acid in the site such as the reaction tank and the like that would be kept in contact with the reaction solution for a long period of time. Concretely, it is desirable to use any others than glass for the reaction tank.

Though the details are not clear, lithium fluorosulfonate is produced with generating a hydrogen halide in the reaction step in the present invention. It is desirable that the apparatus for use in the present invention is provided with a device for removing the hydrogen halide that has been formed as a by-product and has been vaporized in the apparatus. The method for removing the hydrogen halide includes reaction with a solid base, adsorption to a solid adsorbent or absorption by a solvent such as water or the like, followed by neutralization and detoxification into harmlessness. Above all, preferred is absorption by water or the like, as simplest.

In carrying out the method of absorption by a solvent such as water or the like, a solution of a base dissolved in a solvent may be used to carry out the intended absorption and detoxification into harmlessness simultaneously in one stage. Alternatively, a two-stage method is also employable where a base is added layer, or where the system is processed through ion-exchange treatment. The solvent is not specifically defined. Most preferred is water from the viewpoint of the easiness of the operation. Regarding the adsorption method, the hydrogen halide-containing vapor in the system may be jetted into a solvent, or may be led to pass through a space where a solvent has been sprinkled.

The hydrogen halide-containing vapor in the system, which has been sealed up in the reactor, may be discharged out through pressurization or depressurization and may be thereafter treated. In case where a vapor is continuously fed into the apparatus, it is desirable to continuously remove the discharged vapor.

<B2. Solid-Liquid Separation Step for Recovering (Crude) Lithium Fluorosulfonate as Solid from Nonaqueous Solvent (Solution)>

Preferably, the invention includes a solid-liquid separation step of recovering the crude lithium fluorosulfonate produced in the above-mentioned reaction step, as a solid from the nonaqueous solvent. Accordingly, it is possible to remove the halide that may mix in the product as an impurity. The method of recovering crude lithium fluorosulfonate or lithium fluorosulfonate as a solid from the solution after the reaction step is not specifically defined.

When an excessive lithium halide is used in the reaction step, it is desirable that the insoluble of the excessive lithium halide is first separated. The method of separating the insoluble of a lithium halide is not specifically defined, for which employable here is filtration such as reduced-pressure filtration, pressure filtration, centrifugal filtration or the like as well as precipitation through still standing or centrifugation followed by supernatant removal. These methods may be combined, or one and the same method may be repeated.

The method of removing the solvent used in the reaction step is not specifically defined, for which employable here is concentration distillation or the like. Not specifically defined, the temperature of concentration distillation is preferably so controlled as not to be too much higher than the temperature in the reaction step. Preferred is the ripening temperature+50° C. or lower, more preferred is +40° C. or lower, and even more preferred is +30° C. or lower. The pressure of concentration distillation may be any of normal pressure or reduced pressure, but must be set in accordance with the preferred temperature of concentration. The temperature of concentration distillation is preferably not too high, since at such a preferred temperature, it is easy to evade the problem of occurrence of any unexpected side reaction, etc.

The amount of the solvent used in reaction and to be removed here is not specifically defined. The solvent may be completely removed to dryness, or may be partly left. Not completely removing to dryness is preferred as providing the possibility of a purification effect through crystallization.

The upper limit of the amount of the solvent used in reaction and to be left in the reaction system is preferably at most 20 times by volume the amount of the fluorosulfonic acid put into the system, more preferably at most 15 times by volume, even more preferably at most 10 times by volume. The amount falling within the above range is preferred as increasing the recovery rate in recovering as a solid. On the other hand, the lower limit of the amount of the solvent used in reaction and to be left in the reaction system is at least 1 time by volume the amount of the fluorosulfonic acid put into the system, more preferably at least 3 times by volume, even more preferably at least 5 times by volume. When the amount falls within the above range, then the system could hardly be in a viscous slurry state and could be easy to handle. However, the above does not apply to the case of evaporation to dryness until the dried matter could be handleable as a solid.

In a case where the solvent used in the reaction step is left in the system, the solvent must be separated from the solid. The separation method is not specifically defined, for which employable here is filtration such as reduced-pressure filtration, pressure filtration, centrifugal filtration or the like as well as precipitation through still standing or centrifugation followed by supernatant removal.

The hydrogen halide remaining in the solution in this step may vaporize and may be discharged out, and it is desirable that the discharged gas is treated in the same manner as that for the hydrogen halide removal in the reaction step. The treatment method may be selected from the treatment methods in the reaction step, and the method may be the same as or different from the method in the reaction step.

<B3. Operation for Bringing Crude Lithium Fluorosulfonate into Contact with Water-Containing Nonaqueous Solvent Solution>

Preferably, the present invention includes an operation of bringing the crude lithium fluorosulfonate obtained in the reaction step of 1. into contact with a nonaqueous solvent solution containing water. The operation of bringing the crude lithium fluorosulfonate into contact with a nonaqueous solvent solution containing water may be carried out before recovery of the crude lithium fluorosulfonate produced in the reaction step of 1. as a solid, or may be carried out after the crude lithium fluorosulfonate is collected in the solid-liquid separation step of collecting the crude product as a solid from the nonaqueous solvent.

Specifically, it is desirable that the step of bringing the crude lithium fluorosulfonate into contact with a nonaqueous solvent solution containing water is carried out in any stage after the reaction step.

When the lithium fluorosulfonate obtained according to the present invention is compared with the lithium fluorosulfonate obtained not via the present operation, the content of the halogen element in the lithium fluorosulfonate obtained according to the present invention is smaller.

Though the details of the effect of this operation are not clear and are not specifically defined, it may be considered that in the step of reacting fluorosulfonic acid and a lithium halide to produce lithium fluorosulfonate, at least one of chlorosulfonic acid and lithium chlorosulfonate would be partly produced as a by-product.

As compared with that of lithium fluorosulfonate, the reactivity with water of chlorosulfonic acid and lithium chlorosulfonate is high, and the latter would be predominantly hydrolyzed by a small amount of water to form any of a hydrogen halide and a lithium halide that are relatively easy to remove. On the other hand, in a case not via the present step, chlorosulfonic acid and lithium chlorosulfonate that have high similarity in point of the structure would be difficult to remove in any other purification method.

The method of bringing into contact with a nonaqueous solvent solution containing water is not specifically defined, for which preferred here is a method of bringing into contact with a nonaqueous solvent containing a small amount of water mixed therein, at least once or more in the purification step of washing, recrystallization, reprecipitation, etc. As the case may be, a nonaqueous solvent containing a small amount of water mixed therein may be introduced into the reaction liquid after the reaction. Of those, preferred is the treatment to be carried out in the recrystallization/reprecipitation step as securing the purification effect; and especially preferred is the treatment during recrystallization as securing a higher purification effect.

In washing, it is desirable to use a solvent previously mixed with water. On the other hand, in recrystallization/reprecipitation, water may be previously mixed in the solvent to be used, or may be added thereto after dissolving the system in the solvent. However, for securing the uniformity of the reaction, it is desirable that water is added to the solvent after dissolution. On the other hand, it is undesirable that water is added to the solid before dissolution and then a nonaqueous solvent is added thereto for dissolution, since the effect of water would be nonuniform. Via the present step, a small amount of an insoluble may be formed through hydrolysis. Before lithium fluorosulfonate is recovered from the nonaqueous solvent as a solid, preferably, the insoluble is previously separated.

Regarding the amount of water to be added, when the amount is too small, then it is unfavorable since hydrogen element could not be fully removed. This is considered because at least one of the presumed impurities, chlorosulfonic acid and lithium chlorosulfonate could not be sufficiently hydrolyzed. On the other hand, when the amount is too much, it is also unfavorable since the yield may lower. It is considered that water having remained after consumed for decomposing at least one of chlorosulfonic acid and lithium chlorosulfonate would hydrolyze lithium fluorosulfonate. Preferably, the amount of water to be added is at least 1/1 as a molar ratio to the halogen fraction determined through analysis just before the present step, more preferably at least 1/1.02, even more preferably at least 1/1.05.

Also preferably, the amount of water to be added is at most 1/3 as a molar ratio to the halogen fraction determined through analysis just before the present step, more preferably at most 1/1.2, even more preferably at most 1/1.5.

In case where the present step is carried out in the recrystallization or reprecipitation step, the crystallized/reprecipitated substance could be the final product directly as it is, but preferably, the substance is again purified through recrystallization or reprecipitation from a solvent system not containing water.

<B4. Purification Step>

Preferably, the present invention includes a purification step for further increasing the purity of lithium fluorosulfonate. Concretely, after (crude) lithium fluorosulfonate is brought into contact with a nonaqueous solvent, this is further processed through washing, recrystallization, reprecipitation or the like so that the purity of the product can be further increased. Among those operations, more preferred is a recrystallization method. Further, after the recrystallization method, it is also desirable that the product is washed. The frequency of recrystallization is not specifically defined. The recrystallization may be repeated. The frequency of washing is not also specifically defined, and the washing may be repeated. When the recrystallization is repeated, preferably, the system is washed at least once or more after every recrystallization, which, however, is not limitative.

Not specifically defined, the solvent for use in the purification step may be any one except water. Preferred is an organic solvent, and more preferred is an aprotic polar organic solvent.

Concretely, the aprotic polar organic solvent includes linear carbonate esters such as dimethyl carbonate, ethylmethyl carbonate, diethyl carbonate, etc.; linear carboxylate esters such as methyl acetate, ethyl acetate, methyl propionate, etc.; linear sulfonate esters such as methyl methanesulfonate, ethyl methanesulfonate, methyl ethanesulfonate, etc.; linear nitriles such as acetonitrile, propionitrile, etc.; linear ethers such as diethyl ether, diisopropyl ether, t-butyl methyl ether etc.; cyclic ethers such as tetrahydrofuran, tetrahydropyran, 1,3-dioxolane, 1,3-dioxane, 1,4-dioxane, etc.

Of the above, preferred are linear carbonate esters such as dimethyl carbonate, ethylmethyl carbonate, diethyl carbonate, etc.; linear carboxylate esters such as methyl acetate, ethyl acetate, methyl propionate, etc.; linear nitriles such as acetonitrile, propionitrile, etc.; and from the viewpoint of easy availability thereof, more preferred are dimethyl carbonate, diethyl carbonate, ethyl acetate and acetonitrile.

On the other hand, from the viewpoint of the influence thereof on battery characteristics and others when remaining in the product, also preferred are linear carbonate esters such as dimethyl carbonate, ethylmethyl carbonate, diethyl carbonate, etc.

In view of these, most preferred are dimethyl carbonate and diethyl carbonate.

One alone or two or more of these solvents may be used here either singly or as combined.

The above does not apply to poor solvents for use in reprecipitation. Not specifically defined, the poor solvents may be any ones having a lower polarity than the solvent used for product dissolution.

The amount of the solvent in recrystallization in the purification step is not specifically defined, but must be such that (crude) lithium fluorosulfonate could be at least once dissolved therein. However, using too much solvent is unfavorable since the recovery efficiency in recrystallization would lower. The preferred amount of the solvent is not specifically defined since the solubility of lithium fluorosulfonate therein varies depending on the solvent to be used. Though not indiscriminately defined, for example, when dimethyl carbonate is used, its amount is preferably at least 2 times by mass the solid of crude lithium fluorosulfonate, more preferably at least 3 times by mass, even more preferably at least 5 times by mass. Also when dimethyl carbonate is used, the amount thereof is preferably at most 20 times by mass the solid of crude lithium fluorosulfonate, more preferably at most 15 times by mass, even more preferably at most 10 times by mass.

The temperature in dissolution for crystallization for purification is not specifically defined. However, when the temperature is too high, it is unfavorable since there may occur a risk of decomposition by heating; but when too low, it is also unfavorable since a large amount of the solvent is needed for almost complete dissolution. The temperature in dissolution for crystallization for purification is preferably 100° C. or lower, more preferably 80° C. or lower, even more preferably 70° C. or lower.

In carrying out the recrystallization, any insoluble impurities may remain in the system after dissolution and before crystallization, and therefore it is desirable that the insolubles are removed through filtration or the like.

The crystallization temperature in recrystallization is not specifically defined so far as it is lower than the dissolution temperature; however, for increasing the recovery efficiency, the crystallization temperature is preferably lower. On the other hand, when the recovery efficiency is increased too much, then the soluble impurities that are desired to be removed would also be precipitated. The preferred temperature in crystallization varies depending on the recrystallization solvent to be used and is therefore not specifically defined. For example, when dimethyl carbonate is used, the temperature is preferably 50° C. or lower, more preferably 40° C. or lower, even more preferably 30° C. or lower. Also preferably, the temperature is −50° C. or higher, more preferably −20° C. or higher, even more preferably 0° C. or higher.

<B5. Treatment after Solid-Liquid Separation Step after Operation of Bringing Crude Lithium Fluorosulfonate into Contact with Water-Containing Nonaqueous Solvent Solution>

After the operation of bringing the crude lithium fluorosulfonate with a nonaqueous solvent solution containing water, the nonaqueous solvent used in the purification step and others still remains in the solid of lithium fluorosulfonate obtained through the solid-liquid separation step, and therefore after the operation, it is desirable to remove the remaining nonaqueous solvent by drying. The solvent removing method is not specifically defined; however, applying a too high temperature to the system during the removal operation is unfavorable as providing a risk of thermal decomposition of the product. On the other hand, a too low temperature is also unfavorable as providing the possibility of insufficient removal. The temperature for removal is preferably 100° C. or lower, more preferably 80° C. or lower, even more preferably 50° C. or lower. Also preferably, the temperature is 0° C. or higher, more preferably 10° C. or higher, even more preferably 20° C. or higher. Regarding the time for removal, a longer time would be favorable as increasing the removal efficiency, but would lower the production efficiency. From these, it is desirable that the removal is carried out for a period of time falling within a suitable range. The time for removal is preferably 30 minutes or more, more preferably 1 hour or more, even more preferably 2 hours or more. Also preferably, the time for removal is 24 hours or less, more preferably 10 hours or less, even more preferably 5 hours or less.

<Lithium Fluorosulfonate>

Preferably, the purity of lithium fluorosulfonate is higher in order that batteries and others using the compound could exhibit high performance.

In particular, for example, when the compound is produced by the use of a lithium carboxylate, it is desirable that the carboxylate ions that are easily oxidized in batteries are removed so that the ions do not dissolve in the electrolytic solution, for controlling the battery characteristics. This may be confirmed by measuring the amount of the carboxylate ions in the compound dissolved in water.

The upper limit of the carboxylate ions in lithium fluorosulfonate is at most $2.5 \times 10^{-2}$ mol/kg, preferably at most $2.0 \times 10^{-2}$ mol/kg, more preferably at most $1.5 \times 10^{-2}$ mol/kg. On the other hand, the lower limit is at least $1.0 \times 10^{-5}$ mol/kg, preferably at least $5.0 \times 10^{-5}$ mol/kg, more preferably at least $1.0 \times 10^{-4}$ mol/kg.

When lithium fluorosulfonate is dissolved in an electrolytic solution, the upper limit of the content of the carboxylate ions in the nonaqueous electrolytic solution is at most $4.0 \times 10^{-3}$ mol/L, preferably at most $2.0 \times 10^{-3}$ mol/L, more preferably at most $1.5 \times 10^{-3}$ mol/L, even more preferably at most $1.0 \times 10^{-3}$ mol/L, most preferably at most $5.0 \times 10^{-4}$ mol/L. On the other hand, the lower limit is at least $1.0 \times 10^{-7}$ mol/L, preferably at least $5.0 \times 10^{-7}$ mol/L, more preferably at least $1.0 \times 10^{-6}$ mol/L. When the molar concentration of the carboxylate ions falls within the above-mentioned range, then the internal impedance of batteries can be low and the batteries can more readily express input-output characteristics and durability. The above-mentioned value is at least any one of the value calculated from the added amount and the value suitably calculated from the content in the electrolytic solution determined by analyzing the electrolytic solution.

In addition, for controlling battery characteristics, it is desirable to remove halide ions that are easily oxidized in batteries, chemical species that readily form halide ions by the action thereon of a slight amount of water to mix in batteries or halogen element-containing compounds that may form halide ions through reaction in batteries so as not to be dissolved in electrolytic solutions. This may be confirmed by measuring the amount of the halide ions in dissolving the compound in water. On the other hand, it is known that when a slight amount of a halide salt is mixed in the compound, then the performance of batteries may be thereby improved.

The upper limit of the halogen element content in lithium fluorosulfonate is at most $1.5 \times 10^{-3}$ mol/kg, preferably at most $1.0 \times 10^{-3}$ mol/kg, more preferably at most $5.0 \times 10^{-4}$ mol/kg, even more preferably at most $3.0 \times 10^{-4}$ mol/kg. On the other hand, the lower limit is at least $1.0 \times 10^{-5}$ mol/kg, preferably at least $5.0 \times 10^{-5}$ mol/kg, more preferably at least $1.0 \times 10^{-4}$ mol/kg.

When lithium fluorosulfonate is added to an electrolytic solution, the upper limit of the content of the halide ions except fluoride ions in the nonaqueous electrolytic solution is at most $1.0 \times 10^{-3}$ mol/L, preferably at most $5.0 \times 10^{-4}$ mol/L, more preferably at most $1.0 \times 10^{-4}$ mol/L, even more preferably at most $5.0 \times 10^{-5}$ mol/L, most preferably at most $3.0 \times 10^{-5}$ mol/L. On the other hand, the lower limit is at least $1.0 \times 10^{-7}$ mol/L, preferably at least $5.0 \times 10^{-7}$ mol/L, more preferably at least $1.0 \times 10^{-6}$ mol/L. When the molar concentration of the halide ions except fluoride ions falls within the above-mentioned range, then the internal impedance of batteries can be low and the batteries can more readily express input-output characteristics and durability. The above-mentioned value is at least any one of the value calculated from the added amount and the value suitably calculated from the content in the electrolytic solution determined by analyzing the electrolytic solution.

The present invention also relates to lithium fluorosulfonate containing a specific amount of a sulfate ion fraction. A sulfate ion may be produced as a by-product in producing lithium fluorosulfonate by the use of the above-mentioned lithium halide. The sulfate ion may be in any form of lithium sulfate, lithium hydrogensulfate or sulfuric acid. The lower limit of the molar content of the sulfate ion fraction in lithium fluorosulfonate of the present invention is at least $1.0 \times 10^{-5}$ mol/kg relative to the weight of lithium fluorosulfonate, preferably at least $5.0 \times 10^{-5}$ mol/kg, more preferably at least $1.0 \times 10^{-4}$ mol/kg. The upper limit of the molar content of the sulfate ion fraction in lithium fluorosulfonate of the present invention is at most $2.5 \times 10^{-1}$ mol/kg, preferably at most $2.0 \times 10^{-1}$ mol/kg, more preferably at most $1.5 \times 10^{-1}$ mol/kg. When the molar content of the sulfate ion fraction falls within the above-mentioned range, the sulfate ion fraction could sufficiently express its effect in batteries when the compound is added to the electrolytic solution therein, and further could prevent the increase in the resistance to be caused by side reaction.

When lithium fluorosulfonate is added to an electrolytic solution, the upper limit of the sulfate ion content in the nonaqueous electrolytic solution is at most $1.0 \times 10^{-2}$ mol/L, preferably at most $8.0 \times 10^{-3}$ mol/L, more preferably at most $5.0 \times 10^{-3}$ mol/L, even more preferably at most $1.0 \times 10^{-3}$ mol/L, most preferably at most $5.0 \times 10^{-4}$ mol/L. On the other hand, the lower limit is at least $1.0 \times 10^{-7}$ mol/L, preferably at least $5.0 \times 10^{-7}$ mol/L, more preferably at least $8.0 \times 10^{-7}$ mol/L. When the molar concentration of the sulfate ions falls within the above-mentioned range, then the internal impedance of batteries can be low and the batteries can more readily express input-output characteristics and durability. The above-mentioned value is at least any one of the value calculated from the added amount and the value suitably calculated from the content in the electrolytic solution determined by analyzing the electrolytic solution.

The method for synthesizing and obtaining lithium fluorosulfonate of the present invention is not specifically defined, and the compound may be synthesized by any method or may be obtained by any means, and any one of those may be used here.

The method for synthesizing lithium fluorosulfonate includes, for example, a method for obtaining lithium fluorosulfonate by reacting lithium fluoride or a lithium silicon fluoride compound and sulfur trioxide with fluorosulfonic acid, a method of obtaining lithium fluorosulfonate by reacting fluorosulfonic acid and lithium, a method of obtaining lithium fluorosulfonate by reacting an ammonium salt of fluorosulfonic acid and lithium, a method of obtaining lithium fluorosulfonate by reacting fluorosulfonic acid and a lithium carboxylate through salt exchange, a method of obtaining lithium fluorosulfonate by reacting fluorosulfonic acid and a lithium halide through salt exchange, a method of obtaining it by reacting a substituted lithium sulfonate having a functional group capable of being readily substituted with fluorine like any other halosulfonic acid such as chlorosulfonic acid or the like, with fluorine, hydrofluoric acid, a fluoride salt such as potassium fluoride or the like, an acidic fluoride salt such as acidic potassium fluoride or the like, or with a nonmetallic inorganic fluoride, an organic fluorinating agent or the like through fluorine substitution, etc.

In these reactions, presence or absence of solvent is not specifically defined. In case where a solvent is used, it may be selected from various organic solvents or inorganic solvents except water. In the case, preferred are solvents that hardly remain in the reaction system and, even when having remained therein, it is desirable that their influence on the system is small. As the organic solvent of the type, there are mentioned aprotic solvents such as carbonate esters, etc.; and as the inorganic solvent, there are mentioned anhydrous hydrofluoric acid, etc.

<1. Nonaqueous Electrolytic Solution>

The nonaqueous electrolytic solution of the present invention contains at least lithium fluorosulfonate, a lithium salt except lithium fluorosulfonate, and a nonaqueous solvent capable of dissolving these.

<1-1. Lithium Fluorosulfonate>

As the lithium fluorosulfonate for use in the nonaqueous electrolytic solution of the present invention, the lithium fluorosulfonate described in the previous section can be used.

The lower limit of the molar content of lithium fluorosulfonate in the nonaqueous electrolytic solution of the present invention is at least 0.0005 mol/L, more preferably at least 0.01 mol/L, even more preferably at least 0.02 mol/L. The upper limit is at most 0.5 mol/L, preferably at most 0.45 mol/L, more preferably at most 0.4 mol/L. The range of the concentration of lithium fluorosulfonate is from 0.0005 mol/L to 0.5 mol/L, preferably from 0.01 mol/L to 0.5 mol/L, more preferably from 0.01 mol/L to 0.45 mol/L, even more preferably from 0.01 mol/L to 0.40 mol/L. When the molar concentration of lithium fluorosulfonate falls within the above-mentioned range, then the internal impedance of batteries can be low and the batteries can more readily express input-output characteristics and durability.

The above-mentioned value is at least any one of the value calculated from the added amount and the value suitably calculated from the content in the electrolytic solution determined by analyzing the electrolytic solution.

In the nonaqueous electrolytic solution of the present invention, the lower limit of the molar content of the counter anion species $FSO^{3-}$ of lithium fluorosulfonate is preferably at least 0.0005 mol/L, more preferably at least 0.01 mol/L, even more preferably at least 0.02 mol/L. The upper limit is preferably at most 0.5 mol/L, more preferably at most 0.45 mol/L, even more preferably at most 0.4 mol/1. When the concentration of the counter anion species $FSO^{3-}$ falls within the above-mentioned range, then the internal impedance of batteries can be low and the batteries can more readily express input-output characteristics and durability. The range of the counter anion species $FSO^{3-}$ is preferably from 0.0005 mol/L to 0.5 mol/L, more preferably from 0.01 mol/L to 0.5 mol/L, even more preferably from 0.01 mol/L to 0.45 mol/L, still more preferably from 0.01 mol/L to 0.40 mol/L. The above-mentioned value is at least any one of the value calculated from the added amount and the value suitably calculated from the content in the electrolytic solution determined by analyzing the electrolytic solution.

The molar content of the counter anion species $FSO_3^-$ in the nonaqueous electrolytic solution can be determined, for example, by the amount of lithium fluorosulfonate used in preparing the nonaqueous electrolytic solution.

<1-2. Lithium Salt except Lithium Fluorosulfonate>

The nonaqueous electrolytic solution of the present invention contains lithium fluorosulfate containing a specific amount of a sulfate ion fraction and preferably contains at least one other lithium salt.

Not specifically defined, the other lithium salt may be any one known to be usable for the application, and concretely includes the following.

For example, there are mentioned inorganic lithium salts such as $LiPF_6$, $LiBF_4$, $LiClO_4$, $LiAlF_4$, $LiSbF_6$, $LiTaF_6$, $LiWF_7$, etc.;

Lithium fluorophosphates except $LiPF_6$, such as $LiPO_3F$, $LiPO_2F_2$, etc.;

Lithium tungstates such as $LiWOF_5$, etc.;

Lithium carboxylates such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, $CF_3CF_2CF_2CF_2CO_2Li$, etc.;

Lithium sulfonates such as $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, $CF_3CF_2CF_2CF_2SO_3Li$, etc.;

Lithium imide salts such as $LiN(FCO_2)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiN(CF_3SO_2)(C_4F_9SO_2)$, etc.;

Lithium methide salts such as $LiC(FSO_2)_3$, $LiC(CF_3SO_2)_3$, $LiC(C_2F_5SO_2)_3$, etc.;

Lithium oxalate salts such as lithium difluorooxalatoborate, lithium bis(oxalato)borate, lithium tetrafluorooxalatophosphate, lithium difluorobis(oxalato)phosphate, lithium tris(oxalato)phosphate, etc.;

Besides the above, fluorine-containing organic lithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, $LiBF_2(C_2F_5SO_2)_2$, etc.

Of the above, preferred are $LiPF_6$, $LiBF_4$, $LiSbF_6$, $LiTaF_6$, $LiPO_2F_2$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, $LiPF_3(C_2F_5)_3$, etc. Further among those, more preferred are $LiPF_6$ and $LiBF_4$; and most preferred is $LiPF_6$.

In the nonaqueous electrolytic solution of the present invention, the lower limit of the molar content of the counter anion species of the lithium salts except lithium fluorosulfonate (for example, $PF_6^-$ when the lithium salt except lithium fluorosulfonate is $LiPF_6$) is preferably at least 0.5 mol/L, more preferably at least 0.6 mol/L, even more preferably at least 0.7 mol/L. The upper limit is preferably at most 3.0 mol/L, more preferably at most 2.0 mol/L, even more preferably at most 1.5 mol/L. The concentration range of the counter anion species of the lithium salt except lithium fluorosulfonate is preferably from 0.5 mol/L to 3.0 mol/L, more preferably from 0.5 mol/L to 2.0 mol/L, even more preferably from 0.5 mol/L to 1.5 mol/L. When the concentration of the counter anion species of the lithium salt except lithium fluorosulfonate falls within the above-mentioned range, then the total ion content in the nonaqueous electrolytic solution and the viscosity of the electrolytic solution could be well balanced so that the internal impedance of batteries can be low without reducing the ionic conductivity thereof and the batteries can more readily express the effect of input-output characteristics.

In the nonaqueous electrolytic solution of the present invention, the ratio of the molar content of lithium fluorosulfonate [lithium fluorosulfonate] to the molar content of lithium in the lithium salt except lithium fluorosulfonate [lithium salt except lithium fluorosulfonate] ([lithium fluorosulfonate]/[lithium salt except lithium fluorosulfonate]) is preferably from 0.001 to 1.2.

When the ratio of [lithium fluorosulfonate]/[lithium salt except lithium fluorosulfonate] falls within the above-mentioned range, then the input-output characteristics and the durability characterized by fluorosulfonate salts can be more readily expressed. For more remarkably exhibiting the advantageous effects of the present invention, [lithium fluorosulfonate]/[lithium salt except lithium fluorosulfonate] is more preferably 0.01 or more, even more preferably 0.02 or more, and is more preferably 1.1 or less, even more preferably 1.0 or less, still more preferably 0.7 or less. The range of [lithium fluorosulfonate]/[lithium salt except lithium fluorosulfonate] is preferably from 0.001 to 1.2, more preferably from 0.01 to 1.1, even more preferably from 0.01 to 1.0, still more preferably from 0.01 to 0.7.

In addition to the above, adding some other lithium salt than the above-mentioned $LiPF_6$, as selected from lithium fluorophosphates salts, lithium imide salts and lithium oxalate salts is often preferred in some cases, from the viewpoint of the effect thereof of improving output characteristics, high-rate charge/discharge characteristics, high-temperature storage characteristics, cycle characteristics, etc. Concretely, the lithium salt is one selected from lithium salts of $LiPO_2F_2$, $LiBF_4$, $LiN(CF_3SO_2)_2$, $LiN(FSO_2)_2$, lithium difluorooxalatoborate, lithium bisoxalatoborate, lithium difluorobisoxalatophosphate, and lithium tetrafluorobisoxalatophosphate.

In the present invention, the content of the lithium salt selected from $LiPO_2F_2$, $LiBF_4$, $LiN(CF_3SO_2)_2$, $LiN(FSO_2)_2$, lithium difluorooxalatoborate, lithium bisoxalatoborate, lithium difluorobisoxalatophosphate and lithium tetrafluorobisoxalatophosphate may be any one, insomuch not markedly detracting from the advantageous effects of the present invention; however, the lower limit of the content is preferably at least 0.0005 mol/L, more preferably at least 0.001 mol/L, more preferably at least 0.01 mol/L. The upper limit is preferably at most 0.5 mol/L, more preferably at most 0.45 mol/L, even more preferably at most 0.4 mol/L.

In the case where $LiPO_2F_2$ among the above is added to the electrolytic solution, the electrolytic solution may be prepared according to a method where $LiPO_2F_2$ that has been separately synthesized in a known method is added to the electrolytic solution containing $LiPF_6$, or according to a method where water is made to coexist in the battery constituent elements such as active materials, electrode plates and others, and while a battery is constructed by using an electrolytic solution that contains $LiPF_6$, $LiPO_2F_2$ is generated in the system. In the present invention, any of these methods is employable.

The method of measuring the content of $LiPO_2F_2$ in the nonaqueous electrolytic solution or the nonaqueous electrolytic solution battery is not specifically defined, for which any known method is employable. Concretely, there may be mentioned mentioned ion chromatography, F nuclear magnetic resonance spectrometry (hereinafter this may be abbreviated as NMR), etc.

<1-3. Nonaqueous Solvent>

In the present invention, typical examples of the nonaqueous solvent for dissolving lithium fluorosulfonate and other lithium salts than lithium fluorosulfonate are listed below. In the present invention, one alone or two or more different types of those nonaqueous solvents may be used either singly or as combined to be a mixture thereof. Insomuch not markedly detracting from the advantageous effects of the present invention, the nonaqueous solvents for use herein are not limited to those exemplifications.

<Saturated Cyclic Carbonates>

As saturated cyclic carbonates usable as the nonaqueous solvent in the present invention, there are mentioned those having an alkylene group with from 2 to 4 carbon atoms.

Concretely, the saturated cyclic carbonates having from 2 to 4 carbon atoms include ethylene carbonate, propylene carbonate, butylene carbonate, etc. Above all, especially preferred are ethylene carbonate and propylene carbonate from the viewpoint of improving the battery characteristics derived from the improvement in the degree of lithium ion dissociation.

One alone or two or more of saturated cyclic carbonates may be used here either singly or as combined in any desired ratio.

Not specifically defined, the amount of the saturated cyclic carbonate to be added may be any desired one not markedly detracting from the advantageous effects of the present invention. In case where one alone of the compound is used, the lower limit of the amount thereof is at least 3% by volume in 100% by volume of the nonaqueous solvent, more preferably at least 5% by volume. The range may evade reduction in the electric conductivity to be derived from the reduction in the dielectric constant of the nonaqueous electric solution, thereby readily bettering the large current discharge characteristics of nonaqueous electrolytic solution secondary batteries, the stability for negative electrodes and the cycle characteristics. The upper limit may be at most 90% by volume, more preferably at most 85% by volume, even more preferably at most 80% by volume. Falling within the range, the viscosity of the nonaqueous electrolytic solution may fall within a suitable range and the ionic conductivity thereof may be prevented from lowering and furthermore the charge characteristics of nonaqueous electrolytic solution secondary batteries can be thereby readily made to fall within a good range.

Two or more different types of saturated cyclic carbonates may be used here as combined in any desired manner. One preferred combination is a combination of ethylene carbonate and propylene carbonate. In this case, the ratio by volume of ethylene carbonate and propylene carbonate is preferably from 99/1 to 40/60, more preferably from 95/5 to 50/50. Further, the amount of propylene carbonate in the entire volume of the nonaqueous solvent may be at least 1% by volume, preferably at least 2% by volume, more preferably at least 3% by volume; and the upper limit thereof is typically at most 20% by volume, preferably at most 8% by volume, more preferably at most 5% by volume. The electrolytic solution that contains propylene carbonate to fall within the range is preferred as securing further excellent low-temperature characteristics while maintaining the characteristics of a combination of ethylene carbonate and a dialkyl carbonate.

<Linear Carbonates>

As linear carbonates usable as the nonaqueous solvent in the present invention, there are mentioned those having from 3 to 7 carbon atoms.

Concretely, the linear carbonates having from 3 to 7 carbon atoms include dimethyl carbonate, diethyl carbonate, di-n-propyl carbonate, diisopropyl carbonate, n-propyl-isopropyl carbonate, ethylmethyl carbonate, methyl-n-propyl carbonate, n-butylmethyl carbonate, isobutylmethyl carbonate, t-butylmethyl carbonate, ethyl-n-propyl carbonate, n-butylethyl carbonate, isobutylethyl carbonate, t-butylethyl carbonate, etc.

Above all, preferred are dimethyl carbonate, diethyl carbonate, di-n-propyl carbonate, diisopropyl carbonate, n-propyl-isopropyl carbonate, ethylmethyl carbonate, methyl-n-propyl carbonate; and more preferred are dimethyl carbonate, di ethyl carbonate and ethylmethyl carbonate.

Also preferred for use herein are fluorine atom-having linear carbonates (hereinafter this may be abbreviated as "fluorinated linear carbonates"). The number of fluorine atoms that the fluorinated linear carbonate has may be 1 or more, not specifically defined, but is typically at most 6, preferably at most 4. In case where the fluorinated linear carbonate has multiple fluorine atoms, the atoms may bond to one and the same carbon, or may bond to different carbons. The fluorinated linear carbonates include fluorinated dimethyl carbonate derivatives, fluorinated ethylmethyl carbonate derivatives, fluorinated diethyl carbonate derivatives, etc.

The fluorinated dimethyl carbonate derivatives include fluoromethylmethyl carbonate, difluoromethylmethyl carbonate, trifluoromethylmethyl carbonate, bis(fluoromethyl) carbonate, bis(difluoro)methyl carbonate, bis(trifluoromethyl) carbonate, etc.

The fluorinated ethylmethyl carbonate derivatives include 2-fluoroethylmethyl carbonate, ethylfluoromethyl carbonate, 2,2-difluoroethylmethyl carbonate, 2-fluroethylfluoromethyl carbonate, ethyldifluoromethyl carbonate, 2,2,2-trifluoroethylmethyl carbonate, 2,2-difluoroethylfluoromethyl carbonate, 2-fluoroethyldifluoromethyl carbonate, ethyltrifluoromethyl carbonate, etc.

The fluorinated diethyl carbonate derivatives include ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, bis(2,2,2-trifluoroethyl) carbonate, etc.

One alone or two or more of linear carbonates may be used here either singly or as combined in any desired manner and in any desired ratio.

Preferably, the amount of the linear carbonate is at least 15% by volume in 100% by volume of the nonaqueous solvent. When the amount is at least 15% by volume, the viscosity of the nonaqueous electrolytic solution can be made to fall within a suitable range and the ionic conductivity thereof can be prevented from lowering, and furthermore the large current discharge characteristics of nonaqueous electrolytic solution secondary batteries can be thereby readily made to fall within a good range. Also preferably, the amount of the linear carbonate is at most 90% by volume in 100% by volume of the nonaqueous solvent. When the amount is at most 90% by volume, then the electric conductivity of the nonaqueous electrolytic solution can be prevented from lowering that may be derived from the reduction in the dielectric constant of the electrolytic solution, and the large current discharge characteristics of nonaqueous electrolytic solution secondary batteries can be thereby readily made to fall within a good range. The amount of the linear carbonate to be added is more preferably at least 20% by volume, even more preferably at least 25% by volume, and is also more preferably at most 85% by volume, even more preferably at most 80% by volume.

Further, a specific linear carbonate may be combined with a specific amount of ethylene carbonate to thereby markedly improve battery performance.

For example, in case where dimethyl carbonate and ethylmethyl carbonate are selected as the specific linear carbonate, preferably, the amount of ethylene carbonate to be combined is from 15% by volume to 40% by volume, the amount of dimethyl carbonate to be combined is from 20% by volume to 50% by volume, and the amount of ethylmethyl carbonate to be combined is from 20% by volume to 50% by volume. Selecting the amount of the constituent components each falling within the range makes it possible to lower the viscosity of the nonaqueous electrolytic solution to thereby improve the ionic conductivity thereof and thereby provide high output power even at low temperatures, while lowering the low-temperature precipitating temperature of the electrolyte in the solution. Especially preferably, the amount of ethylene carbonate is from 25% by volume to 35% by volume, the amount of dimethyl carbonate is from 30% by volume to 40% by volume, and the amount of ethylmethyl carbonate is from 30% by volume to 40% by volume.

<Cyclic Carbonates with Fluorine Atom>

The fluorine atom-having cyclic carbonate (hereinafter this may be abbreviated as "fluorinated cyclic carbonate) usable as the nonaqueous solvent in the present invention may be any cyclic carbonate having a fluorine atom and is not specifically defined.

The fluorinated cyclic carbonate includes derivatives of a cyclic carbonate having an alkylene group with from 2 to 6 carbon atoms, for example, ethylene carbonate derivatives. The ethylene carbonate derivatives include, for example, fluorinated derivatives of ethylene carbonate or ethylene carbonate substituted with an alkyl group (for example, alkyl group having from 1 to 4 carbon atoms). Above all, preferred are those having from 1 to 8 fluorine atoms.

Concretely, there are mentioned monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methyl ethylene carbonate, 4,4-difluoro-5-methyl ethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dim ethyl ethylene carbonate, 4,4-difluoro-5,5-dimethyl ethylene carbonate, etc.

Above all, more preferred is at least one selected from a group consisting of monofluoroethylene carbonate, 4,4-difluoroethylene carbonate, 4,5-difluoroethylene carbonate and 4,5-difluoro-4,5-dimethylethylene carbonate, from the viewpoint that these can give a high ionic conductivity and can favorably form a surface-protective coating film.

One alone or two or more of fluorinated cyclic carbonates may be used here either singly or as combined in any desired manner and in any desired ratio. Not specifically defined, the amount of the fluorinated cyclic carbonate may be any desired one not markedly detracting from the advantageous effects of the present invention. Preferably, the amount is at least 0.001% by mass in 100% by mass of the nonaqueous electric solution, more preferably at least 0.01% by mass, even more preferably at least 0.1% by mass, and is also preferably at most 85% by mass, more preferably at most 80% by mass, even more preferably at most 75% by mass. The range of the concentration of the fluorinated cyclic carbonate is preferably from 0.001% by mass to 85% by mass, more preferably from 0.01% by mass to 80% by mass, even more preferably from 0.1% by mass to 75% by mass.

The fluorinated cyclic carbonate may be used as the main solvent in the nonaqueous electrolytic solution or as a secondary solvent therein. In case where the fluorinated cyclic carbonate is used as the main solvent, the amount thereof is preferably at least 8% by mass in 100% by mass of the nonaqueous electrolytic solution, more preferably at least 10% by mass, even more preferably at least 12% by mass, and is preferably at most 85% by mass, more preferably at most 80% by mass, even more preferably at most 75% by mass. When the solvent amount falls within the range, then the nonaqueous electrolytic solution secondary battery can readily express a sufficient effect of improving cycle characteristics thereof and can readily prevent the discharge capacity retention rate thereof from lowering. The amount of the fluorinated cyclic carbonate to be used as a secondary solvent is preferably at least 0.001% by mass in 100% by mass of the nonaqueous electrolytic solution, more preferably at least 0.01% by mass, even more preferably at least 0.1% by mass, and is preferably at most 8% by mass, more preferably at most 6% by mass, even more preferably at most 5% by mass. When the solvent amount falls within the range, then the nonaqueous electrolytic solution secondary battery can readily express sufficient output characteristics.

<Linear Carboxylate Esters>

As linear carboxylate esters usable as the nonaqueous solvent in the present invention, there may be mentioned those of such that the total carbon number in the structural formula thereof is from 3 to 7.

Concretely, there are mentioned methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, isopropyl isobutyrate, etc.

Of those, preferred are methyl acetate, ethyl acetate, n-propyl acetate, n-butyl acetate, methyl propionate, ethyl propionate, n-propyl propionate, isopropyl propionate, methyl butyrate, ethyl butyrate, etc., from the viewpoint of improving the ionic conductivity through viscosity reduction.

The amount of the linear carboxylate ester is preferably at least 5% by volume in 100% by volume of the nonaqueous solvent. When the amount is at least 5% by volume, then the electric conductivity of the nonaqueous electrolytic solution can be improved and the large current discharge characteristics of nonaqueous electrolytic solution secondary batteries can be thereby readily improved. Further, the amount of the linear carboxylate ester is preferably at most 80% by volume in 100% by volume of the nonaqueous solvent. When the amount is at most 80% by volume, then the increase in the negative electrode resistance can be prevented from increasing, and the large current discharge characteristics and the cycle characteristics of nonaqueous electrolytic solution secondary batteries can be readily made to fall within a good range. The amount of the linear carboxylate ester to be added is more preferably at least 8% by volume, and is more preferably at most 70% by volume.

<Cyclic Carboxylate Esters>

As cyclic carboxylate esters usable as the nonaqueous solvent in the present invention, there may be mentioned those of such that the total carbon number in the structural formula thereof is from 3 to 12.

Concretely, there are mentioned gamma butyrolactone, gamma valerolactone, gamma caprolactone, epsilon caprolactone, etc. Above all, especially preferred is gamma butyrolactone from the viewpoint of improving the battery characteristics derived from the improvement in the degree of lithium ion dissociation.

The amount of the cyclic carboxylate ester is preferably at least 3% by volume in 100% by volume of the nonaqueous solvent. When the amount is at least 3% by volume, then the electric conductivity of the nonaqueous electrolytic solution can be improved and the large current discharge characteristics of nonaqueous electrolytic solution secondary batteries can be readily improved. Also preferably, the amount of the cyclic carboxylate ester is at most 60% by volume. When the amount is at least 60% by volume, the viscosity of the nonaqueous electrolytic solution can be made to fall within a suitable range, the electric conductivity can be prevented from lowering, the negative electrode resistance can be prevented from increasing, and the large current discharge characteristics of nonaqueous electrolytic solution secondary batteries can be made to fall within a good range. More preferably, the amount of the cyclic carboxylate ester is at least 5% by volume and is also more preferably at most 50% by volume.

<Ether Compounds>

As ether compounds usable as the nonaqueous solvent in the present invention, there may be mentioned linear ethers having from 3 to 10 carbon atoms, and cyclic ethers having from 3 to 6 carbon atoms.

The linear ethers having from 3 to 10 carbon atoms include diethyl ether, di(2-fluoroethyl) ether, di(2,2-difluoroethyl) ether, di(2,2,2-trifluoroethyl) ether, ethyl (2-fluoroethyl) ether, ethyl (2,2,2-trifluoroethyl) ether, ethyl (1,1,2,2-tetrafluoroethyl) ether, (2-fluoroethyl) (2,2,2-trifluoroethyl) ether, (2-fluoroethyl) (1,1,2,2-tetrafluoroethyl) ether, (2,2,2-trifluoroethyl) (1,1,2,2-tetrafluoroethyl) ether, ethyl n-propyl ether, ethyl (3-fluoro-n-propyl) ether, ethyl (3,3,3-trifluoro-n-propyl) ether, ethyl (2,2,3,3-tetrafluoro-n-propyl) ether, ethyl (2,2,3,3,3-pentafluoro-n-propyl) ether, 2-fluoroethyl n-propyl ether, (2-fluoroethyl) (3-fluoro-n-propyl) ether, (2-fluoroethyl) (3,3,3-trifluoro-n-propyl) ether, (2-fluoroethyl) (2,2,3,3-tetrafluoro-n-propyl) ether, (2-fluoroethyl) (2,2,3,3,3-pentafluoro-n-propyl) ether, 2,2,2-trifluoroethyl n-propyl ether, (2,2,2-trifluoroethyl) (3-fluoro-n-propyl) ether, (2,2,2-trifluoroethyl) (3,3,3-trifluoro-n-propyl) ether, (2,2,2-trifluoroethyl) (2,2,3,3-tetrafluoro-n-propyl) ether, (2,2,2-trifluoroethyl) (2,2,3,3,3-pentafluoro-n-propyl) ether, 1,1,2,2-tetrafluoroethyl n-propyl ether, (1,1,2,2-tetrafluoroethyl) (3-fluoro-n-propyl) ether, (1,1,2,2-tetrafluoroethyl) (3,3,3-trifluoro-n-propyl) ether, (1,1,2,2-tetrafluoroethyl) (2,2,3,3-tetrafluoro-n-propyl) ether, (1,1,2,2-tetrafluoroethyl) (2,2,3,3,3-pentafluoro-n-propyl) ether, di-n-propyl ether, (n-propyl) (3-fluoro-n-propyl) ether, (n-propyl) (3,3,3-trifluoro-n-propyl) ether, (n-propyl) (2,2,3,3-tetrafluoro-n-propyl) ether, (n-propyl) (2,2,3,3,3-pentafluoro-n-propyl) ether, di(3-fluoro-n-propyl) ether, (3-fluoro-n-propyl) (3,3,3-trifluoro-n-propyl) ether, (3-fluoro-n-propyl) (2,2,3,3-tetrafluoro-n-propyl) ether, (3-fluoro-n-propyl) (2,2,3,3,3-pentafluoro-n-propyl) ether, di(3,3,3-trifluoro-n-propyl) ether, (3,3,3-trifluoro-n-propyl) (2,2,3,3-tetrafluoro-n-propyl) ether, (3,3,3-trifluoro-n-propyl) (2,2,3,3,3-pentafluoro-n-propyl) ether, di(2,2,3,3-tetrafluoro-n-propyl) ether, (2,2,3,3-tetrafluoro-n-propyl) (2,2,3,3,3-pentafluoro-n-propyl) ether, di(2,2,3,3,3-pentafluoro-n-propyl) ether, di-n-butyl ether, dimethoxymethane, methoxyethoxymethane, methoxy(2-fluoroethoxy)methane, methoxy(2,2,2-trifluoroethoxy)methane, methoxy(1,1,2,2-tetrafluoroethoxy)methane, diethoxymethane, ethoxy(2-fluoroethoxy)methane, ethoxy(2,2,2-trifluoroethoxy)methane, ethoxy(1,1,2,2-tetrafluoroethoxy)methane, di(2-fluoroethoxy)methane, (2-fluoroethoxy)(2,2,2-trifluoroethoxy)methane, (2-fluoroethoxy)(1,1,2,2-tetrafluoroethoxy)methane, di(2,2,2-trifluoroethoxy)methane, (2,2,2-trifluoroethoxy)(1,1,2,2-tetrafluoroethoxy)methane, di(1,1,2,2-tetrafluoroethoxy)methane, dimethoxyethane, methoxyethoxyethane, methoxy(2-fluoroethoxy)ethane, methoxy(2,2,2-trifluoroethoxy)ethane, methoxy(1,1,2,2-tetrafluoroethoxy)ethane, diethoxyethane, ethoxy(2-fluoroethoxy)ethane, ethoxy (2,2,2-trifluoroethoxy)ethane, ethoxy(1,1,2,2-tetrafluroethoxy)ethane, di(2-fluoroethoxy)ethane, (2-fluoroethoxy)(2,2,2-trifluoroethoxy)ethane, (2-fluoroethoxy)(1,1,2,2-tetrafluoroethoxy)ethane, di(2,2,2-trifluoroethoxy)ethane, (2,2,2-trifluoroethoxy)(1,1,2,2-tetrafluoroethoxy)ethane, di(1,1,2,2-tetrafluoroethoxy)ethane, ethyleneglycol di-n-propyl ether, ethyleneglycol di-n-butyl ether, diethyleneglycol dimethyl ether, etc.

The cyclic ethers having from 3 to 6 carbon atoms include tetrahydrofuran, 2-methyltetrahydrofuran, 3-methyltetrahydrofuran, 1,3-dioxane, 2-methyl-1,3-dioxane, 4-methyl-1,3-dioxane, 1,4-dioxane and the like, and their fluorinated compounds.

Above all, preferred are dimethoxyethane, diethoxymethane, ethoxymethoxymethane, ethylene glycol di-n-propyl ether, ethylene glycol di-n-butyl ether and diethyleneglycol dimethyl ether from the viewpoint that their solvation capability with lithium ions is high and they improve ionic dissociability. More preferred are dimethoxymethane, diethoxyethane and ethoxymethoxymethane as securing low viscosity and high ionic conductivity.

The amount of the ether compound to be added is, in general, preferably at least 3% by volume in 100% by volume of the nonaqueous solvent, more preferably at least 4% by volume, even more preferably at least 5% by volume, and is preferably at most 70% by volume, more preferably at most 65% by volume, even more preferably at most 60% by volume. Falling within the range, the compound can readily secure the effect of the linear ether for improving the ionic conductivity derived from the improvement in the degree of lithium ion dissociation and from the viscosity reduction, and in case where the negative electrode active material is a carbonaceous material, the risk of capacity reduction through co-insertion of linear ether along with lithium ion into electrode can be readily evaded.

<Sulfone Compounds>

As sulfone compounds usable as the nonaqueous solvent in the present invention, there may be mentioned cyclic sulfones having from 3 to 6 carbon atoms, and linear sulfones having from 2 to 6 carbon atoms. Preferably, the number of the sulfonyl groups in one molecule is 1 or 2.

The cyclic sulfones include trimethylene sulfones, tetramethylene sulfones and hexamethylene sulfones that are monosulfone compounds; trimethylene disulfones, tetramethylene disulfones and hexamethylene disulfones that are disulfone compounds, etc. Above all, more preferred are tetramethylene sulfones, tetramethylene disulfones, hexamethylene sulfones and hexamethylene disulfones, from the viewpoint of the dielectric constant and the viscosity of the electrolytic solution; and even more preferred are tetramethylene sulfones (sulfolanes).

As the sulfolanes, preferred is at least one of sulfolane and sulfolane derivatives (hereinafter these may be abbreviated as "sulfolanes" including sulfolane). As the sulfolane derivatives, preferred are those in which at least one hydrogen atom bonding to the carbon atom that constitutes the sulfolane ring is substituted with a fluorine atom or an alkyl group.

Above all, preferred are 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-di fluoromethylsulfolane, 2-trifluoromethyl sulfolane, 3-trifluoromethylsulfolane, 2-fluoro-3-(trifluoromethyl) sulfolane, 3-fluoro-3-(trifluoromehtyl) sulfolane, 4-fluoro-3-(trifluromethyl)sulfolane, 5-fluoro-3-(trifluoromethyl)sulfolane and the like, as securing high ion conductivity and high input-output performance.

The linear sulfones include dimethyl sulfone, ethylmethyl sulfone, diethyl sulfone, n-propylmethyl sulfone, n-propylethyl sulfone, di-n-propyl sulfone, isopropylmethyl sulfone, isopropylethyl sulfone, diisopropyl sulfone, n-butylmethyl sulfone, n-butylethyl sulfone, t-butylmethyl sulfone, t-butylethyl sulfone, monofluoromethylmethyl sulfone, difluoromethylmethyl sulfone, trifluoromethylmethyl sulfone, monofluoroethylmethyl sulfone, difluoroethylmethyl sulfone, trifluoroethylmethyl sulfone, pentafluoroethylmethyl sulfone, ethylmonofluoromethyl sulfone, ethyldifluoromethyl sulfone, ethyltrifluoromethyl sulfone, perfluoroethylmethyl sulfone, ethyltrifluoroethyl sulfone, ethylpentafluoroethyl sulfone, di(trifluoroethyl) sulfone, perfluorodiethyl sulfone, fluoromethyl-n-propyl sulfone, difluoromethyl-n-propyl sulfone, trifluoromethyl-n-propyl sulfone, fluoromethylisopropyl sulfone, difluoromethylisopropyl sulfone, trifluoromethylisopropyl sulfone, trifluoroethyl-n-propyl sulfone, trifluoroethylisopropyl sulfone, pentafluoroethyl-n-propyl sulfone, pentafluoroethylisopropyl sulfone, trifluoroethyl-n-butyl sulfone, trifluoroethyl-t-butyl sulfone, pentafluoroethyl-n-butyl sulfone, pentafluoroethyl-t-butyl sulfone, etc.

Above all, preferred are dimethyl sulfone, ethylmethyl sulfone, diethyl sulfone, n-propylmethyl sulfone, isopropylmethyl sulfone, n-butylmethyl sulfone, t-butylmethyl sulfone, monofluoromethylmethyl sulfone, difluoromethylmethyl sulfone, trifluoromethylmethyl sulfone, monofluoroethylmethyl sulfone, difluoroethylmethyl sulfone, trifluoroethylmethyl sulfone, pentafluoroethylmethyl sulfone, ethylmonofluoromethyl sulfone, ethyldifluoromethyl sulfone, ethyltrifluoromethyl sulfone, ethyltrifluoroethyl sulfone, ethylpentafluoroethyl sulfone, trifluoromethyl-n-propyl sulfone, trifluoromethylisopropyl sulfone, trifluoroethyl-n-butyl sulfone, trifluoroethyl-t-butyl sulfone, triuoromethyl-n-butyl sulfone, trifluoromethyl-t-butyl sulfone and the like, as securing high ion conductivity and high input-output performance.

The amount of the sulfone compound is preferably at least 0.3% by volume in 100% by volume of the nonaqueous solvent, and is preferably at most 80% by volume. Falling within the range, the compound could readily secure the effect of improving durability such as cycle characteristics, storage characteristics and the like, and in addition, the viscosity of the nonaqueous electrolytic solution could be made to fall within a suitable range and the electric conductivity thereof could be prevented from lowering. Further, in case where nonaqueous electrolytic solution secondary batteries are charged/discharged with a high-current density, a risk of reduction in the charge/discharge capacity retention rate could be readily evaded. More preferably, the amount of the sulfone compound to be added is at least 0.5% by volume, even more preferably at least 1% by volume, and is more preferably at most 75% by volume, even more preferably at most 70% by volume.

<1-4. Auxiliary Agent>

In the present invention, auxiliary agents mentioned below may be incorporated in the nonaqueous solvent. Insomuch not markedly detracting from the advantageous effects of the present invention, however, the agents are not limited to those exemplifications.

<Cyclic Carbonates Having Carbon-Carbon Unsaturated Bond>

A cyclic carbonate having a carbon-carbon unsaturated bond (hereinafter this may be abbreviated as "unsaturated cyclic carbonate") may be incorporated in the nonaqueous electrolytic solution of the present invention for forming a coating film on the surface of the negative electrode in the battery with the nonaqueous electrolytic solution and for prolonging the life of the battery.

Not specifically defined, the cyclic carbonate having a carbon-carbon unsaturated bond may be any cyclic carbonate having a carbon-carbon double bond, and any such carbonate having a carbon-carbon unsaturated bond can be used here. Cyclic carbonates with a substituent having an aromatic ring are also within the scope of the cyclic carbonate having a carbon-carbon unsaturated bond.

The unsaturated cyclic carbonate includes vinylene carbonates, ethylene carbonates substituted with a substituent having an aromatic ring or a carbon-carbon unsaturated bond, phenyl carbonates, vinyl carbonates, allyl carbonates, etc.

The vinylene carbonates include vinylene carbonate, methylvinylene carbonate, 4,5-dimethylvinylene carbonate, phenylvinylene carbonate, 4,5-diphenylvinylene carbonate, vinylvinylene carbonate, allylvinylene carbonate, etc.

Specific examples of the ethylene carbonates substituted with a substituent having an aromatic ring or a carbon-carbon unsaturated bond include vinylethylene carbonate, 4,5-divinylethylene carbonate, phenyl ethylene carbonate, 4,5-diphenylethylene carbonate, ethynylethylene carbonate, 4,5-diethynylethylene carbonate, etc.

Above all, preferred are vinylene carbonates and ethylene carbonates substituted with a substituent having an aromatic ring or a carbon-carbon unsaturated bond; and especially preferred for use herein are vinylene carbonate, 4,5-diphenylvinylene carbonate, 4,5-dimethylvinylene carbonate, vinyl ethylene carbonate and ethynylethylene carbonate, as capable of forming a stable interface-protective coating film.

Not specifically defined, the molecular weight of the unsaturated cyclic carbonate may be any one not markedly detracting from the advantageous effects of the present invention. The molecular weight is preferably from 50 to 250. Falling within the range, the unsaturated cyclic carbonate can readily secure the solubility thereof in nonaqueous electrolytic solutions and can sufficiently express the advantageous effects of the present invention with ease.

More preferably, the molecular weight of the unsaturated cyclic carbonate is at least 80 and is more preferably at most 150. The method for producing the unsaturated cyclic carbonate is not specifically defined, and any known method may be suitably selected and employed here for the production.

One alone or two or more different types of unsaturated cyclic carbonates may be used here either singly or as combined in any desired manner and in any desired ratio. Not specifically defined, the amount of the unsaturated cyclic carbonate to be added may be any one not markedly detracting from the advantageous effects of the present invention. The amount of the unsaturated cyclic carbonate is preferably at least 0.001% by mass in 100% by mass of the nonaqueous electrolytic solution, more preferably at least 0.01% by mass, even more preferably at least 0.1% by mass, still more preferably at least 0.2% by mass, and is preferably at most 10% by mass, more preferably at most 8% by mass, even more preferably at most 5% by mass. The concentration range of the unsaturated cyclic carbonate is preferably from 0.001% by mass to 10% by mass, more preferably from 0.001% by mass to 8% by mass, even more preferably from 0.001% by mass to 5% by mass.

Falling within the range, the nonaqueous electrolytic solution secondary battery with the compound can readily express a sufficient effect of improving the cycle characteristics thereof, and can readily evade the risks of worsening the high-temperature storage characteristics thereof, increasing the gas generation amount and lowering the discharge capacity retention rate.

<Fluorinated Unsaturated Cyclic Carbonates>

As fluorinated cyclic carbonates, also preferred for use herein are cyclic carbonates having an unsaturated bond and a fluorine atom (hereinafter this may be abbreviated as "fluorinated unsaturated cyclic carbonate"). The fluorinated unsaturated cyclic carbonates are not specifically defined. Above all, preferred are those having one or two fluorine atoms.

The fluorinated unsaturated cyclic carbonates include vinylene carbonate derivatives, ethylene carbonate derivatives substituted with a substituent having an aromatic ring or a carbon-carbon unsaturated bon, etc.

The vinylene carbonate derivatives include 4-fluorovinylene carbonate, 4-fluoro-5-methylvinylene carbonate, 4-fluoro-5-phenylvinylene carbonate, 4,5-difluoroethylene carbonate, etc.

The ethylene carbonate derivatives substituted with a substituent having an aromatic ring or a carbon-carbon unsaturated bond include 4-fluoro-4-vinylethylene carbonate, 4-fluoro-5-vinylethylene carbonate, 4,4-difluoro-4-vinylethylene carbonate, 4,5-difluoro-4-vinylethylene carbonate, 4-fluoro-4,5-divinylethylene carbonate, 4,5-difluoro-4,5-divinylethylene carbonate, 4-fluoro-4-phenylethylene carbonate, 4-fluoro-5-phenylethylene carbonate, 4,4-difluoro-5-phenylethylene carbonate, 4,5-difluoro-4-phenylethylene carbonate, etc.

Not specifically defined, the molecular weight of the fluorinated unsaturated cyclic carbonate may be any one not markedly detracting from the advantageous effects of the present invention. Preferably, the molecular weight is from 50 to 250. Falling within the range, the fluorinated cyclic carbonate can readily secure the solubility thereof in nonaqueous electrolytic solutions and the present invention can readily express the advantageous effects thereof. Not also specifically defined, the production method for the fluorinated unsaturated cyclic carbonate may be selected from any known methods in any desired manner. More preferably, the molecular weight is at least 80 and is also more preferably at most 150.

One alone or two or more different types of fluorinated unsaturated cyclic carbonates may be used here either singly or as combined in any desired manner and in any desired ratio. Not specifically defined, the amount of the fluorinated unsaturated cyclic carbonate to be added here may be any one not markedly detracting from the advantageous effects of the present invention. The amount of the fluorinated unsaturated cyclic carbonate is preferably at least 0.01% by mass in 100% by mass of the nonaqueous electrolytic solution, and is preferably at most 5% by mass. Falling within the range, the nonaqueous electrolytic solution secondary battery can readily express the effect of improving the cycle characteristics thereof and can readily evade the risks of worsening the high-temperature storage characteristics thereof, increasing the gas generation amount and lowering the discharge capacity retention rate. More preferably, the amount of the fluorinated unsaturated cyclic carbonate is at least 0.1% by mass, even more preferably at least 0.2% by mass, and is more preferably at most 4% by mass, even more preferably at most 3% by mass.

<Cyclic Sulfonate Ester Compounds>

Cyclic sulfonate ester compounds usable in the nonaqueous electrolytic solution of the present invention are not specifically defined in point of the type thereof, but preferred are compounds represented by the following general formula (1).

[Chem. 1]

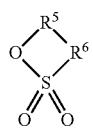

(1)

In the formula, $R^1$ and $R^2$ each independently represent an organic group consisting of at least one atom selected from a group of a carbon atom, a hydrogen atom, a nitrogen atom, an oxygen atom, a sulfur atom, a phosphorus atom and a halogen atom; and $R^1$ and $R^2$ each may contain an unsaturated bond along with —O—SO$_2$—.

Preferably, $R^1$ and $R^2$ each are an organic group consisting of a carbon atom, a hydrogen atom, an oxygen atom and a sulfur atom, more preferably an organic group having a hydrocarbon group with from 1 to 3 carbon atoms and —O—SO$_2$—.

Not specifically defined, the molecular weight of the cyclic sulfonate ester compound may be any one not markedly detracting from the advantageous effects of the present invention. The molecular weight is preferably at least 100 and is preferably at most 250. Falling within the range, the cyclic sulfonate ester compound can readily secure the solubility thereof in nonaqueous electrolytic solutions and the present invention can readily express the advantageous effects thereof. Not also specifically defined, the production method for the cyclic sulfonate ester compound may be selected from any known methods in any desired manner.

Specific examples of the compounds represented by the general formula (1) include, for example:
sultone compounds, such as 1,3-propanesultone,
1-fluoro-1,3-propanesultone,
2-fluoro-1,3-propanesultone, 3-fluoro-1,3-propanesultone,
1-methyl-1,3-propanesultone,
2-methyl-1,3-propanesultone,
3-methyl-1,3-propanesultone,
1-propene-1,3-sultone,
2-propene-1,3-sultone,
1-fluoro-1-propene-1,3-sultone,
2-fluoro-1-propene-1,3-sultone,
3-fluoro-1-propene-1,3-sultone,
1-fluoro-2-propene-1,3-sultone,
2-fluoro-2-propene-1,3-sultone,
3-fluoro-2-propene-1,3-sultone,
1-methyl-1-propene-1,3-sultone,
2-methyl-1-propene-1,3-sultone,
3-methyl-1-propene-1,3-sultone,
1-methyl-2-propene-1,3-sultone,
2-methyl-2-propene-1,3-sultone,
3-methyl-2-propene-1,3-sultone,
1,4-butanesultone,
1-fluoro-1,4-butanesultone,
2-fluoro-1,4-butanesultone,
3-fluoro-1,4-butanesultone,
4-fluoro-1,4-butanesultone,
1-methyl-1,4-butanesultone,
2-methyl-1,4-butanesultone,
3-methyl-1,4-butanesultone,
4-methyl-1,4-butanesultone,
1-butene-1,4-sultone,
2-butene-1,4-sultone,
3-butene-1,4-sultone,
1-fluoro-1-butene-1,4-sultone,
2-fluoro-1-butene-1,4-sultone,
3-fluoro-1-butene-1,4-sultone,
4-fluoro-1-butene-1,4-sultone,
1-fluoro-2-butene-1,4-sultone,
2-fluoro-2-butene-1,4-sultone,
3-fluoro-2-butene-1,4-sultone,
4-fluoro-2-butene-1,4-sultone,
1-fluoro-3-butene-1,4-sultone,
2-fluoro-3-butene-1,4-sultone,
3-fluoro-3-butene-1,4-sultone,
4-fluoro-3-butene-1,4-sultone,
1-methyl-1-butene-1,4-sultone,
2-methyl-1-butene-1,4-sultone,
3-methyl-1-butene-1,4-sultone,
4-methyl-1-butene-1,4-sultone,
1-methyl-2-butene-1,4-sultone,
2-methyl-2-butene-1,4-sultone,
3-methyl-2-butene-1,4-sultone,
4-methyl-2-butene-1,4-sultone,
1-methyl-3-butene-1,4-sultone,
2-methyl-3-butene-1,4-sultone,
3-methyl-3-butene-1,4-sultone,
4-methyl-3-butene-1,4-sultone,
1,5-pentanesultone,
1-fluoro-1,5-pentanesultone,
2-fluoro-1,5-pentanesultone,
3-fluoro-1,5-pentanesultone,
4-fluoro-1,5-pentanesultone,
5-fluoro-1,5-pentanesultone,
1-methyl-1,5-pentanesultone,
2-methyl-1,5-pentanesultone,
3-methyl-1,5-pentanesultone,
4-methyl-1,5-pentanesultone,
5-methyl-1,5-pentanesultone,
1-pentene-1,5-sultone,
2-pentene-1,5-sultone,
3-pentene-1,5-sultone,
4-pentene-1,5-sultone,
1-fluoro-1-pentene-1,5-sultone,
2-fluoro-1-pentene-1,5-sultone,
3-fluoro-1-pentene-1,5-sultone,
4-fluoro-1-pentene-1,5-sultone,
5-fluoro-1-pentene-1,5-sultone,
1-fluoro-2-pentene-1,5-sultone,
2-fluoro-2-pentene-1,5-sultone,
3-fluoro-2-pentene-1,5-sultone,
4-fluoro-2-pentene-1,5-sultone,
5-fluoro-2-pentene-1,5-sultone,
1-fluoro-3-pentene-1,5-sultone,
2-fluoro-3-pentene-1,5-sultone,
3-fluoro-3-pentene-1,5-sultone,
4-fluoro-3-pentene-1,5-sultone,
5-fluoro-3-pentene-1,5-sultone,
1-fluoro-4-pentene-1,5-sultone,
2-fluoro-4-pentene-1,5-sultone,
3-fluoro-4-pentene-1,5-sultone,
4-fluoro-4-pentene-1,5-sultone,
5-fluoro-4-pentene-1,5-sultone,
1-methyl-1-pentene-1,5-sultone,
2-methyl-1-pentene-1,5-sultone,
3-methyl-1-pentene-1,5-sultone,
4-methyl-1-pentene-1,5-sultone,
5-methyl-1-pentene-1,5-sultone,
1-methyl-2-pentene-1,5-sultone,
2-methyl-2-pentene-1,5-sultone,
3-methyl-2-pentene-1,5-sultone,
4-methyl-2-pentene-1,5-sultone,
5-methyl-2-pentene-1,5-sultone,
1-methyl-3-pentene-1,5-sultone,
2-methyl-3-pentene-1,5-sultone,
3-methyl-3-pentene-1,5-sultone,
4-methyl-3-pentene-1,5-sultone,
5-methyl-3-pentene-1,5-sultone,
1-methyl-4-pentene-1,5-sultone,
2-methyl-4-pentene-1,5-sultone,
3-methyl-4-pentene-1,5-sultone,
4-methyl-4-pentene-1,5-sultone,
5-methyl-4-pentene-1,5-sultone, etc.;
sulfate compounds, such as methylene sulfate, ethylene sulfate,
propylene sulfate, etc.;
disulfonate compounds, such as methylenemethane disulfonate
ethylenemethane disulfonate, etc.;
nitrogen-containing compounds, such as 1,2,3-oxathiazolidine-2,2-dioxide,
3-methyl-1,2,3-oxathiazolidine-2,2-dioxide,
3H-1,2,3-oxathiazole-2,2-dioxide,
5H-1,2,3-oxathiazole-2,2-dioxide,
1,2,4-oxathiazolidine-2,2-dioxide,
4-methyl-1,2,4-oxathiazolidine-2,2-dioxide,
3H-1,2,4-oxathiazole-2,2-dioxide,
5H-1,2,4-oxathiazole-2,2-dioxide,
1,2,5-oxathiazolidine-2,2-dioxide,
5-methyl-1,2,5-oxathiazolidine-2,2-dioxide,
3H-1,2,5-oxathiazole-2,2-dioxide,
5H-1,2,5-oxathiazole-2,2-dioxide,
1,2,3-oxathiazinane-2,2-dioxide,
3-methyl-1,2,3-oxathiazinane-2,2-dioxide,
5,6-dihydro-1,2,3-oxathiazine-2,2-dioxide,
1,2,4-oxathiazinane-2,2-dioxide,
4-methyl-1,2,4-oxathiazinane-2,2-dioxide,
5,6-dihydro-1,2,4-oxathiazine-2,2-dioxide, 3,6-dihydro-1,2,4-oxathiazine-2,2-dioxide,
3,4-dihydro-1,2,4-oxathiazine-2,2-dioxide,
1,2,5-oxathiazinane-2,2-dioxide,
5-methyl-1,2,5-oxathiazinane-2,2-dioxide,
5,6-dihydro-1,2,5-oxathiazine-2,2-dioxide,
3,6-dihydro-1,2,5-oxathiazine-2,2-dioxide,
3,4-dihydro-1,2,5-oxathiazine-2,2-dioxide,
1,2,6-oxathiazinane-2,2-dioxide,
6-methyl-1,2,6-oxathiazinane-2,2-dioxide,
5,6-dihydro-1,2,6-oxathiazine-2,2-dioxide,
3,4-dihydro-1,2,6-oxathiazine-2,2-dioxide,
5,6-dihydro-1,2,6-oxathiazine-2,2-dioxide, etc.;
phosphorus-containing compounds, such as 1,2,3-oxathiaphoslane-2,2-dioxide,
3-methyl-1,2,3-oxathiaphoslane-2,2-dioxide,
3-methyl-1,2,3-oxathiaphoslane-2,2,3-trioxide,
3-methoxy-1,2,3-oxathiaphoslane-2,2,3-trioxide,
1,2,4-oxathiaphoslane-2,2-dioxide,
4-methyl-1,2,4-oxathiaphoslane-2,2-dioxide,
4-methyl-1,2,4-oxathiaphoslane-2,2,4-trioxide,
4-methoxy-1,2,4-oxathiaphoslane-2,2,4-trioxide,
1,2,5-oxathiaphoslane-2,2-dioxide,
5-methyl-1,2,5-oxathiaphoslane-2,2-dioxide,
5-methyl-1,2,5-oxathiaphoslane-2,2,5-trioxide,
5-methoxy-1,2,5-oxathiaphoslane-2,2,5-trioxide,
1,2,3-oxathiaphosphinane-2,2-dioxide,
3-methyl-1,2,3-oxathiaphosphinane-2,2-dioxide,
3-methyl-1,2,3-oxathiaphosphinane-2,2,3-trioxide,
3-methoxy-1,2,3-oxathiaphosphinane-2,2,3-trioxide,
1,2,4-oxathiaphosphinane-2,2-dioxide,
4-methyl-1,2,4-oxathiaphosphinane-2,2-dioxide,
4-methyl-1,2,4-oxathiaphosphinane-2,2,3-trioxide,
4-methyl-1,5,2,4-dioxathiaphosphinane-2,4-dioxide,
4-methoxy-1,5,2,4-di oxathiaphosphinane-2,4-dioxide,
3-methoxy-1,2,4-oxathiaphosphinane-2,2,3-trioxide,
1,2,5-oxathiaphosphinane-2,2-dioxide,
5-methyl-1,2,5-oxathiaphosphinane-2,2-dioxide,
5-methyl-1,2,5-oxathiaphosphinane-2,2,3-trioxide,
5-methoxy-1,2,5-oxathiaphosphinane-2,2,3-trioxide,
1,2,6-oxathiaphosphinane-2,2-dioxide,
6-methyl-1,2,6-oxathiaphosphinane-2,2-dioxide,
6-methyl-1,2,6-oxathiaphosphinane-2,2,3-trioxide,
6-methoxy-1,2,6-oxathiaphosphinane-2,2-dioxide, etc.

Of those:
preferred are 1,3-propanesultone, 1-fluoro-1,3-propanesultone, 2-fluoro-1,3-propanesultone, 3-fluoro-1,3-propanesultone, 1-propene-1,3-sultone, 1-fluoro-1-propene-1,3-sultone, 2-fluoro-1-propene-1,3-sultone, 3-fluoro-1-propene-1,3-sultone, 1,4-butanesultone, methylenemethane disulfonate and ethylenemethane disulfonate from the viewpoint of improving storage characteristics; and more preferred are 1,3-propanesultone, 1-fluoro-1,3-propanesultone, 2-fluoro-1,3-propanesultone, 3-fluoro-1,3-propanesultone and 1-propene-1,3-sultone.

One alone or two or more cyclic sulfonate ester compounds may be used here either singly or as combined in any desired manner and in any desired ratio. Not specifically defined, the amount of the cyclic sulfonate ester compound in the entire nonaqueous electrolytic solution of the present invention may be any one not markedly detracting from the advantageous effects of the present invention. In general, however, the compound is contained in the nonaqueous electrolytic solution of the present invention in an amount of at least 0.001% by mass, preferably at least 0.1% by mass, more preferably at least 0.3% by mass, and is typically in an amount of at most 10% by mass, preferably at most 5% by mass, even more preferably at most 3% by mass. When the concentration satisfies the above-mentioned range, then the effects of output characteristics, load characteristics, low-temperature characteristics, cycl e characteristics, high-temperature storage characteristics and others could be bettered more.

<Compounds Having Cyano Group>

Not specifically defined in point of the type thereof, compounds having a cyano group for use in the nonaqueous electrolytic solution of the present invention are may be any ones having a cyano group in the molecule, but preferred are compounds represented by the following general formula (2).

[Chem. 2]

(2)

(In the formula, T represents an organic group constituting of atoms selected from a group of a carbon atom, a hydrogen atom, a nitrogen atom, an oxygen atom, a sulfur atom, a phosphorus atom and a halogen atom; U represents a V-valent organic group optionally having a substituent and having from 1 to 10 carbon atoms. V indicates an integer of 1 or more, and when V is 2 or more, then T's may be the same or different.)

Not specifically defined, the molecular weight of the compound having a cyano group may be any one not markedly detracting from the advantageous effects of the present invention. Preferably, the molecular weight is 50 or more, more preferably 80 or more, even more preferably 100 or more, and is preferably 200 or less. Falling within the range, the compound having a cyano group can secure the solubility thereof in nonaqueous electrolytic solutions and the present invention can therefore readily express the advantageous effects thereof. The production method for the compound having a cyano group is not specifically defined, for which any known method may be selected in any desired manner.

Specific examples of the compounds represented by the general formula (2) include, for example, the following:

Compounds having at least one cyano group, such as acetonitrile, propionitrile, butyronitrile, isobutyronitrile, valeronitrile, isovaleronitrile, lauronitrile, 2-methylbutyronitrile, 2,2-dimethylbutyronitrile, hexanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, 2-hexenenitrile, fluoroacetonitrile, difluoroacetonitrile, trifluoroacetonitrile, 2-fluoropropionitrile, 3-fluoropropionitrile, 2,2-difluoropropionitrile, 2,3-difluoropropionitrile, 3,3-difluoropropionitrile, 2,2,3-trifluoropropionitrile, 3,3,3-trifluoropropionitrile, 3,3'-oxydipropionitrile, 3,3'-thiodipropionitrile, 1,2,3-propanetricarbonitrile, 1,3,5-pentanetricarbonitrile, pentafluoropropionitrile, etc.;

Compounds having two cyano groups, such as malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, i-propylmalononitrile, t-butylmlononitrile, methyl succinonitrile, 2,2-dimethyl succinonitrile, 2,3-dimethylsuccinonitrile, trimethylsuccinonitrile, tetramethylsuccinonitrile, 3,3'-(ethylenedioxy)dipropionitrile, 3,3'-(ethylenedithio)dipropionitrile, etc.;

Compounds having three cyano groups, such as 1,2,3-tris (2-cyanoethoxy)propane, tris(2-cyanoethyl)amine, etc.;

Cyanate compounds, such as methyl cyanate, ethyl cyanate, propyl cyanate, butyl cyanate, pentyl cyanate, hexyl cyanate, heptyl cyanate, etc.;

Sulfur-containing compounds, such as methyl thiocyanate, ethyl thiocyanate, propyl thiocyanate, butyl thiocyanate, pentyl thiocyanate, hexyl thiocyanate, heptyl thiocyanate, methanesulfonyl cyanide, ethanesulfonyl cyanide, propanesulfonyl cyanide, butanesulfonyl cyanide, pentanesulfonyl cyanide, hexanesulfonyl cyanide, heptanesulfonyl cyanide, methylsulfurocyanidate, ethyl sulfurocyanidate, propyl sulfurocyanidate, butylsulfurocy anidate, pentylsulfurocyanidate, hexyl sulfurocyanidate, heptylsulfurocyanidate, etc.;

Phosphorus-containing compounds, such as cyanodimethyl phosphine, cyanodimethyl phosphine oxide, methyl cyanodimethylphosphinate, methyl cyanomethylphosphinite, dimethylphosphinic acid cyanide, dimethylphosphinous acid cyanide, dimethyl cyanophosphonate, dimethyl cyanophosphonite, cyanomethyl methylphosphonate, cyanomethyl methylphosphinite, cyanodimethyl phosphate, cyanodimethyl phosphite, etc.

Of those: preferred are acetonitrile, propionitrile, butyronitrile, i-butyronitrile, valeronitrile, i-valeronitrile, lauronitrile, crotononitrile, 3-methylcrotononitrile, malononitrile, succinonitrile, glutaronitrile, adiponitrile, pimelonitrile, suberonitrile, azelanitrile, sebaconitrile, undecanedinitrile and dodecanedinitrile from the viewpoint of improving storage characteristics; and more preferred are compounds having two cyano groups, such as malononitrile, succinonitrile, glutaronitrile, adiponitrile, pimelonitrile, suberonitrile, azelanitrile, sebaconitrile, undecanedinitrile, dodecanedinitrile, etc.

One alone or two or more compounds having a cyano group may be used here either singly or as combined in any desired manner and in any desired ratio. Not specifically defined, the amount of the cyano group-having compound in the entire nonaqueous electrolytic solution of the present invention may be any one not markedly detracting from the advantageous effects of the present invention. In general, however, the compound is contained in the nonaqueous electrolytic solution of the present invention in an amount of at least 0.001% by mass, preferably at least 0.1% by mass, more preferably at least 0.3% by mass, and is typically in an amount of at most 10% by mass, preferably at most 5% by mass, even more preferably at most 3% by mass. When the concentration satisfies the above-mentioned range, then the effects of output characteristics, load characteristics, low-temperature characteristics, cycle characteristics, high-temperature storage characteristics and others could be bettered more.

<Diisocyanate Compounds>

Not specifically defined, diisocyanate compounds usable in the nonaqueous electrolytic solution of the present invention may be any compound having two isocyanate groups in the molecule, but preferred are those represented by the following general formula (3).

[Chem. 3]

NCO—C—NCO (3)

(In the formula, X represents a hydrocarbon group optionally substituted with fluorine and having from 1 to 16 carbon atoms.)

In the above-mentioned general formula (3), X is a hydrocarbon group optionally substituted with fluorine and having from 1 to 16 carbon atoms. The carbon number of X is preferably at least 2, more preferably at least 3, even more preferably at least 4, and is preferably at most 14, more preferably at most 12, even more preferably at most 10, most preferably at most 8. The type of X is not specifically defined so far as it is a hydrocarbon group. X may be any of an aliphatic linear alkylene group, an aliphatic cyclic alkylene group or an aromatic ring-containing hydrocarbon group, but is preferably an aliphatic linear alkylene group or an aliphatic cyclic alkylene group.

Specific examples of the diisocyanate for use in the present invention are mentioned below.

Linear polymethylene diisocyanates such as ethylene diisocyanate, trimethylene diisocyanate, tetramethylene diisocyanate, pentamethylene diisocyanate, hexamethylene diisocyanate, heptamethylene diisocyanate, octamethylene diisocyanate, decamethylene diisocyanate, dodecamethylene diisocyanate, tetradecamethylene diisocyanate, etc.;

Branched alkylene diisocyanates, such as 1-methylhexamethylene diisocyanate, 2-methylhexamethylene diisocyanate, 3-methylhexamethylene diisocyanate, 1,1-dimethylhexamethylene diisocyanate, 1,2-dimethylhexamethylene diisocyanate, 1,3-dimethylhexamethylene diisocyanate, 1,4-dimethylhexamethylene diisocyanate, 1,5-dimethylhexamethylene diisocyanate, 1,6-dimethylhexamethylene diisocyanate, 1,2,3-trimethylhexamethylene diisocyanate, etc.;

Diisocyanatoalkenes such as 1,4-diisocyanato-2-butene, 1,5-diisocyanato-2-pentene, 1,5-diisocyanato-3-pentene, 1,6-diisocyanato-2-hexene, 1,6-diisocyanato-3-hexene, 1,8-diisocyanato-2-octente, 1,8-diisocyanato-3-octene, 1,8-diisocyanato-4-octene, etc.;

Fluorine-substituted diisocyanatoalkanes such as 1,3-diisocyanato-2-fluoropropane, 1,3-diisocyanato-2,2-difluoropropane, 1,4-diisocyanato-2-fluorobutane, 1,4-diisocyanato-2,2-fluorobutane, 1,4-diisocyanato-2,3-difluorobutane, 1,6-diisocyanato-2-fluorohexane, 1,6-diisocyanato-3-fluorohexane, 1,6-diisocyanato-2,2-difluorohexane, 1,6-diisocyanato-2,3-difluorohexane, 1,6-diisocyanato-2,4-difluorohexane, 1,6-diisocyanato-2,5-difluorohexane, 1,6-diisocyanato-3,3-difluorohexane, 1,6-diisocyanato-3,4-difluorohexane, 1,8-diisocyanato-2-fluorooctane, 1,8-diisocyanato-3-fluorooctane, 1,8-diisocyanato-4-fluorooctane, 1,8-diisocyanato-2,2-difluorooctane, 1,8-diisocyanato-2,3-difluorooctane, 1,8-diisocyanato-2,4-difluorooctane, 1,8-diisocyanato-2,5-difluorooctane, 1,8-diisocyanato-2,6-difluorooctane, 1,8-diisocyanato-2,7-difluorooctane, etc.;

Cycloalkane ring-containing diisocyanates such as 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, 1,2-bis(isocyanatomethyl)cyclohexane, 1,3-bis(isocyanatomethyl)cyclohexane, 1,4-bis(isocyanatomethyl)cyclohexane, dicyclohexylmethane-2,2'-diisocyanate, dicyclohexylmethane-2,4'-diisocyanate, dicyclohexylmethane-3,3'-diisocyanate, dicyclohexylmethane-4,4'-diisocyanate, etc.;

Aromatic ring-containing diisocyanates such as 1,2-phenylene diisocyanate, 1,3-phenylene diisocyanate, 1,4-phenylene diisocyanate, tolylene-2,3-diisocyanate, tolylene-2,4-diisocyanate, tolylene-2,5-diisocyanate, tolylene-2,6-diisocyanate, tolylene-3,4-diisocyanate, tolylene-3,5-diisocyanate, 1,2-bis(isocyanatomethyl)benzene, 1,3-bis(isocyanatomethyl)benzene, 1,4-bis(isocyanatomethyl) benzene, 2,4-diisocyanatobiphenyl, 2,6-diisocyanatobiphenyl, 2,2'-diisocyanatobiphenyl, 3,3'-diisocyanatobiphenyl, 4,4'-diisocyanato-2-methylbiphenyl, 4,4'-diisocyanato-3-methylbiphenyl, 4,4'-diisocyanato-3,3'-dimethylbiphenyl, 4,4'-diisocyanatodiphenylmethane, 4,4'-diisocyanato-2- methyldiphenylmethane, 4,4'-diisocyanato-3-methyldiphenylmethane, 4,4'-diisocyanato-3,3'-dimethyldiphenylmethane, 1,5-diisocyanatonaphthalene, 1,8-diisocyanatonaphthalene, 2,3-diisocyanatonaphthalene, 1,5-bis(isocyanatomethyl)naphthalene, 1,8-bis(isocyanatomethyl)naphthalene, 2,3-bis(isocyanatomethyl)naphthalene, etc.

Of those, preferred are:

Linear polymethylene diisocyanates such as ethylene diisocyanate, trimethylene diisocyanate, tetramethylene diisocyanate, pentamethylene diisocyanate, hexamethylene diisocyanate, heptamethylene diisocyanate, octamethylene diisocyanate, decamethylene diisocyanate, dodecamethylene diisocyanate, tetradecamethylene diisocyanate, etc.;

Branched alkylene diisocyanates such as 1-methylhexamethylene diisocyanate, 2-methylhexamethylene diisocyanate, 3-methylhexamethylene diisocyanate, 1,1-dimethylhexamethylene diisocyanate, 1,2-dimethylhexamethylene diisocyanate, 1,3-dimethylhexamethylene diisocyanate, 1,4-dimethylhexamethylene diisocyanate, 1,5-dimethylhexamethylene diisocyanate, 1,6-dimethylhexamethylene diisocyanate, 1,2,3-trimethylhexamethylene diisocyanate, etc.;

Cycloalkane ring-containing diisocyanates such as 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, 1,2-bis(isocyanatomethyl)cyclohexane, 1,3-bis(isocyanatomethyl)cyclohexane, 1,4-bis(isocyanatomethyl)cyclohexane, dicyclohexylmethane-2,2'-diisocyanate, dicyclohexylmethane-2,4'-diisocyanate, dicyclohexylmethane-3,3'-diisocyanate, dicyclohexylmethane-4,4'-diisocyanate, etc.

Further, especially preferred are:

Linear polymethylene diisocyanates selected from tetramethylene diisocyanate, pentamethylene diisocyanate, hexamethylene diisocyanate, heptamethylene diisocyanate, octamethylene diisocyanate;

Cycloalkane ring-containing diisocyanates such as 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, 1,2-bis(isocyanatomethyl)cyclohexane, 1,3-bis(isocyanatomethyl)cyclohexane, 4-bis(isocyanatomethyl)cyclohexane, dicyclohexylmethane-2,2'-diisocyanate, dicyclohexylmethane-2,4'-diisocyanate, dicyclohexylmethane-3,3'-diisocyanate, dicyclohexylmethane-4,4'-diisocyanate.

One alone or two or more of the above-mentioned diisocyanates may be used in the present invention either singly or as combined in any desired manner and in any desired ratio.

Not specifically defined, the amount of the diisocyanate usable in the nonaqueous electrolytic solution of the present invention may be typically at least 0.001% by mass relative to the entire mass of the nonaqueous electrolytic solution, preferably at least 0.01% by mass, more preferably at least 0.1% by mass, even more preferably at least 0.3% by mass, and is typically at most 5% by mass, preferably at most 4.0% by mass, even more preferably at most 3.0% by mass, still more preferably at most 2% by mass. When the content falls within the above-mentioned range, then the durability such as cycle, storage and the like can be bettered, and the present invention can sufficiently exhibit the advantageous effects thereof.

<Overcharge Preventing Agent>

An overcharge preventing agent may be used in the nonaqueous electrolytic solution of the present invention, for the purpose of effectively preventing the nonaqueous electrolytic solution secondary battery from being ruptured or ignited when overcharged.

The overcharge preventing agent includes aromatic compounds such as biphenyl, alkylbiphenyl, terphenyl, partially-hydrogenated terphenyl, cyclohexylbenzene, t-butylbenzene, t-amylbenzene, diphenyl ether, dibenzofuran, etc.; partially-fluorinated derivatives of the above-mentioned aromatic compounds, such as 2-fluorobiphenyl, o-cyclohexylfluorobenzene, p-cyclohexylfluorobenzene, etc.; fluorine-containing anisole compounds such as 2,4-difluoroanisole, 2,5-difluoroanisole, 2,6-difluoroanisole, 3,5-difluoroanisole, etc. Above all, preferred are aromatic compounds such as biphenyl, alkylbiphenyl, terphenyl, partially-hydrogenated terphenyl, cyclohexylbenzene, t-butylbenzene, t-amylbenzene, diphenyl ether, dibenzofuran, etc. One alone or two or more of these may be used here either singly or as combined. In case where two or more are used as combined, especially preferred is use of a combination of cyclohexylbenzene and t-butylbenzene or t-amylbenzene, or a combination of at least one selected from oxygen-free aromatic compounds such as from biphenyl, alkylbiphenyl, terphenyl, partially-hydrogenated terphenyl, cyclohexylbenzene, t-butylbenzene, t-amylbenzene and the like, and at least one selected from oxygen-containing aromatic compounds such as diphenyl ether, dibenzofuran and the like, from the viewpoint of the balance between overcharge preventing characteristics and high-temperature storage characteristics.

Not specifically defined, the amount of the overcharge preventing agent to be added may be any one not markedly detracting from the advantageous effects of the present invention. The amount of the overcharge preventing agent is preferably at least 0.1% by mass in 100% by mass of the nonaqueous electrolytic solution and is preferably at most 5% by mass. Falling within the range, the overcharge preventing agent can readily express the effect thereof, and can readily evade a risk of battery performance degradation of, for example, worsening high-temperature storage characteristics of batteries. More preferably, the amount of the overcharge preventing agent is at least 0.2% by mass, even more preferably at least 0.3% by mass, still more preferably at least 0.5% by mass, and is also more preferably at most 3% by mass, even more preferably at most 2% by mass.

<Other Auxiliary Agents>

The nonaqueous electrolytic solution of the present invention may contain any other known auxiliary agent. The other auxiliary agent includes carbonate compounds such as erythritan carbonate, spiro-bis-dimethylene carbonate, methoxyethyl-methyl carbonate, etc.; carboxylic acid anhydrides such as succinic anhydride, glutaric anhydride, maleic anhydride, citraconic anhydride, glutaconic anhydride, itaconic anhydride, diglycolic anhydride, cyclohexane-dicarboxylic acid anhydride, cyclopentane-tetracarboxylic acid dianhydride, phenylsuccinic acid anhydride, etc.; spiro compounds such as 2,4,8,10-tetraoxaspiro[5.5]undecane, 3,9-divinyl-2,4,8,10-tetraoxaspiro[5.5]undecane, etc.; sulfur-containing compounds such as ethylene sulfide, methyl fluorosulfonate, ethyl fluorosulfonate, methyl methanesulfonate, ethyl methanesulfonate, busulfan, sulfolene, ethylene sulfate, vinylene sulfate, diphenyl sulfone, N,N-dimethylmethanesulfonamide, N,N-diethymethanesulfonamide, etc.; nitrogen-containing compounds such as 1-methyl-2-pyrrolidinone, 1-methyl-2-piperidone, 3-methyl-2-oxazolidinone, 1,3-dimethyl-2-imidazolidinone, N-methylsuccinimide, etc.; hydrocarbon compounds such as heptane, octane, nonane, decane, cycloheptane, etc.; fluorine-containing aromatic compounds such as fluorobenzene, difluorobenzene, hexafluorobenzene, benzotrifluoride, etc.; silane compounds such as tris(trimethylsilyl) borate, tris(trimethoxysilyl) borate, tris(trimethylsilyl) phosphate, tris(trimethoxysilyl) phosphate, dimethoxyaluminoxytrimethoxysilane, diethoxyaluminoxytriethoxysilane, dipropoxyaluminoxytriethoxysilane, dibutoxyaluminoxytrimethoxysilane, dibutoxyaluminoxytriethoxysilane, titanium tetrakis(trimethylsiloxide), titanium tetrakis(triethylsiloxide), etc. One alone or two or more of these may be used here either singly or as combined. Adding the auxiliary agent improves capacity retention characteristics and cycle characteristics after storage at high temperatures.

Not specifically defined, the amount of the other auxiliary agent to be added may be any desired one not markedly detracting from the advantageous effects of the present invention. The amount of the other auxiliary agent is preferably at least 0.01% by mass in 100% by mass of the nonaqueous electrolytic solution, and is preferably at most 5% by mass. Falling within the range, the other auxiliary agent can readily express the effect thereof, and can readily evade a risk of battery performance degradation of, for example, worsening high-temperature storage characteristics of batteries. More preferably, the amount of the other auxiliary agent is at least 0.1% by mass, even more preferably at least 0.2% by mass, and is more preferably at most 3% by mass, even more preferably at most 1% by mass.

The nonaqueous electrolytic solution described in the above includes one that exists inside the nonaqueous electrolytic solution battery of the present invention. Concretely, the nonaqueous electrolytic solution includes an embodiment of a nonaqueous electrolytic solution in a nonaqueous electrolytic solution battery, which is constructed by separately preparing constituent elements of a nonaqueous electrolytic solution such as a lithium salt, a solvent, an auxiliary agent and the like, followed by substantially isolating them and combining them to prepare a nonaqueous electrolytic solution, and then injecting the thus-prepared nonaqueous electrolytic solution into a battery that has been separately assembled according to the method descried below; an embodiment of producing the same composition as that of the nonaqueous electrolytic solution of the present invention by individually putting the constituent elements of the nonaqueous electrolytic solution of the present invention in a battery followed by mixing them in the battery; and further an embodiment of producing the same composition as that of the nonaqueous electrolytic solution of the present invention by generating the compounds constituting the nonaqueous electrolytic solution of the present invention in the nonaqueous electrolytic solution battery.

<2. Nonaqueous Electrolytic Solution Secondary Battery>

The nonaqueous electrolytic solution secondary battery of the present invention comprises a negative electrode and a positive electrode capable of occluding and releasing ions, and the above-mentioned nonaqueous electrolytic solution of the present invention.

<2-1. Battery Design>

The nonaqueous electrolytic solution secondary battery of the present invention has the same design as conventionally known nonaqueous electrolytic solution secondary batteries, except for the configurations of the negative electrode and the nonaqueous electrolytic solution. Typically, the nonaqueous electrolytic solution secondary battery of the present invention is so designed as to include a positive electrode and a negative electrode laminated via a porous film (separator) impregnated with the nonaqueous electrolytic solution of the present invention, and a casing (outer package) housing the electrodes and the separator. As such, the nonaqueous electrolytic solution secondary battery of the present invention is not limited to a particular shape, and may have any of a cylindrical, a rectangular, a laminated, a coin-shaped or a large-size shape.

<2-2. Nonaqueous Electrolytic Solution>

As the nonaqueous electrolytic solution, used here is the above-mentioned nonaqueous electrolytic solution of the present invention.

<2-3. Negative Electrode>

The negative electrode has a negative electrode active material on a current current collector, and the negative electrode active material is described below.

Not specifically defined, the negative electrode active material may be any one capable of electrochemically occluding and releasing lithium ions. Specific examples thereof include carbonaceous materials, alloy materials, lithium-containing metal composite oxide materials, etc. One alone or two or more of these may be used here either singly or as combined in any desired manner.

<2-3-1. Carbonaceous Material>

Preferred as the carbonaceous material for use as the negative electrode active material is one selected from:

(1) natural graphite, (2) carbonaceous material obtained after one or more heat treatments of an artificial carbonaceous substance as well as an artificial graphite substance in a temperature range of from 400° C. to 3200° C., (3) carbonaceous material which forms a negative electrode active material layer made of carbon materials having at least two different crystallinities and/or in which the layer has a contact interface of the carbon materials of different crystallinities, and (4) carbonaceous material which forms a negative electrode active material layer made of carbon materials having at least two different orientations and/or in which the layer has a contact interface of the carbon materials of different orientations.

These materials are preferable, because they provide a good balance between initial irreversible capacity and high current density charge/discharge characteristics. One alone or two or more of those carbonaceous materials (1) to (4) may be used here either singly or as combined in any desired manner and in any desired ratio.

Specific examples of the artificial carbonaceous substance and the artificial graphite substance include natural graphite, coal cokes, petroleum cokes, coal pitches, petroleum pitches, as well as those produced by oxidation treatment of those pitches, needle cokes, pitch cokes, and carbon materials produced by partially graphitizing these, thermally-cracked products of organic materials such as furnace black, acetylene black, pitch carbon fibers and the like, carbonizable organic materials, and their carbides, or solutions produced by dissolving such a carbonizable organic material in a low-molecular organic solvent such as benzene, toluene, xylene, quinoline, n-hexane or the like, and their carbides, etc.

<2-3-2. Configuration, properties, and Preparation Method of Carbonaceous Negative Electrode>

It is desirable that the properties of the carbonaceous material, as well as the negative electrode containing the carbonaceous material, the technique used to form the electrode, the current current collector, and the nonaqueous electrolytic solution secondary battery satisfy any one or more of the following conditions (1) to (13) either alone or simultaneously:
(1) X-Ray Parameter The d value (interlayer distance) of the lattice plane (002 plane) of the carbonaceous material as determined by X-ray diffraction according to the Gakushin method is typically from 0.335 to 0.340 nm, preferably from 0.335 to 0.338 nm, more preferably from 0.335 to 0.337 nm. The crystallite size (Lc) as measured by X-ray diffraction according to the Gakushin method is typically 1.0 nm or more, preferably 1.5 nm or more, more preferably 2 nm or more.
(2) Volume-Based Average Particle Size The volume-based average particle size of the carbonaceous material is typically 1 µm or more, preferably 3 µm or more, more preferably 5 µm or more, even more preferably 7 µm or more, and typically 100 µm or less, preferably 50 µm or less, more preferably 40 µm or less, even more preferably 30 µm or less, still more preferably 25 µm or less, as determined as the volume-based average particle size (median size) thereof according to a laser diffraction and scattering method. When the volume-based average particle size is smaller than the above-mentioned range, then the irreversible volume may increase, therefore causing initial battery capacity loss. On the other hand, when larger than the range, an uneven coating surface may be formed in producing electrodes by coating, therefore providing an unfavorable case in the process of battery production.

The volume-based average particle size may be measured by dispersing the carbon powder in a 0.2 mass % aqueous solution (about 10 mL) of a surfactant, polyoxyethylene(20) sorbitan monolaurate, using a laser diffraction and scattering particle sizer (Horiba Seisakusho's LA-700). The median size measured as above is defined as the volume-based average particle size of the carbonaceous material for use in the present invention.

[Rhombohedral Ratio]

The rhombohedral ratio, as defined in the present invention, can be determined on the basis of the proportion of the rhombohedral-structure graphite layers (ABC-stacking layers) and the hexagonal-structure graphite layers (AB stacking layers) as measured through X-ray wide-angle diffraction (XRD) and according to the following expression:

Rhombohedral ratio (%)=(integrated intensity of ABC (101) peak in XRD)/(integrated intensity AB (101) peak in XRD)×100.

Here the rhombohedral ratio of the graphite particles in the present invention is typically 0% or more, preferably more than 0%, more preferably 3% or more, even more preferably 5% or more, and still more preferably 12% or more, and is typically 35% or less, preferably 27% or less, more preferably 24% or less, even more preferably 20% or less. The rhombohedral ratio of 0% denotes herein that no XRD peaks derived from ABC stacking layers are detected at all. The rhombohedral ratio greater than 0% indicates that there is detected some XRD peak, even small, derived from ABC stacking layers.

When the rhombohedral ratio is too large, then the graphite particles contain many defects in the crystal structure thereof and therefore the amount of Li to be inserted thereinto tends to decrease and the battery could hardly have high capacity. In addition, the defects may decompose electrolytic solution during cycles, and therefore the cycle characteristics tend to worsen. As opposed to this, when the rhombohedral ratio falls within the range in the present invention, then, for example, the graphite particles could have few defects in the crystal structure thereof and have low reactivity with electrolytic solution, and therefore electrolytic solution consumption during cycles could be reduced and the batteries could favorably secure excellent cycle characteristics.

The measurement method of XRD to determine the rhombohedral ratio is as follows:

A graphite powder is filled on a 0.2 mm sample plate in such a manner that the graphite powder is not oriented, and analyzed using a X-ray diffraction device (for instance, X'Pert Pro MPD by PANalytical, CuKα rays, output 45 kV, 40 mA). The integrated intensities of the peaks are calculated, using the obtained diffraction pattern, by profile-fitting with the asymmetrical Pearson VII function, using analysis software JADE 5.0, to thereby work out the rhombohedral ratio on the basis of the abovementioned expression.

The X-ray diffraction measurement conditions are as follows. Herein, "2θ" is the diffraction angle.

Target: Cu(Kα rays) graphite monochrometer

Slit:

| | |
|---|---|
| Solar slit | 0.04 degrees |
| Divergent slit | 0.5 degrees |
| Horizontal divergence mask | 15 mm |
| Scattering-preventing slit | 1 degree |

Measurement range and step angle/measurement time:
(101) plane: 41 degrees≤2θ≤47.5 degrees, 0.3 degrees/60 seconds Background correction: Interval from 42.7 to 45.5 degrees joined by a straight line, and subtracted as background.

Peak of rhombohedral-structure graphite particle layers: peak around 43.4 degrees.

Peak of hexagonal-structure graphite particle layers: peak around 44.5 degrees.

The method for obtaining graphite particles having the rhombohedral ratio that falls within the above-mentioned range is not particularly limited, and may be a production method that relies on conventional techniques. Preferably, however, the graphite particles are produced as a result of thermal treatment at a temperature of 500° C. or higher. In particular, mechanical action in the form mainly of impact forces but also compression, friction, shear forces and the like, including interactions between particles, may be preferably applied to the graphite particles. The rhombohedral ratio can be controlled by varying, for instance, the intensity of the mechanical action, the treatment time, or whether or not the treatment is repeated. As a concrete case of the apparatus for controlling the rhombohedral ratio, particularly preferred is a surface-treatment apparatus having a rotor, with multiple blades disposed thereon, inside a casing, wherein mechanical action in the form of impact compression, friction, shearing forces and the like is exerted, through high-speed rotation of the rotor, to the carbon material that is introduced into the apparatus. Also preferred is an apparatus has a mechanism that repeatedly exerts a mechanical action on the carbon material, by causing the latter to circulate, or an apparatus having a mechanism wherein there is connected multiple units that lack a circulation mechanism. Preferred examples of the apparatus include, for instance, a hybridization system by Nara Machinery, etc.

More preferably, thermal treatment is additionally applied to the system after imparting the mechanical action thereto.

Particularly preferably, imparting of the mechanical action is followed by compositing with a carbon precursor and by thermal treatment at a temperature of 700° C. or higher.

(3) Raman R-Value, Raman Half-Value Width

The Raman R value of the carbonaceous material is typically 0.01 or more, preferably 0.03 or more, more preferably 0.1 or more, and it typically 1.5 or less, preferably 1.2 or less, more preferably 1 or less, even more preferably 0.5 or less, as measured by argon ion laser Raman spectrometry.

When the Raman R value is more than the above range, then the crystallinity of the particle surface would be too high and the site where Li steps into interlayers during charging/discharging may reduce. Specifically, the charge acceptance may lower. Further, when the negative electrode is highly densified by applying the material to current current collector followed by pressing, then the crystals may readily be oriented in the direction parallel to the electrode plate to thereby worsen the load characteristics. On the other hand, when more than the range, the crystallinity of the particle surface may lower to increase the reactivity of the material with nonaqueous electrolytic solution, thereby often causing risks of efficiency reduction and gas generation increase.

Not specifically defined, the Raman half-value width of the carbonaceous material at around 1580 $cm^{-1}$ is typically 10 $cm^{-1}$ or more, preferably 15 $cm^{-1}$ or more, and is typically 100 $cm^{-1}$ or less, preferably 80 $cm^{-1}$ or less, more preferably 60 $cm^{-1}$ or less, even more preferably 40 $cm^{-1}$ or less.

When the Raman half-value width is less than the above range, then the crystallinity of the particle surface would be too high and the site where Li steps into interlayers during charging/discharging may reduce. Specifically, the charge acceptance may lower. Further, when the negative electrode is highly densified by applying the material to current current collector followed by pressing, then the crystals may readily be oriented in the direction parallel to the electrode plate to thereby worsen the load characteristics. On the other hand, when more than the range, the crystallinity of the particle surface may lower to increase the reactivity of the material with nonaqueous electrolytic solution, thereby often causing risks of efficiency reduction and gas generation increase.

For Raman spectroscopy, used here is a Raman spectrometer (JASCO's Raman spectrometer), in which a sample is allowed to spontaneously fall into the measurement cell and fill the cell. The cell is then rotated in a plane perpendicular to the laser beam while irradiating the sample surface in the cell with an argon ion laser. The resulting Raman spectrum is then analyzed for the intensity IA of the peak PA near 1580 $cm^{-1}$ and the intensity IB of the peak PB near 1360 $cm^{-1}$; and the intensity ratio R (R=IB/IA) is calculated. The Raman R value so calculated is defined as the Raman R value of the carbonaceous material of the present invention. In addition, the half-value width of the peak PA near 1580 $cm^{-1}$ of the resulting Raman spectrum is also measured, and this is defined as the Raman half-value width of the carbonaceous material of the present invention.

The Raman measurement conditions are as follows:
Argon ion laser wavelength: 514.5 nm
Laser power on sample: 15 to 25 mW
Resolution: 10 to 20 cm
Measurement range: 1100 $cm^{-1}$ to 1730 $cm^{-1}$
Raman R value, Raman half-value width analysis:

Background Treatment

Smoothing treatment: Convolution by simple average 5 points (4) BET Specific Surface Area The value of the BET specific surface area, as measured according to the BET method, of the carbonaceous material is typically 0.1 $m^2 \cdot g^{-1}$ or more, preferably 0.7 $m^2 \cdot g^{-1}$ or more, more preferably 1.0 $m^2 \cdot g^{-1}$ or more, even more preferably 1.5 $m^2 \cdot g^{-1}$ or more, and is typically 100 $m^2 \cdot g^1$ or less, preferably 25 $m^2 \cdot g^{-1}$ or less, more preferably 15 $m^2 \cdot g^{-1}$ or less, even more preferably 10 $m^2 \cdot g^{-1}$ or less.

When the BET specific surface area value is less than the range, then the lithium acceptance in charging of the material used as a negative electrode material would worsen and lithium may readily precipitate on the electrode surface, therefore providing the possibility of stability reduction. On the other hand, when more than the range, the reactivity of the material used as a negative electrode material with nonaqueous electrolytic solution may increase to increase gas generation, and in such a case, good batteries are difficult to construct.

The specific surface area may be measured according to the BET method, using a surface area meter (Okura Riken's full-automatic surface area measurement device) according to a single-point nitrogen adsorption BET method of a gas flow method, in which the sample to be analyzed is predried in nitrogen circulation at 350° C. for 15 minutes and then analyzed therein using a nitrogen/helium mixed gas as accurately controlled to have a relative pressure value of nitrogen to atmospheric pressure of 0.3. The specific surface area thus determined is defined as the BET specific surface area of the carbonaceous material in the present invention.

(5) Circularity

The circularity of the carbonaceous material as measured as the degree of sphericity thereof preferably falls within the range mentioned below. The circularity is defined as "circularity=(perimeter of equivalent circle having the same area as particle projection shape)/(actual perimeter of particle projection shape)", and the circularity of 1 provides a theoretically true sphere.

The circularity of the carbonaceous material particles having a particle size to fall within a range of from 3 to 40 µm is preferably nearer to 1 and is preferably at least 0.1, more preferably at least 0.5, even more preferably at least 0.8, still more preferably at least 0.85, and especially preferably at least 0.9.

The high-current density charge/discharge characteristics improve as the circularity increases. Accordingly, when the circularity is lower than the above range, the chargeability of the negative electrode active material may lower and the resistance between the particles may increase, whereby the short-time high-current density charge/discharge characteristics may worsen.

The circularity may be measured using a flow-type particle image analyzer (Sysmex's FPIA). About 0.2 g of the sample to be analyzed is dispersed in an aqueous 0.2 mass % solution of a surfactant, polyoxymethylene (20) sorbitan monolaurate (about 50 mL), and irradiated with 28 kHz ultrasonic waves at an output of 60 W for 1 minute. With that, the detection range is designated to be from 0.6 to 400 µM, and the particles having a particle size of from 3 to 40 µm are analyzed. The circularity thus determined according to the above measurement is defined as the circularity of the carbonaceous material in the present invention.

The method for increasing the circularity is not specifically defined. Preferred are those prepared through spheronization to be spheres, as they can make the shape of the space between the particles more uniform when formed into electrodes. Examples of the spheronization treatment include a method of mechanically making the shape more spherical by imparting shear force or compression force, and a method of mechanical or physical treatment in which multiple fine particles are granulated with a binder or by the adhesion force of the particles themselves.

(6) Tap Density

The tap density of the carbonaceous material is typically 0.1 g·cm$^{-3}$ or more, preferably 0.5 g·cm$^{-3}$ or more, more preferably 0.7 g·cm$^{-3}$ or more, even more preferably 1 g·cm$^{-3}$ or more, and is preferably 2 g·cm$^{-3}$ or less, more preferably 1.8 g·cm$^{-3}$ or less, even more preferably 1.6 g·cm$^{-3}$ or less.

When the tap density is lower than the above range, then the charge density could hardly increase in use as negative electrodes, and therefore high-capacity batteries could not often be formed. When larger than the above range, the space between the particles in the electrodes may be too small so that the conductivity between the particles could not be secured and preferred battery characteristics could not be therefore attained.

The tap density may be measure as follows: The sample to be analyzed is led to pass through a sieve having an opening of 300 µm, then dropwise put into a tapping cell of 20 cm$^3$ so that the cell is filled with the sample up to the top surface thereof. Thereafter using a powder density analyzer (for example, Seishin Enterprise's Tap Denser), the sample is tapped 1000 times at a stroke length of 10 mm, and the tap density is calculated from the volume and the sample mass. The tap density so calculated is defined as the tap density of the carbonaceous material in the present invention.

(7) Orientation Ratio

The orientation ratio of the carbonaceous material is typically 0.005 or more, preferably 0.01 or more, more preferably 0.015 or more, and is typically 0.67 or less. When the orientation ratio is lower than the above range, then the high-density charge/discharge characteristics may lower. The upper limit of the range is the theoretical upper limit of the orientation ratio of the carbonaceous material.

The orientation is measured through X-ray diffractiometry after the sample to be analyzed has been molded under pressure. 0.47 g of the sample is filled in a molding machine having a diameter of 17 mm, and compressed under 58.8 MN·m$^{-2}$ to give a molded product. Using clay, the product is set in a sample holder in a manner that makes the sample surface in flush with the holder surface, and subjected to X-ray diffractiometry. From the peak intensities of the (110) diffraction and the (004) diffraction of carbon, the ratio of (110) diffraction peak intensity/(004) diffraction peak intensity is calculated. The orientation ratio so calculated is defined as the orientation ratio of the carbonaceous material in the present invention.

The X-ray diffraction measurement conditions are as follows. Herein, "2θ" is the diffraction angle.
Target: Cu(Kα rays) graphite monochrometer
Slit:
  Divergent slit=0.5 degrees Receiving slit=0.15 mm
  Scattering slit=0.5 degrees Measurement range and step angle/measurement time:
  (101) plane: 75 degrees 2θ 80 degrees, 1 degree/60 seconds
  (004) plane: 52 degrees 2θ 57 degrees, 1 degree/60 seconds (8) Aspect Ratio (Powder)

The aspect ratio of the carbonaceous material is typically 1 or more, and is typically 10 or less, preferably 8 or less, more preferably 5 or less. An aspect ratio falling outside the range would cause streaky unevenness in electrode plate formation and could not provide a uniform coating surface, whereby the high-current density charge/discharge characteristics may worsen. The lower limit of the above range is the theoretical lower limit of the aspect ratio of the carbonaceous material.

The aspect ratio is determined through enlarged observation of the particles of the carbonaceous material with a scanning electronic microscope. Any 50 graphite particles fixed to the end surface of a metal having a thickness of 50 microns or less are selected, and a stage to which the sample to be analyzed is fixed is rotated and tilted to measure each particle for the diameter A (the largest diameter of the carbonaceous material particles) and the diameter B (the smallest diameter orthogonal to the diameter A) by three-dimensional observation. The mean value of A/B is then determined. The aspect ratio (A/B) so determined is defined as the aspect ratio of the carbonaceous material in the present invention.

(9) Electrode Production

For electrode production, any known method is employable not markedly detracting from the advantageous effects of the present invention. For example, a binder, a solvent and optionally a thickener, a conductive material, a filler and others are added to a negative electrode active material to give a slurry, and this is applied onto a current current collector, then dried and pressed to give a negative electrode.

The thickness of the negative electrode active material layer on one side immediately before the battery nonaqueous electrolytic solution injection step is typically 15 µm or more, preferably 20 µm or more, more preferably 30 µm or more, and is typically 150 µm or less, preferably 120 µm or less, more preferably 100 µm or less. When the thickness of the negative electrode active material is more than the range, then the nonaqueous electrolytic solution could hardly penetrate into the area around the interface of the current current collector and therefore the high-current density charge/discharge characteristics may worsen. When less than the range, then the volume ratio of the negative electrode active material to the current current collector may increase and the battery capacity may decrease. The negative electrode active material may be prepared as a sheet electrode by roll molding, or a pellet electrode by compression molding.

(10) Current Current Collector

As the current current collector to hold the negative electrode active material may be any known one. As the current current collector of the negative electrode, for example, there may be mentioned metal materials of copper, nickel, stainless steel, nickel-plated steel, etc. From the viewpoint of workability and cost, especially preferred is copper.

When made of a metallic material, the current current collector may have a shape of, for example, metal foil, metal column, metal coil, metal plate, thin metal film, expanded metal, punched metal, metal foam or the like. Above all, preferred is a thin metal film, more preferred is a copper foil, and even more preferred is a rolled copper foil produced according to a rolling method or an electrolytic copper foil produced according to an electrolytic method. Any of these is usable here as the current current collector.

In case where the thickness of the copper foil is smaller than 25 μm, a copper alloy (phosphor bronze, titanium copper, Corson alloy, Cu—Cr—Zr alloy, etc.) having a higher strength than pure copper may be used.

(10-1) Current Current Collector Thickness

The thickness of the current current collector may be any one, but is typically 1 μm or more, preferably 3 μm or more, more preferably 5 μm or more, and is typically 1 mm or less, preferably 100 μm or less, more preferably 50 μm or less. When the thickness of thee metal coating film is less than 1 μm, then the strength thereof may reduce and the coating would be difficult. A thickness more than 100 μm may cause deformation in the shape of battery such as rolling. The current current collector may be meshed.

(11) Thickness Ratio of Current Current Collector to Negative Electrode Active Material Layer The ratio of the thickness of the current current collector to that of the negative electrode active material layer is not specifically defined. Preferably, the value of "(thickness of negative electrode active material layer on one side just before nonaqueous electrolytic solution injection)/(thickness of current current collector)" is 150 or less, more preferably 20 or less, even more preferably 10 or less, and is preferably 0.1 or more, more preferably 0.4 or more, even more preferably 1 or more.

When the ratio of the thickness of the negative electrode active material to that of the current current collector is larger than the above range, then the current current collector may generate heat though Joule heating during high-current density charging/discharging. On the other hand, when smaller than the range, the volume ratio of the negative electrode active material to the current current collector may increase and the battery capacity may lower.

(12) Electrode Density

The electrode structure formed of the negative electrode active material is not specifically defined. The density of the negative electrode active material existing on the current current collector is preferably 1 g·cm$^{-3}$ or more, more preferably 1.2 g·cm$^{-3}$ or more, even more preferably 1.3 g·cm$^{-3}$ or more, and is preferably 2.2 g·cm$^{-3}$ or less, more preferably 2.1 g·cm$^{-3}$ or less, even more preferably 2.0 g·cm$^{-3}$ or less, still more preferably 1.9 g·cm$^{-3}$ or less. When the density of the negative electrode active material existing on the current current collector is larger than the above range, then the negative electrode active material particles may be broken so that the initial irreversible capacity may increase and the penetrability of the nonaqueous electrolytic solution into the area around the current current collector/negative electrode active material interface may lower, whereby the high-current density charge/discharge characteristics may worsen. When smaller than the range, then the interconductivity of the negative electrode active material may lower and the battery resistance may increase, whereby the battery capacity per unit volume may reduce.

(13) Binder

Not specifically defined, the binder to bind the negative electrode active material may be any material that is stable against the solvent to be used in nonaqueous electrolytic solution and electrode production.

Specific examples include resin polymers such as polyethylene, polypropylene, polyethylene terephthalate, polymethyl methacrylate, aromatic polyamide, cellulose, nitrocellulose, etc.; rubber polymers such as SBR (styrene/butadiene rubber), isoprene rubber, butadiene rubber, fluorine rubber, NBR (acrylonitrile/butadiene rubber), ethylene/propylene rubber, etc.; styrene/butadiene/styrene block copolymer or its hydrogenated product; thermoplastic elastomer polymers such as EDPM (ethylene/propylene/diene tercopolymer), styrene/ethylene/butadiene/styrene copolymer, styrene/isoprene/styrene block copolymer or their hydrogenated product, etc.; soft resin polymers such as syndiotactic 1,2-polybutadiene, polyvinyl acetate, ethylene/vinyl acetate copolymer, propylene/α-olefin copolymer, etc.; fluoropolymers such as polyvinylidene fluoride, polytetrafluoroethylene, polyfluorovinylidene fluoride, polytetrafluoroethylene/ethylene copolymer, etc.; polymer compositions having ionic conductivity of alkali metal ion (especially lithium ion), etc. One alone or two or more of these may be used here either singly or as combined in any desired manner and in any desired ratio.

The solvent for slurry formation may be any solvent capable of dissolving or dispersing a negative electrode active material, a binder as well as optional components of a thickener and a conductive material, and the type thereof is not specifically defined. Any of a water-based solvent or an organic solvent may be used here.

Examples of the water-based solvent include water, alcohol, etc.; and examples of the organic solvent include N-methylpyrrolidone (NMP), dimethylformamide, dimethylacetamide, methyl ethyl ketone, cyclohexane, methyl acetate, methyl acrylate, diethyltriamine, N,N-di methylaminopropylamine, tetrahydrofuran (THF), toluene, acetone, diethyl ether, dimethylacetamide, hexamethylphosphoramide, dimethyl sulfoxide, benzene, xylene, quinoline, pyridine, methylnaphthalene, hexane, etc.

Especially when a water-based solvent is used, it is desirable that a dispersant or the like is additionally contained in the system along with a thickener therein and a latex such as SBR or the like is used for slurry formation. One alone or two or more of these solvents may be used here either singly or as combined in any desired manner and in any desired ratio.

The proportion of the binder to the negative electrode active material is preferably 0.1% by mass or more, more preferably 0.5% by mass or more, even more preferably 0.6% by mass or more, and is preferably 20% by mass or less, more preferably 15% by mass or less, even more preferably 10% by mass or less, still more preferably 8% by mass or less. When the proportion of the binder to the negative electrode active material is more than the above range, then the binder amount not contributing toward the battery capacity may increase so that the battery capacity may thereby lower. On the other hand, when less than the above range, the strength of the negative electrode may lower.

In particular, in case where a rubber polymer such as typically SBR is contained as the main ingredient, then the proportion of the binder to the negative electrode active material is typically 0.1% by mass or more, preferably 0.5% by mass or more, more preferably 0.6% by mass or more, and is typically 5% by mass or less, preferably 3% by mass or less, more preferably 2% by mass or less.

On the other hand, in case where a fluoropolymer such as typically polyvinylidene fluoride is contained as the main ingredient, then the proportion thereof to the negative electrode active material is typically 1% by mass or more, preferably 2% by mass or more, more preferably 3% by mass or more, and is typically 15% by mass or less, preferably 10% by mass or less, more preferably 8% by mass or less.

The thickener is generally used for controlling the slurry viscosity. The thickener is not specifically defined. Concretely, there are mentioned carboxymethyl cellulose, methyl cellulose, hydroxymethyl cellulose, ethyl cellulose, polyvinyl alcohol, oxidized starch, phosphorylated starch, casein and their salts, etc. One alone or two or more of these may be used here either singly or as combined in any desired manner and in any desired ratio.

When the thickener is further used, the proportion of the thickener to the negative electrode active material is typically 0.1% by mass or more, preferably 0.5% by mass or more, more preferably 0.6% by mass or more, and is typically 5% by mass or less, preferably 3% by mass or less, even more preferably 2% by mass or less. When the proportion of the thickener to the negative electrode active material is lower than the above range, then the coatability may greatly worsen. On the other hand, when larger than the range, then the proportion of the negative electrode active material in the negative electrode active material layer lowers and therefore, the problem of battery capacity reduction and the interresistance of the negative electrode active material may increase.

<2-3-3. Metallic Compound Material, and Configuration, Properties and Preparation Method of Negative Electrode Using Metallic Compound Material>

Not specifically defined, the metallic compound material to be used as the negative electrode active material may be any one capable of occluding and releasing lithium and includes elementary metals to form lithium alloys, or their alloys, as well as compounds such as oxides, carbides, nitrides, silicides, sulfides, phosphides, etc. The metallic compound includes compounds containing a metal of Ag, Al, Ba, Bi, Cu, Ga, Ge, In, Ni, P, Pb, Sb, Si, Sn, Sr, Zn, etc. Above all, preferred are elementary metals to form lithium alloys, and their alloys; and more preferred are materials containing a metal/semimetal element (that is, excluding carbon) of Group 13 or Group 14; even more preferred are elementary metals of silicon (Si), tin (Sn) or lead (Pb) (hereinafter these three types of elements may be referred to as "specific metal elements") or alloys containing these atoms, or compounds of such metals (specific metal elements); and especially preferred are silicon elementary metal and its alloys and compounds, as well as tin elementary metal and its alloys and compounds. One alone or two or more of these may be used here either singly or as combined in any desire manner and in any desired ratio.

Examples of the negative electrode active material having at least one atom selected from the specific metal elements include elementary metals of at least one specific metal element, alloys of two or more specific metal elements, alloys comprising one or more specific metal elements and any other one or more metal elements, as well as compounds containing one or more specific metal elements, and composite compounds of those compounds such as oxides, carbides, nitrides, silicides, sulfides, phosphides, etc. Using such an elementary metal or its alloy or compound as the negative electrode active material makes it possible to provide high-capacity batteries.

As other examples, additionally mentioned here are compounds in which any of those composite compounds bonds intricately to some different types of elements of elementary metals, alloys or non-metallic elements. More concretely, regarding silicon and tin, for example, usable here are alloys of those elements with a metal not acting as a negative electrode. Also for tin, for example, here employable are complicated compounds containing 5 or 6 different types of elements as a combination of tin, a metal except tin and silicon, an additional metal not acting as a negative electrode, and a non-metallic element.

Of those, preferred are elementary metals of at least any one of specific metal elements, alloys of two or more specific metal elements, oxides, carbides and nitrides of specific metal elements, etc., as capable of providing batteries having a large capacity per the unit mass thereof; and more preferred are elementary metals of silicon and tin, as well as their alloys, oxides, carbides, nitrides, etc., from the viewpoint of the capacity per the unit mass thereof and the environmental load thereof.

Also preferred is use of the compounds mentioned below which contain at least any one of silicon and tin, rather than use of elementary metals or alloys thereof as bettering cycle characteristics though the capacity per the unit mass thereof is not so high.

"Oxide of at least any one of silicon and tin" in which the elementary ratio of at least any one of silicon and tin to oxygen is typically 0.5 or more, preferably 0.7 or more, more preferably 0.9 or more, and is typically 1.5 or less, preferably 1.3 or less, more preferably 1.1 or less.

"Nitride of at least any one of silicon and tin" in which the elementary ratio of at least any one of silicon and tin to nitrogen is typically 0.5 or more, preferably 0.7 or more, more preferably 0.9 or more, and is typically 1.5 or less, preferably 1.3 or less, more preferably 1.1 or less.

"Carbide of at least any one of silicon and tin" in which the elementary ratio of at least any one of silicon and tin to carbon is typically 0.5 or more, preferably 0.7 or more, more preferably 0.9 or more, and is typically 1.5 or less, preferably 1.3 or less, more preferably 1.1 or less.

Any one alone or two or more of the above-mentioned negative electrode active materials may be used here either singly or as combined in any desired manner and in any desired ratio.

The negative electrode in the nonaqueous electrolytic solution secondary battery of the present invention may be produced according to any known method. Concretely, the negative electrode production method includes, for example, a method in which a negative electrode active material is roller-molded into a sheet electrode after adding a binder, a conductive material and others thereto, and a method that uses compression molding to form a pellet electrode. Typically, a method is used in which a thin film layer (negative electrode active material layer) that contains a negative electrode active material is formed on a current current collector for negative electrodes (hereinafter this may be referred to as "negative electrode current current collector"), using a technique such as coating, vapor deposition, sputtering, plating or the like. In this case, materials such as a binder, a thickener, a conductive material, a solvent and others may be added to the negative electrode active material to give a slurry material, and this may be applied onto the negative electrode current current collector, dried and pressed for densification to thereby form a negative electrode active material layer on the negative electrode current current collector.

Examples of the negative electrode current current collector material include steel, copper alloys, nickel, nickel alloys, stainless, etc. Of those preferred is a copper foil from the viewpoint of the easy workability into thin films and the cost thereof.

The thickness of the negative electrode current current collector is typically 1 μm or more, preferably 5 μm or more, and is typically 100 μm or less, preferably 50 μm or less. When the negative electrode current current collector is too thick, the capacity of the whole battery may lower too much;

but on the contrary, when too thin, the current current collector would be difficult to handle.

For improving the bonding effect of the negative electrode current current collector with the negative electrode active material layer to be formed on the surface thereof, it is desirable that the surface of the negative electrode current current collector is previously roughened. Examples of the surface roughening method include blast treatment, press rolling using a roughening roller, mechanical polishing that polishes the current current collector surface with a wire brush or the like equipped with, for example, an abrasive particles-bearing coated abrasive, a grinding stone, an emery wheel, a steel wire or the like, as well as electrolytic polishing, chemical polishing, etc.

In order to reduce the mass of the negative electrode current current collector and increase the energy density of the battery per the mass thereof, usable here is a perforated negative electrode current current collector, such as an expanded metal or a punched metal. This type of the negative electrode current current collector can freely adjust its mass by varying the percentage of the aperture thereof. Further, by forming the negative electrode active material layer on both sides of the perforated negative electrode current current collector, the riveting effect can be provided through the holes, and the negative electrode active material layer does not easily detach. However, when the percentage of the aperture is too large, then the contact area between the negative electrode active material layer and the negative electrode current current collector decreases, and the bonding strength may rather lower.

The slurry to form the negative electrode active material layer is produced typically by adding a binder, a thickener and others to a negative electrode material. "Negative electrode material" as referred to in this description is meant to indicate a combined material of a negative electrode active material and a conductive material.

The content of the negative electrode active material in the negative electrode material is typically 70% by mass or more, preferably 75% by mass or more, and is typically 97% by mass or less, preferably 95% by mass or less. When the content of the negative electrode active material is too small, then the capacity of the secondary battery using the formed negative electrode may be insufficient, but when too large, the content of the binder and others would be relatively small and, if so, the strength of the negative electrode to be formed would be low. In case where two or more negative electrode active materials are used here as combined, the total amount of the combined negative electrode active materials shall fall within the above-mentioned range.

The conductive material for use in the negative electrode includes metal materials of copper, nickel, etc.; carbon materials of graphite, carbon black, etc. One alone or two or more different types of those may be used here either singly or as combined in any desired manner and in any desired ratio. In particular, when a carbon material is used as the conductive material, it is desirable since the carbon material also acts as an active material. The content of the conductive material in the negative electrode material is typically 3% by mass or more, preferably 5% by mass or more, and is typically 30% by mass or less, preferably 25% by mass or less. When the content of the conductive material is too small, then the conductivity may be insufficient, but when too large, then the content of the negative electrode active material and others would be relatively small, so that the battery capacity and the conductivity may thereby lower. In case where two or more conductive materials are used here as combined, the total amount of the combined conductive materials shall fall within the above-mentioned range.

The binder for the negative electrode may be any material safe for the solvent to be used in electrode production or in electrolytic solution. For example, there are mentioned polyvinylidene fluoride, polytetrafluoroethylene, polyethylene, polypropylene, styrene/butadiene rubber, isoprene rubber, butadiene rubber, ethylene/acrylic acid copolymer, ethylene/methacrylic acid copolymer, etc. One alone or two or more of these may be used here either singly or as combined in any desired manner and in any desired ratio. The content of the binder is typically 0.5 parts by mass or more relative to 100 parts by mass of the negative electrode material, preferably 1 part by mass or more, and is typically 10 parts by mass or less, preferably 8 parts by mass or less. When the content of the binder is too small, then the strength of the formed negative electrode may be insufficient, but when too large, the content of the negative electrode active material may relatively insufficient so that the battery capacity and the conductivity may thereby be insufficient. In case where two or more binders are used as combined, the total amount of the binders shall satisfy the above-mentioned range.

The thickener for use for the negative electrode includes carboxymethyl cellulose, methyl cellulose, hydroxymethyl cellulose, ethyl cellulose, polyvinyl alcohol, starch oxide, phosphorylated starch, casein, etc. One alone or two or more of these may be used here either singly or as combined in any desired manner and in any desired ratio. The thickener may be used here optionally, but when used, the content of the thickener in the negative electrode active material layer preferably falls within a range of typically 0.5% by mass or more and 5% by mass or less.

The slurry to form the negative electrode active material layer may be prepared by optionally mixing a conductive material, a binder and a thickener with the above-mentioned negative electrode active material, using a water-based solvent or an organic solvent as the dispersion medium therein. As the water-based solvent, water is typically used here, which, however, may be combined with any other solvent than water, for example, an alcohol such as ethanol or the like or a cyclic amide such as N-methylpyrrolidone or the like in an amount of at most 30% by mass or so relative to water. As the organic solvent, typically mentioned are cyclic amides such as N-methylpyrrolidone, etc.; linear amides such as N,N-dimethylformamide, N,N-dimethylacetamide, etc.; aromatic hydrocarbons such as anisole, toluene, xylene, etc.; alcohols such as butanol, cyclohexanol, etc. Above all, preferred are cyclic amides such as N-methylpyrrolidone, etc.; linear amides such as N,N-dimethylformamide, N,N-dimethylacetamide, etc. One alone or two or more of these may be used here either singly or as combined in any desired manner and in any desired ratio.

Not specifically defined, the viscosity of the slurry may be any one capable of securing application of the slurry onto current current collectors. The viscosity may be suitably controlled by varying the amount of the solvent to be used in slurry preparation in order to secure the coatability of the prepared slurry.

After the prepared slurry is applied onto the above-mentioned negative electrode current current collector, then dried and pressed to form a negative electrode active material layer thereon. The coating method is not specifically defined. Any per-se known method is employable here. The drying method is not also specifically defined, for which is employable any known method of spontaneous drying, drying under heat, drying under reduced pressure, etc.

In electrode formation of the negative electrode active material according to the above-mentioned method, the electrode structure is not specifically defined. Preferably, the density of the active material existing on the current current collector is 1 g·cm$^{-3}$ or more, more preferably 1.2 g·cm$^{-3}$ or more, even more preferably 1.3 g·cm$^{-3}$ or more, and is preferably 2.2 g·cm$^{-3}$ or less, more preferably 2.1 g·cm$^{-3}$ or less, even more preferably 2.0 g·cm$^{-3}$ or less, still more preferably 1.9 g·cm$^{-3}$ or less.

When the density of the active material existing on the current current collector is more than the above range, then the active material particles may be broken thereby often causing a risk of high-current density charge/discharge characteristics degradation owing to initial irreversible capacity increase and nonaqueous electrolytic solution penetrability reduction around the interface of current current collector/ active material. When less than the above range, the conductivity of the active material may lower and the battery resistance may increase, and therefore the capacity per unit volume may thereby lower.

<2-3-4. Lithium-Containing Metal Composite Oxide Material, and Configuration, Properties, and Preparation Method of Negative Electrode Using Lithium-Containing Metal Composite Oxide Material>

The lithium-containing metal composite oxide material for use for the negative electrode active material is not specifically defined so far as the material can occlude and release lithium. Preferred is a lithium-containing metal composite oxide material containing titanium, and more preferred is a lithium/titanium composite oxide (hereinafter abbreviated as "lithium titanium composite oxide"). Specifically, adding a spinel structure-having lithium titanium composite oxide to the negative electrode active material for nonaqueous electrolytic solution secondary batteries is especially preferred as greatly reducing the output resistance of the batteries.

Also preferred are those produced by substituting lithium and titanium of lithium titanium composite oxides with any other element, for example, with at least one element selected from a group consisting of Na, K, Co, Al, Fe, Ti, Mg, Cr, Ga, Cu, Zn and Nb.

Preferably, the metal oxide is a lithium titanium composite oxide represented by the following general formula (3), in which 0.7≤x≤1.5, 1.5≤y≤2.3, and 0≤z≤1.6, since the structure thereof in lithium ion doping/dedoping is stable.

$$Li_xTi_yM_zO_4 \quad (3)$$

[In the general formula (3), M represents at least one element selected form a group consisting of Na, K, Co, Al, Fe, Ti, Mg, Cr, Ga, Cu, Zn and Nb.]

Of the compositions of the above-mentioned general formula (3), especially preferred from the viewpoint of good balance of battery performance are:

(a) 1.2≤x≤1.4, 1.5≤y≤1.7, z=0,
(b) 0.9≤x≤1.1, 1.9≤y≤2.1, z=0,
(c) 0.7≤x≤0.9, 2.1≤y≤2.3, z=0.

Of the above-mentioned compositions, especially preferred typical compositions are (a) $Li_{4/3}Ti_{5/3}O_4$, (b) $Li_1Ti_2O_4$, and (c) $Li_{4/5}Ti_{11/5}O_4$. Another preferred structure where z≠0 is, for example, $Li_{4/3}Ti_{4/3}Al_{1/3}O_4$.

In addition to the above-mentioned requirements, it is also desirable that the lithium titanium composite oxide for the negative electrode active material in the present invention satisfies at least one characteristics of the following properties and shapes (1) to (13), more preferably at least two or more such characteristics simultaneously.

(1) BET Specific Surface Area

The value of the BET specific surface area, as measured according to the BET method, of the lithium titanium composite oxide for use for the negative electrode active material is typically 0.5 m$^2$·g$^{-1}$ or more, preferably 0.7 m$^2$·g$^{-1}$ or more, more preferably 1.0 m$^2$·g$^{-1}$ or more, even more preferably 1.5 m$^2$·g$^{-1}$ or more, and is typically 200 m$^2$·g$^{-1}$ or less, preferably 100 m$^2$·g$^{-1}$ or less, more preferably 50 m$^2$·g$^{-1}$ or less, even more preferably 25 m$^2$·g$^{-1}$ or less.

When the BET specific surface area is less than the range, then the reaction area of the oxide to be in contact with the nonaqueous electrolytic solution, when the oxide is used as a negative electrode material, may decrease and the output resistance may thereby increase. On the other hand, when more than the range, then the surface and the edge part of the titanium-containing metal oxide crystal may increase and, as a result, the crystal may deform so that the irreversible capacity could not be ignorable and good batteries would be difficult to construct.

The specific surface area may be measured according to the BET method, using a surface area meter (Okura Riken's full-automatic surface area measurement device) according to a single-point nitrogen adsorption BET method of a gas flow method, in which the sample to be analyzed is predried in nitrogen circulation at 350° C. for 15 minutes and then analyzed therein using a nitrogen/helium mixed gas as accurately controlled to have a relative pressure value of nitrogen to atmospheric pressure of 0.3. The specific surface area thus determined is defined as the BET specific surface area of the lithium titanium composite oxide in the present invention.

(2) Volume-Based Average Particle Size

The volume-based average particle size (this is the secondary particle size in a case where primary particles aggregate to form secondary particles) of the lithium titanium composite oxide is defined as the volume-based average particle size (median size) thereof according to a laser diffraction and scattering method.

The volume-based average particle size of the lithium titanium composite oxide is typically 0.1 vim or more, preferably 0.5 μm or more, more preferably 0.7 vim or more, and is typically 50 μm or less, preferably 40 μm or less, more preferably 30 μm or less, even more preferably 25 μm or less.

The volume-based average particle size may be measured by dispersing a carbon powder in a 0.2 mass % aqueous solution (about 10 mL) of a surfactant, polyoxyethylene(20) sorbitan monolaurate, using a laser diffraction and scattering particle sizer (Horiba Seisakusho's LA-700). The median size measured as above is defined as the volume-based average particle size of the carbonaceous material for use in the present invention.

When the volume-based average particle size of the lithium titanium composite oxide is smaller than the above-mentioned range, then a large amount of a binder is required in electrode production and, as a result, the battery capacity may lower. On the other hand, when larger than the range, an uneven coating surface may be formed in producing electrodes by coating, therefore providing an unfavorable case in the process of battery production.

(3) Average Primary Particle Size

In a case where primary particles of the lithium titanium composite oxide aggregate to form secondary particles, the average primary particle size of the composite oxide is typically 0.01 μm or more, preferably 0.05 μm or more, more preferably 0.1 μm or more, even more preferably 0.2 μm or more, and is typically 2 μm or less, preferably 1.6 μm or less, more preferably 1.3 μm or less, even more preferably 1 μm or less. When the volume-based average primary particle size is more than the above range, then spherical secondary particles would be difficult to form and such large primary particles would have some negative influence on powder chargeability and the specific surface area would thereby greatly lower, and therefore providing a possibility that the battery performance such as output characteristics and others would worsen. On the other hand, when less than the range, then, in general, the crystals could grow insufficiently and therefore the performance of secondary batteries would worsen, for example, the charge/discharge reversibility thereof would worsen.

The primary particle size is measured through scanning electron microscopy (SEM). Concretely, the value of the longest slice of the primary particles on the left and right of the boundary on a horizontal straight line is determined for arbitrary 50 primary particles on the picture taken at a magnification of, for example, 10,000 to 100,000 times that allows for particle observation. The found data are averaged to give a mean value to be the primary particle size.

(4) Shape

The lithium titanium composite oxide particles may have conventional shapes, such as agglomerate, polyhedron, sphere, oval sphere, plate, needle, column, etc. Preferably, the primary particles aggregate and form secondary particles, and the secondary particles have spherical to oval-spherical shapes.

In an electrochemical element, the active material in the electrode generally undergoes expansion and contraction due to charge and discharge. The incurred stress often causes deterioration, such as destruction of the active material, disconnection in the conduction path, etc. It is therefore more preferable, in terms of relaxing the stress of expansion and contraction and preventing the deterioration, that the active material is of secondary particles formed by the aggregation of the primary particles, rather than simply being primary particles alone.

Further, spherical or oval-spherical particles are more preferable than particles of equiaxial orientation such as plate-shaped particles, because the former involves less orientation in electrode production, and less expansion and contraction of electrodes during charging and discharging. Spherical or oval-spherical particles are also preferable, because these can easily be mixed in a uniform fashion with a conductive material in electrode production.

(5) Tap Density

The tap density of the lithium titanium composite oxide is preferably 0.05 g·cm$^{-3}$ or more, more preferably 0.1 g·cm$^{-3}$ or more, even more preferably 0.2 g·cm$^{-3}$ or more, still more preferably 0.4 g·cm$^{-3}$ or more, and is preferably 2.8 g·cm$^{-3}$ or less, more preferably 2.4 g·cm$^{-3}$ or less, even more preferably 2 g·cm$^{-3}$ or less. When the tap density is lower than the above range, then the charge density could hardly increase in use as negative electrodes and contact area between the particles may decrease, and therefore the resistance between the particles may increase and the output resistance may also increase. When larger than the above range, then the space between the particles in the electrode may be too small so that the flow path of the nonaqueous electrolytic solution therethrough may decrease and the output resistance may therefore increase.

The tap density may be measure as follows: The sample to be analyzed is led to pass through a sieve having an opening of 300 μm, then dropwise put into a tapping cell of 20 cm$^3$ so that the cell is filled with the sample up to the top surface thereof. Thereafter using a powder density analyzer (for example, Seishin Enterprise's Tap Denser), the sample is tapped 1000 times at a stroke length of 10 mm, and the tap density is calculated from the volume and the sample mass. The tap density so calculated is defined as the tap density of the lithium titanium composite oxide in the present invention.

(6) Circularity

The circularity of the lithium titanium composite oxide as measured as the degree of sphericity thereof preferably falls within the range mentioned below. The circularity is defined as "circularity=(perimeter of equivalent circle having the same area as particle projection shape)/(actual perimeter of particle projection shape)", and the circularity of 1 provides a theoretically true sphere.

The circularity of the lithium titanium composite oxide is preferably nearer to 1 and is typically 0.10 or more, preferably 0.80 or more, more preferably 0.85 or more, even more preferably 0.90 or more. The high-current density charge/discharge characteristics improve as the circularity increases. Accordingly, when the circularity is lower than the above range, the chargeability of the negative electrode active material may lower and the resistance between the particles may increase, whereby the short-time high-current density charge/discharge characteristics may worsen.

The circularity may be measured using a flow-type particle image analyzer (Sysmex's FPIA). About 0.2 g of the sample to be analyzed is dispersed in an aqueous 0.2 mass % solution of a surfactant, polyoxymethylene (20) sorbitan monolaurate (about 50 mL), and irradiated with 28 kHz ultrasonic waves at an output of 60 W for 1 minute. With that, the detection range is designated to be from 0.6 to 400 μm, and the particles having a particle size of from 3 to 40 μm are analyzed. The circularity thus determined according to the above measurement is defined as the circularity of the lithium titanium composite oxide in the present invention.

(7) Aspect Ratio

The aspect ratio of the lithium titanium composite oxide is typically 1 or more, and is typically 5 or less, preferably 4 or less, more preferably 3 or less, even more preferably 2 or less. An aspect ratio falling outside the range would cause streaky unevenness in electrode plate formation and could not provide a uniform coating surface, whereby the short-time high-current density charge/discharge characteristics may worsen. The lower limit of the above range is the theoretical lower limit of the aspect ratio of the lithium titanium composite oxide.

The aspect ratio is determined through enlarged observation of the particles of the lithium titanium composite oxide with a scanning electronic microscope. Any 50 particles fixed to the end surface of a metal having a thickness of 50 μm or less are selected, and a stage to which the sample to be analyzed is fixed is rotated and tilted to measure each particle for the diameter A to be the largest diameter of the carbonaceous material particles and the diameter B to be the smallest diameter orthogonal to the diameter A, by three-dimensional observation. The mean value of A/B is then determined. The aspect ratio (A/B) so determined is defined as the aspect ratio of the lithium titanium composite oxide in the present invention (8) Production Method for Negative Electrode Active Material Not departing from the scope and the spirit of the present invention, the production method for the lithium titanium composite oxide is not specifically defined. Some methods are mentioned, and a general method for producing inorganic compounds is employable here.

For example, a titanium material such as titanium oxide or the like is uniformly mixed with an Li source such as LiOH, $Li_2CO_3$, $LiNO_3$ or the like optionally along with any other element material, and fired at a high temperature to give an active material.

In particular, for producing a spherical or oval-spherical active material, various methods could be employed. One case of the method comprises dissolving or powdery-dispersing a titanium material such as titanium oxide or the like optionally along with any other element material in a solvent such as water or the like, then controlling the pH of the system with stirring to give and collect a spherical precursor, optionally drying it, and adding thereto an Li source such as LiOH, $Li_2CO_3$, $LiNO_3$ or the like, and firing it to give the intended active material.

Another case of the method comprises dissolving or powdery-dispersing a titanium material such as titanium oxide or the like optionally along with any other element material in a solvent such as water or the like, then drying it with a spray drier or the like and shaping it into a spherical or oval-spherical precursor, and adding thereto an Li source such as LiOH, $Li_2CO_3$, $LiNO_3$ or the like, and firing it to give the intended active material.

Still another case of the method comprises dissolving or powdery-dispersing a titanium material such as titanium oxide or the like, an Li source such as LiOH, $Li_2CO_3$, $LiNO_3$ or the like and optionally any other element material in a solvent such as water or the like, then drying it with a spray drier or the like and shaping it into a spherical or oval-spherical precursor, and firing it to give the intended active material.

In the process, any other element than Ti, for example, Al, Mn, Ti, V, Cr, Mn, Fe, Co, Li, Ni, Cu, Zn, Mg, Ga, Zr, C, Si, Sn or Ag may be made to exist as kept in contact with the titanium-containing metal oxide structure and/or the titanium-containing oxide. Containing any of these elements makes it possible to control the driving voltage and the capacity of batteries.

(9) Electrode Production

For electrode production, any known method is employable here. For example, a binder, a solvent and optionally a thickener, a conductive material, a filler and others are added to a negative electrode active material to give a slurry, and this is applied onto a current current collector, then dried and pressed to give a negative electrode.

The thickness of the negative electrode active material layer on one side immediately before the battery nonaqueous electrolytic solution injection step is typically 15 µm or more, preferably 20 µm or more, more preferably 30 µm or more, and the upper limit thereof is typically 150 µm or less, preferably 120 µm or less, more preferably 100 µm or less.

When the thickness is more than the range, then the nonaqueous electrolytic solution could hardly penetrate into the area around the interface of the current current collector and therefore the high-current density charge/discharge characteristics may worsen. When less than the range, then the volume ratio of the negative electrode active material to the current collector may increase and the battery capacity may decrease. The negative electrode active material may be prepared as a sheet electrode by roll molding, or a pellet electrode by compression molding.

(10) Current Collector

As the current collector to hold the negative electrode active material may be any known one. As the current collector of the negative electrode, for example, there may be mentioned metal materials of copper, nickel, stainless steel, nickel-plated steel, etc. From the viewpoint of workability and cost, especially preferred is copper.

When made of a metallic material, the current collector may have a shape of, for example, metal foil, metal column, metal coil, metal plate, thin metal film, expanded metal, punched metal, metal foam or the like. Above all, preferred is a thin metal film containing at least one of copper (Cu) and aluminium (Al), more preferred is a copper foil, and even more preferred is a copper foil or an aluminium foil, and even more preferred is a rolled copper foil produced according to a rolling method or an electrolytic copper foil produced according to an electrolytic method. Any of these is usable here as the current collector.

In case where the thickness of the copper foil is smaller than 25 µm, a copper alloy (phosphor bronze, titanium copper, Corson alloy, Cu—Cr—Zr alloy, etc.) having a higher strength than pure copper may be used. As its specific gravity is small, an aluminium foil, when used as a current collector, can reduce the mass of batteries, and is preferred for use herein.

In the current collector formed of a copper foil produced according to a rolling method, the copper crystals are aligned in the rolling direction and therefore, even when the negative electrode formed of such a copper foil is densely rounded, or rounded at a sharp angle, it hardly cracks and can be favorably used in small-sized cylindrical batteries.

The electrolytic copper film may be produced, for example, by immersing a metallic drum in a nonaqueous electrolytic solution with copper ions dissolved therein, and an electric current is given thereto while rotating the solution to cause the copper to deposit on the drum surface. The metal can then be peeled to give the foil. Copper formed by electrolysis may be deposited on the surface of the rolled copper foil. One or both surfaces of the copper film may be subjected to roughening treatment or to any other surface treatment (for example, chromate treatment to a depth of from a few nm to 1 µm or so, undercoating treatment with Ti or the like).

Current collector substrates are further desired to have the following properties.

(10-2) Average Surface Roughness (Ra)

The average surface roughness (Ra) of the active material thin film-forming surface of the current collector substrate, as defined according to the method stated in JIS B0601-1994, is not specifically defined, but is typically 0.01 µm or more, preferably 0.03 µm or more, and is typically 1.5 µm or less, preferably 1.3 µm or less, more preferably 1.0 µm or less.

When the average surface roughness (Ra) of the current collector substrate falls within the above range, then good charge/discharge cycle characteristics can be expected. In addition, the area of the interface to the active material thin film is large and therefore the adhesiveness to the negative electrode active material thin film can improve. The upper limit of the average surface roughness (Ra) is not specifically defined. However, those having an average surface roughness (Ra) of more than 1.5 µm are hardly available as a foil having a practicable thickness for batteries, and therefore, the others not thicker than 1.5 µm are generally used.

(10-2) Tensile Strength

The tensile strength is a value to be calculated by dividing the maximum tensile force required to fracture a test piece by the cross-sectional area of the test piece. The tensile strength in the present invention is measured according to the same apparatus and the same method as those stated in JIS Z2241 (metallic material tensile testing method).

Not specifically defined, the tensile strength of the current collector substrate is typically 50 N·mm$^{-2}$ or more, preferably 100 N·mm$^{-2}$ or more, more preferably 150 N·mm$^{-2}$ or more. The tensile strength is preferably higher, but from the viewpoint of industrial availability, in general, those having a tensile strength of 1000 N·mm$^{-2}$ or less are preferred.

The current collector substrate having a high tensile strength can be prevented from being cracked by expansion/contraction of the active material thin film thereon during charging/discharging, and can secure good cycle characteristics.

(10-3) 0.2% Bearing Force

The 0.2% bearing force is a magnitude of the load required to cause 0.2% plastic (permanent) distortion, and it means that 0.2% deformation remains even after the removal of the applied load of this magnitude. The 0.2% bearing force is measured by using a device and a method similar to those used for the tensile strength measurement.

Not specifically defined, the 0.2% bearing force of the current collector substrate is typically 30 N·mm$^{-2}$ or more, preferably 100 N·mm$^{-2}$ or more, more preferably 150 N·mm$^{-2}$ or more. The 0.2% bearing force is preferably higher, but from the viewpoint of industrial availability, in general, those having a 2% bearing force of 900 N·mm$^{-2}$ or less are preferred here.

The current collector substrate having a high 0.2% bearing force can be protected from plastic deformation owing to expansion/contraction of the active material thin film thereon during charging/discharging, and can secure good cycle characteristics.

(10-4) Thickness of Current Collector

The thickness of the current collector may be any desired one, but is typically 1 jam or more, preferably 3 μm or more, more preferably 5 μm or more, and is typically 1 mm or less, preferably 100 μm or less, more preferably 50 μm or less.

When the thickness of the metal film is smaller than 1 μm, then the strength thereof may be low and coating would become difficult. A thickness more than 100 μm may cause deformation in the shape of battery such as rolling. The metal tin film may be meshed.

(11) Thickness Ratio of Current Collector to Active Material Layer

The ratio of the thickness of the current collector to that of the active material layer is not specifically defined. Preferably, the value of "(thickness of active material layer on one side just before nonaqueous electrolytic solution injection)/(thickness of current collector)" is 150 or less, more preferably 20 or less, even more preferably 10 or less, and is preferably 0.1 or more, more preferably 0.4 or more, even more preferably 1 or more.

When the ratio of the thickness of the negative electrode active material to that of the current collector is larger than the above range, then the current collector may generate heat though Joule heating during high-current density charging/discharging. On the other hand, when smaller than the range, the volume ratio of the negative electrode active material to the current collector may increase and the battery capacity may lower.

(12) Electrode Density

In electrode formation of the negative electrode active material, the electrode structure is not specifically defined. Preferably, the density of the active material existing on the current collector is 1 g·cm$^{-3}$ or more, more preferably 1.2 g·cm$^{-3}$ or more, even more preferably 1.3 g·cm$^{-3}$ or more, still more preferably 1.5 g·cm$^{-3}$ or more, and is preferably 3 g·cm$^{-3}$ or less, more preferably 2.5 g·cm$^{-3}$ or less, even more preferably 2.2 g·cm$^{-3}$ or less, still more preferably 2 g·cm$^{-3}$ or less.

When the density of the active material existing on the current collector is more than the above range, then the bonding between the current collector and the negative electrode active material may be weak and the active material may peel from the electrode. When less than the range, then the conductivity of the negative electrode active material may lower and the electric resistance may increase.

(13) Binder

Not specifically defined, the binder to bind the negative electrode active material may be any material that is stable against the solvent to be used in nonaqueous electrolytic solution and electrode production.

Specific examples include resin polymers such as polyethylene, polypropylene, polyethylene terephthalate, polymethyl methacrylate, polyimide, aromatic polyamide, cellulose, nitrocellulose, etc.; rubber polymers such as SBR (styrene/butadiene rubber), isoprene rubber, butadiene rubber, fluorine rubber, NBR (acrylonitrile/butadiene rubber), ethylene/propylene rubber, etc.; styrene/butadiene/styrene block copolymer or its hydrogenated product; thermoplastic elastomer polymers such as EDPM (ethylene/propylene/diene tercopolymer), styrene/ethylene/butadiene/styrene copolymer, styrene/isoprene/styrene block copolymer or their hydrogenated product, etc.; soft resin polymers such as syndiotactic 1,2-polybutadiene, polyvinyl acetate, ethylene/vinyl acetate copolymer, propylene/α-olefin copolymer, etc.; fluoropolymers such as polyvinylidene fluoride, polytetrafluoroethylene, polyfluorovinylidene fluoride, polytetrafluoroethylene/ethylene copolymer, etc.; polymer compositions having ionic conductivity of alkali metal ion (especially lithium ion), etc. One alone or two or more of these may be used here either singly or as combined in any desired manner and in any desired ratio.

The solvent for slurry formation may be any solvent capable of dissolving or dispersing a negative electrode active material, a binder as well as optional components of a thickener and a conductive material, and the type thereof is not specifically defined. Any of a water-based solvent or an organic solvent may be used here.

Examples of the water-based solvent include water, alcohol, etc.; and examples of the organic solvent include N-methylpyrrolidone (NMP), dimethylformamide, dimethylacetamide, methyl ethyl ketone, cyclohexane, methyl acetate, methyl acrylate, diethyltriamine, N,N-dimethylaminopropylamine, tetrahydrofuran (THF), toluene, acetone, dimethyl ether, dimethylacetamide, hexamethylphosphoramide, dimethyl sulfoxide, benzene, xylene, quinoline, pyridine, methylnaphthalene, hexane, etc. Especially when a water-based solvent is used, it is desirable that a dispersant or the like is additionally contained in the system along with the above-mentioned thickener therein and a latex such as SBR or the like is used for slurry formation. One alone or two or more of these solvents may be used here either singly or as combined in any desired manner and in any desired ratio.

The proportion of the binder to the negative electrode active material is preferably 0.1% by mass or more, more preferably 0.5% by mass or more, even more preferably 0.6% by mass or more, and is preferably 20% by mass or less, more preferably 15% by mass or less, even more preferably 10% by mass or less, still more preferably 8% by mass or less.

When the proportion of the binder to the negative electrode active material is more than the above range, then the binder amount not contributing toward the battery capacity may increase so that the battery capacity may thereby lower. On the other hand, when less than the above range, the strength of the negative electrode may lower, and may be often unfavorable for battery construction.

In particular, in case where a rubber polymer such as typically SBR is contained as the main ingredient, then the proportion of the binder to the active material is typically 0.1% by mass or more, preferably 0.5% by mass or more, more preferably 0.6% by mass or more, and is typically 5% by mass or less, preferably 3% by mass or less, more preferably 2% by mass or less.

On the other hand, in case where a fluoropolymer such as typically polyvinylidene fluoride is contained as the main ingredient, then the proportion thereof to the active material is typically 1% by mass or more, preferably 2% by mass or more, more preferably 3% by mass or more, and is typically 15% by mass or less, preferably 10% by mass or less, more preferably 8% by mass or less.

The thickener is generally used for controlling the slurry viscosity. The thickener is not specifically defined. Concretely, there are mentioned carboxymethyl cellulose, methyl cellulose, hydroxymethyl cellulose, ethyl cellulose, polyvinyl alcohol, oxidized starch, phosphorylated starch, casein and their salts, etc. One alone or two or more of these may be used here either singly or as combined in any desired manner and in any desired ratio.

When the thickener is further used, the proportion of the thickener to the negative electrode active material is typically 0.1% by mass or more, preferably 0.5% by mass or more, more preferably 0.6% by mass or more, and is typically 5% by mass or less, preferably 3% by mass or less, even more preferably 2% by mass or less. When the proportion of the thickener to the negative electrode active material is lower than the above range, then the coatability may greatly worsen. On the other hand, when larger than the range, then the proportion of the active material in the negative electrode active material layer lowers and therefore, the problem of battery capacity reduction and the interresistance of the negative electrode active material may increase.

<2-4 Positive Electrode>

The positive electrode has a positive electrode active material layer on a current collector, and the positive electrode active material is described below.

(2-4-1 Positive Electrode Active Material>

The positive electrode active material for use for the positive electrode is described below.

(1) Composition

Not specifically defined, the positive electrode active material may be any one capable of electrochemically occluding and releasing lithium ions. For example, preferred is a substance containing lithium and at least one transition metal. Specific examples include lithium transition metal composite oxides, and lithium-containing transition metal phosphoric acid compounds.

The transition metal in the lithium transition metal composite oxides is preferably V, Ti, Cr, Mn, Fe, Co, Ni, Cu, etc.; and specific examples include lithium cobalt composite oxides such as $LiCoO_2$, etc.; lithium manganese composite oxides such as $LiMnO_2$, $LiMn_2O_4$, $Li_2MnO_4$, etc.; lithium nickel composite oxides such as $LiNiO_2$, etc. A part of the transition metal atom that is the basis of the lithium transition metal composite oxides may be substituted with any other metal of Al, Ti, V, Cr, Mn, Fe, Co, Li, Ni, Cu, Zn, Mg, Ga, Zr, Si, etc. Specific examples include lithium cobalt nickel composite oxides, lithium cobalt manganese composite oxides, lithium nickel manganese composite oxides, lithium nickel cobalt manganese composite oxides, etc.

Specific examples of the substituted compounds include, for example, $Li_{1+a}Ni_{0.5}Mn_{0.5}O_2$, $Li_{1+a}Ni_{0.5}Co_{0.2}O_2$, $Li_{1+a}Ni_{0.05}Co_{0.10}Al_{0.05}O_2$, $Li_{1+a}Ni_{0.33}Co_{0.33}Mn_{0.33}O_2$, $Li_{1+a}Ni_{0.45}Co_{0.45}Mn_{0.1}O_2$, $Li_{1+a}Mn_{1.8}Al_{0.2}O_4$, $Li_{1+a}Mn_{1.5}Ni_{0.5}O_4$, $xLi_2MnO_3 \cdot (1-x)Li_{1+a}MO_2$ (M=transition metal) and others (a falls 0<a≤3.0).

The lithium-containing transition metal phosphoric acid compounds can be represented by $LixMPO_4$ (M=one element selected from a group consisting of transition metals of from Group 4 to Group 11 of the Periodic Table; x falls 0<x<1.2), in which the transition metal (M) is preferably at least one element selected from a group consisting of V, Ti, Cr, Mg, Zn, Ca, Cd, Sr, Ba, Co, Ni, Fe, Mn and Cu, more preferably at least one element selected from a group consisting of Co, Ni, Fe and Mn. For example, there are mentioned iron phosphates such as $LiFePO_4$, $Li_3Fe_2(PO_4)_3$, $LiFeP_2O_7$, etc.; cobalt phosphates such as $LiCoPO_4$, etc.; manganese phosphates such as $LiMnPO_4$, etc.; nickel phosphates such as $LiNiPO_4$, etc.; those produced by substituting a part of the transition metal atom that is the basis of the lithium transition metal phosphoric acid compounds with any other metal such as Al, Ti, V, Cr, Mn, Fe, Co, Li, Ni, Cu, Zn, Mg, Ga, Zr, Nb, Si or the like. Of those, preferred for use herein are lithium manganese composite oxides such as $LiMnO_2$, $LiMn_2O_4$, $Li_2MnO_4$, etc.; iron phosphates such as $LiFePO_4$, $Li_3Fe_2(PO_4)_3$, $LiFeP_2O_7$, etc.; as these hardly cause metal release in a high-temperature charged state and are inexpensive.

The above-mentioned "having a basic composition of $LixMPO_4$" is meant to include not only those having the composition represented by the formula but also others in which a part of the site of Fe or the like in the crystal structure is substituted with any other element. In addition, the wording is meant to include not only those having a stoichiometric composition but also those having a non-stoichiometric composition in which a part of the element is depleted, etc. The other element for substitution is preferably Al, Ti, V, Cr, Mn, Fe, Co, Li, Ni, Cu, Zn, Mg, Ga, Zr, Si, etc. For substitution with the other element, preferably the degree of substitution therewith is from 0.1 mol % to 5 mol %, more preferably from 0.2 mol % to 2.5 mol %.

One alone or two or more of the above-mentioned positive electrode active materials may be used here either singly or as combined.

(2) Surface Coating

Also usable here are those prepared by adhering any other substance having a composition differing from the that of the substance constituting the basis of the positive electrode active material to the surface of the above-mentioned positive electrode active material (hereinafter this may be suitably referred to as "surface-adhering substance). Examples of the surface-adhering substance include oxides such as aluminium oxide, silicon oxide, titanium oxide, zirconium oxide, magnesium oxide, calcium oxide, boron oxide, antimony oxide, bismuth oxide, etc.; sulfates such as lithium sulfate, sodium sulfate, potassium sulfate, magnesium sulfate, calcium sulfate, aluminium sulfate, etc.; carbonates such as lithium carbonate, calcium carbonate, magnesium carbonate, etc.

The surface-adhering substance may be adhered to the surface of the positive electrode active material according to a method of dissolving or suspending the substance in a solvent followed by infiltrating and adding it to a positive electrode active material, or a method of dissolving or suspending a precursor of the surface-adhering substance in a solvent, then infiltrating and adding it to a positive electrode active material and thereafter reacting them by heating, or a method of adding a precursor of the surface-adhering substance to the positive electrode active material followed by firing them simultaneously.

The mass of the surface-adhering substance that adheres to the surface of the positive electrode active material is typically 0.1 ppm or more relative to the mass of the positive electrode active material, preferably 1 ppm or more, more preferably 10 ppm or more, and is typically 20% or less, preferably 10% or less, more preferably 5% or less.

The surface-adhering substance can prevent the oxidation of nonaqueous electrolytic solution on the surface of the positive electrode active material to thereby prolong the battery life. However, when the adhering amount is lower than the above range, then the substance could not sufficiently exhibit the effect; but when more than the range, the substance may interfere with the movement of lithium ions whereby the resistance may increase. Accordingly, the above range is preferred.

(3) Shape

The positive electrode active material particles may have conventional shapes, such as agglomerate, polyhedron, sphere, oval sphere, plate, needle, column, etc. Preferably, the primary particles aggregate and form secondary particles, and the secondary particles have spherical to oval-spherical shapes.

In an electrochemical element, the active material in the electrode generally undergoes expansion and contraction due to charge and discharge. The incurred stress often causes deterioration, such as destruction of the active material, disconnection in the conduction path, etc. It is therefore more preferable, in terms of relaxing the stress of expansion and contraction and preventing the deterioration, that the active material is of secondary particles formed by the aggregation of the primary particles, rather than simply being primary particles alone.

Further, spherical or oval-spherical particles are more preferable than particles of equiaxial orientation such as plate-shaped particles, because the former involves less orientation in electrode production, and less expansion and contraction of electrodes during charging and discharging. Spherical or oval-spherical particles are also preferable, because these can easily be mixed in a uniform fashion with a conductive material in electrode production.

(4) Tap Density

The tap density of the positive electrode active material is preferably 0.4 g·cm$^{-3}$ or more, more preferably 0.6 g·cm$^{-3}$ or more, even more preferably 0.8 g·cm$^{-3}$ or more, still more preferably 1.0 g·cm$^{-3}$ or more, and is preferably 4.0 g·cm$^{-3}$ or less, more preferably 3.8 g·cm$^{-3}$ or less.

Using a metal composite oxide powder having a high tap density makes it possible to form a positive electrode active material layer having a high density. Consequently, when the tap density of the positive electrode active material is lower than the above range, then the amount of the dispersion medium necessary in positive electrode active material layer formation increases and the necessary amount of the conductive material and the binder also increases with the result that the filling rate of the positive electrode active material in the positive electrode active material layer would be restricted and the volume capacity would be thereby restricted. In general, the tap density is preferably larger and the upper limit thereof is not defined. However, when the tap density is lower than the above range, then the lithium ion diffusion in the nonaqueous electrolytic solution serving as a medium inside the positive electrode active material layer would be rate-limiting to often worsen load characteristics.

The tap density may be measure as follows: The sample to be analyzed is led to pass through a sieve having an opening of 300 μm, then dropwise put into a tapping cell of 20 cm$^3$ so that the cell is filled with the sample up to the top surface thereof. Thereafter using a powder density analyzer (for example, Seishin Enterprise's Tap Denser), the sample is tapped 1000 times at a stroke length of 10 mm, and the tap density is calculated from the volume and the sample mass. The tap density so calculated is defined as the tap density of the positive electrode active material in the present invention.

(5) Median Size d50

The median size d50 of the positive electrode active material particles (secondary particle size when the primary particles aggregate and form secondary particles) may also be measured by using a laser diffraction/scattering particle sizer.

The median size d50 is typically 0.1 μm or more, preferably 0.5 μm or more, more preferably 1 μm or more, even more preferably 3 μm or more, and is typically 20 or less, preferably 18 μm or less, more preferably 16 μm or less, even more preferably 15 μm or less. When the median size d50 is smaller than the above range, then high-bulk density products could not be obtained. When larger than the range, then a lot of time would be taken for lithium diffusion inside the particles so that the battery characteristics would worsen and there may occur other problems in that, in battery positive electrode formation, when the active material is formed into slurry along with a conductive material, a binder and others in a solvent and the resulting slurry is applied to form a thin film, then the film may have streaks and the like formed therein.

Two or more different types of positive electrode active materials each having a different median size d50 may be mixed in any desired ratio to thereby further improve the chargeability in positive electrode formation.

For measuring the median size d50, the sample to be analyzed is dispersed in an aqueous 0.1 mass % sodium hexametaphosphate solution serving as a dispersion medium, and using a particle sizer, Horiba Seisakusho's LA-920 with the measurement refractive index set at 1.24, the particle size of the sample is measured after ultrasonic dispersion thereof for 5 minutes.

(6) Average Primary Particle Size

When the primary particles aggregate and form secondary particles, the average primary particle size of the positive electrode active material is typically 0.03 μm or more, preferably 0.05 μm or more, more preferably 0.08 μm or more, even more preferably 0.1 μm or more, and is typically 5 μm or less, preferably 4 μm or less, more preferably 3 μm or less, even more preferably 2 μm or less. When the size is larger than the above range, then spherical secondary particles would be difficult to form so that the particles may have some negative influence on the powder chargeability and the specific surface area would be large, and therefore the possibility that the battery performance such as output characteristics and the like may worsen would increase. On the other hand, when the size is smaller than the range, then, in general, the crystals could grow insufficiently and therefore the performance of secondary batteries would worsen, for example, the charge/discharge reversibility thereof would worsen.

The average primary particle size is measured through scanning electron microscopy (SEM). Concretely, the value of the longest slice of the primary particles on the left and right of the boundary on a horizontal straight line is determined for arbitrary 50 primary particles on the picture taken at a magnification of 100,000 times. The found data are averaged to give a mean value to be the primary particle size.

(7) BET Specific Surface Area

The value of the BET specific surface area, as measured according to the BET method, of the positive electrode active material is typically 0.1 $m^2 \cdot g^{-1}$ or more, preferably 0.2 $m^2 \cdot g^1$ or more, more preferably 0.3 $m^2 \cdot g^1$ or more, and is typically 50 $m^2 \cdot g^{-1}$ or less, preferably 40 $m^2 \cdot g^{-1}$ or less, more preferably 30 $m^2 \cdot g^{-1}$ or less. When the BET specific surface area is less than the range, then the battery performance would worsen. On the other hand, when more than the range, then the tap density could hardly increase and the coatability in positive electrode active material layer formation would worsen.

The specific surface area may be measured according to the BET method, using a surface area meter (Okura Riken's full-automatic surface area measurement device) according to a single-point nitrogen adsorption BET method of a gas flow method, in which the sample to be analyzed is predried in nitrogen circulation at 150° C. for 30 minutes and then analyzed therein using a nitrogen/helium mixed gas as accurately controlled to have a relative pressure value of nitrogen to atmospheric pressure of 0.3. The specific surface area thus determined is defined as the BET specific surface area of the positive electrode active material in the present invention.

(8) Production Method for Positive Electrode Active Material

Not departing from the scope and the spirit of the present invention, the production method for the positive electrode active material is not specifically defined. Some methods are mentioned, and a general method for producing inorganic compounds is employable here.

In particular, various methods may be taken into consideration for producing spherical to oval-spherical active materials. For example, one case of the method comprises dissolving or powdery-dispersing a transition metal material such as a transition metal nitrate, sulfate or the like optionally along with any other element material in a solvent such as water or the like, then controlling the pH of the system with stirring to give and collect a spherical precursor, optionally drying it, and adding thereto an Li source such as LiOH, $Li_2CO_3$, $LiNO_3$ or the like, and firing it to give the intended active material.

Another case of the method comprises dissolving or powdery-dispersing a transition metal material such as a transition metal nitrate, sulfate, hydroxide, oxide or the like optionally along with any other element material in a solvent such as water or the like, then drying it with a spray drier or the like and shaping it into a spherical or oval-spherical precursor, and adding thereto an Li source such as LiOH, $Li_2CO_3$, $LiNO_3$ or the like, and firing it to give the intended active material.

Still another case of the method comprises dissolving or powdery-dispersing a transition metal material such as a transition metal nitrate, sulfate, hydroxide, oxide or the like, an Li source such as LiOH, $Li_2CO_3$, $LiNO_3$ or the like and optionally any other element material in a solvent such as water or the like, then drying it with a spray drier or the like and shaping it into a spherical or oval-spherical precursor, and firing it to give the intended active material.

<2-4-2 Electrode Structure and Electrode Production Method>

The configuration of the positive electrode for use in the present invention and the method of production thereof are described below.

(1) Positive Electrode Formation Method

The positive electrode is produced by forming a positive electrode active material particles- and binder-containing positive electrode active material layer on a current collector. Any known method can be used to produce the positive electrode that uses a positive electrode active material. Specifically, a positive electrode active material, a binder and optionally a conductive material, a thickener and others are dry mixed into a form of a sheet, and press-bonded to a positive electrode current collector; or a slurry prepared by dissolving or dispersing these materials in a liquid medium is applied to a positive electrode current collector and dried to form a positive electrode active material layer on the current collector, thereby providing the intended positive electrode.

The content of the positive electrode active material in the positive electrode active material layer is preferably 80% by mass or more, more preferably 82% by mass or more, even more preferably 84% by mass or more. The upper limit is preferably 99% by mass or less, more preferably 98% by mass or less. When the content of the positive electrode active material in the positive electrode active material layer is low, then the electric capacity would be insufficient. On the contrary, when the content is too high, the strength of the positive electrode would be insufficient. In the present invention, one alone or two or more of positive electrode active material powders each having a different composition or different powder properties may be used either alone or as combined in any desired manner and in any desired ratio.

(2) Conductive Material

Any known conductive material is usable here. Specific examples include metal materials of copper, nickel, etc.; and carbonaceous materials, for example, graphite such as natural graphite, artificial graphite, etc., carbon black such as acetylene black, etc., amorphous carbon such as needle coke, etc. One alone or two or more different types of those may be used here either singly or as combined in any desired manner and in any desired ratio.

The conductive material is used here in such a manner that the content thereof in the positive electrode active material layer could be typically 0.01% by mass or more, preferably 0.1% by mass or more, more preferably 1% by mass or more, and could be typically 50% by mass or less, preferably 30% by mass or less, more preferably 15% by mass or less. When the content is smaller than the above range, then the conductivity would be insufficient. On the other hand, when larger than the range, then battery capacity may lower.

(3) Binder

Not specifically defined, the binder for use for forming the positive electrode active material layer may be any material safe for the solvent to be used in nonaqueous electrolytic solution and in electrode production.

In a coating method, the binder may be a material capable of being dissolved or dispersed in a liquid medium for use in electrode production. Specific examples include resin polymers such as polyethylene, polypropylene, polyethylene terephthalate, polymethyl methacrylate, aromatic polyamide, cellulose, nitrocellulose, etc.; rubber polymers such as SBR (styrene/butadiene rubber), NBR (acrylonitrile/butadiene rubber), fluorine rubber, isoprene rubber, butadiene rubber, ethylene/propylene rubber, etc.; thermoplastic elastomer polymers such as styrene/butadiene/styrene block copolymer or its hydrogenated product, EDPM (ethylene/propylene/diene tercopolymer), styrene/ethylene/butadiene/ethylene copolymer, styrene/isoprene/styrene block copolymer or their hydrogenated product, etc.; soft resin polymers such as syndiotactic 1,2-polybutadiene, polyvinyl acetate, ethylene/vinyl acetate copolymer, propylene/α-olefin copolymer, etc.; fluoropolymers such as polyvinylidene fluoride (PVdF), polytetrafluoroethylene, polyfluorovinylidene fluoride, polytetrafluoroethylene/ethylene copolymer, etc.; polymer compositions having ionic conductivity of alkali metal ion (especially lithium ion), etc. One alone or two or more of these substances may be used here either singly or as combined in any desired manner and in any desired ratio.

The proportion of the binder in the positive electrode active material layer is typically 0.1% by mass or more, preferably 1% by mass or more, more preferably 3% by mass or more, and it typically 50% by mass or less, preferably 30% by mass or less, more preferably 10% by mass or less, even more preferably 8% by mass or less. When the proportion of the binder is lower than the above range, then the layer could not fully hold the positive electrode active material therein and the mechanical strength of the positive electrode would be insufficient so that the battery performance such as cycle characteristics and others would worsen. On the other hand, when more than the range, then the battery capacity and the conductivity may lower.

(4) Liquid Medium

The liquid medium for slurry formation may be any solvent capable of dissolving or dispersing a positive electrode active material, a conductive material, a binder as well as an optional component of a thickener, and the type thereof is not specifically defined. Any of a water-based solvent or an organic solvent may be used here.

Examples of the water-based solvent include water, a mixed solvent of alcohol and water, etc. Examples of the organic solvent include aliphatic hydrocarbons such as hexane, etc.; aromatic hydrocarbons such as benzene, toluene, xylene, methylnaphthalene, etc.; heterocyclic compounds such as quinoline, pyridine, etc.; ketones such as acetone, methyl ethyl ketone, cyclohexanone, etc.; esters such as methyl acetate, methyl acrylate, etc.; amines such as diethylenetriamine, N,N-dimethylaminopropylamine, etc.; ethers such as diethyl ether, tetrahydrofuran (THF), etc.; amides such as N-methylpyrrolidone (NMP), dimethylformamide, dimethylacetamide, etc.; aprotic polar solvents such as hexamethylphosphoramide, dimethyl sulfoxide, etc. One alone or two or more of these may be used here either singly or as combined in any desired manner and in any desired ratio.

(5) Thickener

When a water-based medium is used as the liquid medium for slurry formation, preferably, a thickener and a latex such as styrene-butadiene rubber (SBR) or the like are used for slurry formation. The thickener is used generally for controlling the viscosity of the slurry.

The thickener is not specifically defined so far as it does not markedly detract from the advantageous effects of the present invention. Concretely, there are mentioned carboxymethyl cellulose, methyl cellulose, hydroxymethyl cellulose, ethyl cellulose, polyvinyl alcohol, oxidized starch, phosphorylated starch, casein and their salts, etc. One alone or two or more of these may be used here either singly or as combined in any desired manner and in any desired ratio.

When the thickener is further used, the proportion of the thickener to the active material is typically 0.1% by mass or more, preferably 0.5% by mass or more, more preferably 0.6% by mass or more, and is typically 5% by mass or less, preferably 3% by mass or less, even more preferably 2% by mass or less. When the proportion is lower than the above range, then the coatability may greatly worsen. On the other hand, when larger than the range, then the proportion of the active material in the positive electrode active material layer lowers and therefore, the problem of battery capacity reduction and the interresistance of the positive electrode active material may increase.

(6) Compaction

Preferably, the positive electrode active material layer formed by coating and drying is compacted by a method of hand-pressing, roller-pressing or the like to thereby increase the packing density of the positive electrode active material. The density of the positive electrode active material layer is preferably 1 g·cm$^{-3}$ or more, more preferably 1.5 g·cm$^{-3}$ or more, even more preferably 2 g·cm$^{-3}$ or more, and is preferably 4 g·cm$^{-3}$ or less, more preferably 3.5 g·cm$^{-3}$ or less, even more preferably 3 g·cm$^{-3}$ or less.

When the density of the positive electrode active material layer is larger than the above range, then the penetrability of the nonaqueous electrolytic solution into the area around the current collector/active material interface may lower, whereby the high-current density charge/discharge characteristics may worsen. When smaller than the range, then the interconductivity of the active material may lower and the battery resistance may increase.

(7) Current Collector

The material of the positive electrode current collector is not specifically defined, for which any known one is employable. Specific examples include metallic materials such as aluminium, stainless steel, nickel plating, titanium, tantalum, etc.; carbonaceous materials such as carbon cloth, carbon paper, etc. Above all preferred are metallic materials; and especially preferred is aluminium.

When made of a metallic material, the current collector may have a shape of, for example, metal foil, metal column, metal coil, metal plate, thin metal film, expanded metal, punched metal, metal foam or the like. When made of a carbonaceous material, the current collector includes a carbon plate, a carbon thin film, a carbon column, etc. Of those, preferred is a metal thin film. The thin film may be meshed.

The thickness of the current collector may be any one, but is typically 1 μm or more, preferably 3 μm or more, more preferably 5 μm or more, and is typically 1 mm or less, preferably 100 μm or less, more preferably 50 μm or less. When the thin film is thinner than the above range, then the strength necessary for the current collector would be insufficient. When thicker than the range, then the handleability of the current collector would be poor.

The ratio of the thickness of the current collector to that of the positive electrode active material layer is not specifically defined. Preferably, the value of "(thickness of positive electrode active material layer on one side just before electrolytic solution injection)/(thickness of current collector)" is 20 or less, more preferably 15 or less, most preferably 10 or less. The lower limit is preferably 0.5 or more, more preferably 0.8 or more, most preferably 1 or more. When larger than the range, then the current collector may generate heat though Joule heating during high-current density charging/discharging. When smaller than the range, the volume ratio of the positive electrode active material to the current collector may increase and the battery capacity may lower.

<2-5. Separator>

In general, a separator is interposed between the positive electrode and the negative electrode to prevent shorting. In this case, in general, the separator is impregnated with the nonaqueous electrolytic solution of the present invention.

The material and the shape of the separator are not specifically defined, for which any known ones may be employed here not markedly detracting from the advantageous effects of the present invention. Above all, usable here are resins, glass fibers, inorganic substances and the like, formed of a material stable for the nonaqueous electrolytic solution of the present invention. Preferred are a porous sheet, a nonwoven fabric or the like excellent in liquid retentivity.

AS the material for the separator of resin or glass fibers, for example, usable are polyolefins such as polyethylene, polypropylene, etc.; as well as polytetrafluoroethylene, polyether sulfone, glass filter, etc. Above all, preferred are glass filter and polyolefin; and more preferred is polyolefin. One alone or two or more of these may be used here either singly or as combined in any desired manner and in any desired ratio.

The thickness of the separator may be any one, and is typically 1 μm or more, preferably 5 μm or more, more preferably 10 μm or more, and is typically 50 μm or less, preferably 40 μm or less, more preferably 30 μm or less. When the separator is thinner than the above range, then the insulation quality and the mechanical strength may lower. On the other hand, when thicker than the range, not only the battery performance such as rate characteristics and others may worsen but also the energy density as a whole of the nonaqueous electrolytic solution secondary battery may lower.

Further, in case where a porous substance such as a porous sheet, a nonwoven fabric or the like is used as the separator, the porosity of the separator may be any one, but is typically 20% or more, preferably 35% or more, more preferably 45% or more, and is typically 90% or less, preferably 85% or less, more preferably 75% or less. When the porosity is smaller than the above range, then the film resistance may increase and the rate characteristics may thereby worsen. On the other hand, when larger than the range, then the mechanical strength of the separator may lower and the insulating quality thereof may thereby lower.

The mean pore size of the separator may also be any one, but is typically 0.5 μm or less, preferably 0.2 μm or less, and is typically 0.05 μm or more. When the mean pore size is larger than the above range, then the battery may readily provide shorting. When smaller than the range, then the film resistance may increase and the rate characteristics may thereby worsen.

On the other hand, the inorganic material for use for the separator includes, for example, oxides such as alumina, silicon dioxide, etc.; nitrides such as aluminium nitride, silicon nitride, etc.; sulfates such as barium sulfate, calcium sulfate, etc.; and those materials that are granular or fibrous ones are usable here.

Regarding the shape thereof, the separator may be in a form of a thin film such as nonwoven fabric, woven fabric, microporous film, etc. Of the thin-film separator, preferably, the pore size is from 0.01 to 1 μm, and the thickness is from 5 to 50 μm. Apart from the above-mentioned independent thin film-like separator, a composite porous layer that contains particles of the above-mentioned inorganic material and functions as the separator may be formed on at least one surface layer of the positive electrode and the negative electrode, using a resinous binder. For example, a porous layer of alumina particles of which the 90% particle size is less than 1 μm may be formed on both surfaces of the positive electrode, using a fluororesin as a binder.

<2-6. Battery Design>
[Electrode Group]

The electrode group may be any of a laminate structure of the positive electrode plate and the negative electrode plate with the separator placed therebetween, or a wound structure of the positive electrode plate and the negative electrode plate with the separator placed therebetween. The volume proportion of the electrode group in the battery (hereinafter referred to as electrode group occupancy) is typically 40% or more, preferably 50% or more, and is typically 90% or less, preferably 80% or less. When the electrode group occupancy is smaller than the above range, then the battery capacity may be small. When larger than the range, then the void space would be small and the battery may be at high temperatures, therefore providing problems in that the constituent members may expand, the liquid component of the electrolyte may have an increased vapor pressure so that the internal pressure of battery may increase, whereby the properties such as the charge/discharge repeat performance, high-temperature storage stability and the like of battery may worsen and, further, the gas release valve to release the internal pressure outside may start to act.

[Current Collector Structure]

The current collector structure is not specifically defined. However, for more effectively realizing the improvement of the discharge characteristics by the nonaqueous electrolytic solution of the present invention, it is desirable that the current collector is so designed that the resistance in the wiring part and the bonding part could be reduced. When the internal resistance is reduced in that manner, the effect in using the nonaqueous electrolytic solution of the invention could be exhibited more favorably.

When the electrode group has a laminate structure such as above, the structure preferably involves welding of a bundle of the metal core portions of the electrode layers to the terminal. Because the internal resistance increases when the single electrode area has a large area, it is also preferable to reduce the resistance by providing multiple terminals in the electrode. When the electrode group has a wound structure such as above, multiple lead structures may be provided for each of the positive electrode and the negative electrode, and these structures may be bounded to the terminal to reduce the internal resistance.

[Outer Packaging Case]

The material of the outer packaging case is not specifically defined so far as it is a stable material for the non-aqueous electrolytic solution to be used. Specifically, examples of the material include metals such as nickel-plated steel plates, stainless steel, aluminium or aluminium alloys, magnesium alloys, etc.; and laminate films of resin and aluminium foul. Of these, in view of weight saving, a metal of aluminium or aluminium alloy, or a laminate film is preferred.

For the outer packing case using a metal such as above, there may be mentioned one forming an airtightly sealed structure by welding metals to each other by laser welding, resistance welding, or ultrasonic welding, or one forming a crimped structure through a resin-made gasket using the above metal. For the outer packaging case using a laminate film such as above, there may be mentioned one forming an airtightly sealed structure by heat-sealing resin layers with each other. For increasing the sealability, a resin different from the resin used in the laminate film may be arranged between the above resin layers. Particularly, in a case where the resin layers are heat-sealed via a current collector terminal to form a sealed structure, the jointing is between metal and resin, and therefore the interposing resin is preferably a resin having a polar group or a modified resin with a polar group introduced thereinto.

[Protection Device]

The protection device may be, for example, PTC (positive temperature coefficient) in which the resistance increases when an abnormal heat is generated or an over current flows, a thermal fuse, a thermistor, a valve (current breaker valve) that shuts off the current flowing in the circuit through sharp increase in the inner pressure or the inner temperature of the battery at the time of abnormal heat generation, or the like. As the above protection device, it is preferred to select one that does not act at usual use under high current. From the viewpoint of high output power, more preferred is a design which does not result in abnormal heat generation or thermal runaway even when the protection device is not present.

[Outer Package]

The nonaqueous electrolytic solution secondary battery of the present invention is usually composed by housing the above-mentioned nonaqueous electrolytic solution, negative electrode, positive electrode, separator and others in an outer package. The outer package is not specifically defined, and any known outer package may be used not markedly detracting from the advantageous effects of the present invention.

Concretely, the material of the outer package may be any one. In general, however, usable are nickel-plated iron, stainless steel, aluminium or its alloy, nickel, titanium, etc.

The outer package may have any shape, and may be, for example, cylindrical, rectangular, laminar, coin-shaped or large-sized.

EXAMPLES

The present invention is described concretely with reference to the following Examples and Comparative Examples; however, the present invention is not limited to these Examples. Not departing from the scope and the spirit thereof, the present invention can be modified and changed in any desired manner.

Examples 1-1 to 1-5, Comparative Example 1-1

For analysis, employed here were ion chromatography and nuclear magnetic resonance (NMR) spectrometry. In carboxylic acid removal, the amount of the carboxylic acid in the evaporating fraction was determined through gas chromatographic analysis.

The column in ion chromatography was Dionex's ICS-3000, and the process followed the conventional known analytical conditions for inorganic anions recommended by the manufacturer. Pure water was used as the diluting solvent for test samples.

In NMR, dimethyl sulfoxide-d6 was used as the measurement solvent, and benzotrifluoride was used as the internal standard. From the signals and the integrated values, the ratio of the fluorosulfonate ion fragment to the solvent was obtained.

In gas chromatography, Shimadzu's GC-17A with an FID detector was used, GL Science's TC-1 (diameter 0.53 μm, film thickness 0.2 μm, total length 50 m) was used as the column. The detected area ratio of the reagent of each component was compared with that of the reagent.

Example 1-1

<Reaction Step>

In a dry nitrogen current, 6.8 g (103.1 mmol) of lithium acetate was measured out in a 200-ml PFA-made four-neck flask, and 125 ml of dimethyl carbonate was added thereto. While the solution was stirred in an ice bath, 5 ml (8.6 g, 86.2 mmol) of fluorosulfonic acid was dropwise added thereto, taking about 10 minutes. Before the addition, the liquid temperature was 10° C., but owing to the addition of the acid to generate heat, the liquid temperature rose up to 20° C. However, immediately after the addition, the temperature was rapidly restored to the initial temperature. With the addition, lithium acetate hardly soluble in dimethyl carbonate came to be dissolved. While cooled in the ice water bath, this was stirred for 2 hours, and then the ice water bath was removed, and this was further stirred for 1 hour in the room temperature environment. Excessive lithium acetate was removed from the solution after the reaction, by filtration through a membrane filter (made of PTFE, having a nominal pore size of 0.5 μm).

<Step of Removing Nonaqueous Solvent Used in Reaction Step>

The reaction solution was distilled through evaporation under about 10 kPa and at 40° C. until dimethyl carbonate could be evaporated away, thereby giving a transparent viscous liquid.

The data of NMR analysis confirmed that the obtained powder was a mixture of lithium fluorosulfonate, acetic acid and dimethyl carbonate; and the data of ion chromatography of the mixture confirmed the sulfate ion content of 0.3 mol/kg.

<Step of Removing Carboxylic Acid>

150 ml of diethyl carbonate was added to the above viscous liquid, and using a rectifier filled with TO-TOKU Engineering's Helipack No. 1, this was distilled under reduced pressure. Briefly, the distillation was started at 60° C. and under 6.0 kPa, then the vacuum degree was gradually changed to 2.4 kPa. Until that, the outflow was 135 ml.

Using a rotary evaporator, the remaining diethyl carbonate was evaporated away, thereby giving a white solid. The data of ion chromatography analysis confirmed the acetate ion content of not more than 0.001 mol/kg.

Example 1-2

<Reaction Step>

In a dry nitrogen current, 7.9 g (120.1 mmol) of lithium acetate was measured out in a 500-ml PFA-made four-neck flask, and 250 ml of dimethyl carbonate was added thereto. While the solution was stirred in a water bath, 5.43 ml (10.0 g, 100 mmol) of fluorosulfonic acid was dropwise added thereto, taking about 10 minutes. Before the addition, the liquid temperature was 25° C., but owing to the addition of the acid to generate heat, the liquid temperature rose up to 30° C. However, immediately after the addition, the temperature was rapidly restored to the initial temperature. With the addition, lithium acetate hardly soluble in dimethyl carbonate came to be dissolved. This was stirred in a water bath for 1 hour.

<Step of Removing Nonaqueous Solvent Used in Reaction Step>

About 220 ml of dimethyl carbonate was evaporated away from the reaction solution at a bath temperature of 45° C. with controlling the degree of pressure reduction in the system, and the pressure was restored to atmospheric pressure with a dewatered inert gas introduced into the system, and thereafter 300 l of diethyl acetate was added thereto. Excessive lithium acetate was removed from the solution through filtration using a membrane filter (made of PTFE, having a nominal pore size of 0.5 μm).

<Step of Removing Carboxylic Acid>

Using 10 cm of a rectifier filled with TO-TOKU Engineering's Helipack No. 2, the above solution was distilled at a bath temperature of 45° C. with controlling the degree of pressure reduction to evaporate dimethyl carbonate and diethyl carbonate until the amount of the remaining diethyl carbonate could be about 10 ml.

<Purification Step>

The pressure was restored to atmospheric pressure with a dewatered inert gas introduced into the system, and 40 ml of dimethyl carbonate was added thereto while the bath temperature was kept 45° C. In the dewatered inert gas atmosphere, the resulting solution was filtered while hot through a membrane filter (made of PTFE, having a nominal pore size of 0.5 μm), and the solution was gradually cooled to 4° C. in the inert gas atmosphere to give a white crystal. The yield was 66%. The sulfate ion content was not more than 0.01 mol/kg. The acetate ion content was not more than 0.001 mol/kg. Further, the obtained solid was dissolved in 50 ml of DMC at 45° C. and processed according to the same step as above, thereby giving a white crystal at a recovery rate of 90%, in which the sulfate ion content and the acetate ion content were both not more than 0.001 moll/kg.

Example 1-3

<Reaction Step>

In a dry nitrogen current, 7.9 g (120.1 mmol) of lithium acetate was measured out in a 500-ml PFA-made four-neck flask, and 300 ml of dimethyl carbonate was added thereto. While the solution was stirred in a water bath, 5.43 ml (10.0 g, 100 mmol) of fluorosulfonic acid was dropwise added thereto, taking about 10 minutes. Before the addition, the liquid temperature was 25° C., but owing to the addition of the acid to generate heat, the liquid temperature rose up to 30° C. However, immediately after the addition, the temperature was rapidly restored to the initial temperature. With the addition, lithium acetate hardly soluble in dimethyl carbonate came to be dissolved. This was stirred in a water bath for 1 hour.

<Step of Removing Nonaqueous Solvent Used in Reaction Step, Combined with Removing Carboxylic Acid>

Using 10 cm of a rectifier filled with TO-TOKU Engineering's Helipack No. 2, 220 ml in total of diethyl carbonate was evaporated away at a bath temperature of 45° C. and at a controlled degree of pressure reduction. The system was restored to atmospheric pressure with a dewatered inert gas introduced thereinto, and then excessive lithium acetate was removed from the solution through filtration through a membrane filter (made of PTFE, having a nominal pore size of 0.5 μm).

Diethyl carbonate was further removed from the thus-filtered solution under the same condition as above until the remaining amount thereof could be about 10 ml.

<Purification Step>

In the same manner as in Example 1-2, a white crystal was obtained at a yield of 65%. The sulfate ion content was not more than 0.01 mol/kg, and the acetate ion content was not more than 0.001 mol/kg, and the two were the same as in Example 1-2. Further, the obtained solid was dissolved in 50 ml of DMC at 45° C., and processed in the same manner as above to give a white crystal in which the sulfate ion content and the acetate ion content were both not more than 0.001 mol/kg, at a recovery rate of 90%. This was also the same as in Example 1-2.

Comparative Example 1-1

Here the <reaction> operation was the same as in Example 1-1 except that water was used as the solvent herein.

The obtained concentrate was concentrated in the same manner as that for the <concentration> operation in Example 1-1, but a solid did not precipitate.

As a result of ion chromatography analysis, it was confirmed that the entire amount of fluorosulfonic acid had been hydrolyzed into sulfuric acid.

Example 1-4

Here the <reaction step> was the same as in Example 1-2, and the vaporization was stopped at the time when about 40 ml of dimethyl carbonate was evaporated away under the same condition as in the <step of removing nonaqueous solvent used in reaction step>, and thereafter the system was cooled in the same manner as in the <purification step>. Here, no crystal was formed.

However, when the pressure was reduced to about 0.2 kPa or less and the remaining dimethyl carbonate was evaporated away, whereby a white waxy solid was formed. The amount of the acetate ion relative to lithium fluorosulfonate in the solid was 0.063 mol/kg.

Example 1-5

Here the <reaction step> was the same as in Example 1-3, and after the step, 200 ml of diethyl carbonate was evaporated away all at a time under 5 Torr, using a rotary evaporator. Then, in the same manner as in Example 1-3, excessive lithium acetate was removed through filtration, and thereafter the system was concentrated down to about 10 ml at a time while kept under 5 Torr, using a rotary evaporator. This was purified in the same manner as in the "purification step" in Example 1-3, thereby giving a white powder at a yield of 50%. The acetate ion content was 0.11 mol/kg and was high, however, the sulfate ion content was reduced to be not more than 0.01 mol/kg. Further, the obtained solid was dissolved in 50 ml of DMC at 45° C., and processed in the same manner as above, thereby giving a white crystal at a recovery rate of 90%. The acetate ion content did not reduce so much, but the sulfate ion was further reduced to be not more than 0.001 mol/kg.

Examples 2-1 to 2-3, Comparative Examples 2-1 to 2-4

For analysis, employed here were ion chromatography and nuclear magnetic resonance (NMR) spectrometry.

The column in ion chromatography was Dionex's ICS-3000, and the process followed a known inorganic anion analysis method. Pure water was used as the diluting solvent for test samples.

In NMR, dimethyl sulfoxide-d6 was used as the measurement solvent, and benzotrifluoride was used as the internal standard. From the signals and the integrated values, the ratio of the fluorosulfonate ion fragment to the solvent was obtained.

Example 2-1

<Reaction>

In a dry nitrogen current, 4.4 g (103.5 mmol) of lithium chloride was measured out in a 200-ml PFA-made four-neck flask, and 125 ml of dimethyl carbonate was added thereto. While the solution was stirred in an ice bath, 5 ml (8.63 g, 86.24 mmol) of fluorosulfonic acid was dropwise added thereto, taking about 10 minutes. Before the addition, the liquid temperature was 10° C., but owing to the addition of the acid to generate heat, the liquid temperature rose up to 20° C. However, immediately after the addition, the temperature was rapidly restored to the initial temperature. With the addition, lithium chloride hardly soluble in dimethyl carbonate came to be dissolved. While cooled in the ice water bath, this was stirred for 2 hours, and then the ice water bath was removed, and this was further stirred for 1 hour in the room temperature environment. Excessive lithium chloride was removed from the solution after the reaction, by filtration through a membrane filter (made of PTFE, having a nominal pore size of 0.5 μm).

<Concentration>

The reaction solution was distilled under about 10 kPa and at 40° C. to evaporate away 100 ml of dimethyl carbonate, and the resulting solution was left as such to give a white powder.

The data of NMR analysis confirmed that the obtained powder was a 1/1 complex of lithium fluorosulfonate and dimethyl carbonate; and the data of ion chromatography of the complex confirmed the sulfate ion content of 0.30 mol/kg and a chloride ion content of 0.56 mol/kg.

<Recrystallization 1>

The obtained crude product was dispersed in 50 ml of dimethyl carbonate in a dry inert gas atmosphere, and dissolved therein by heating and stirring at 60° C. for 30 minute. A slight amount of the undissolved powder was separated through filtration through a membrane filter (made of PTFE, having a nominal pore size of 0.5 μm). The resulting filtrate was left cooled to room temperature, and then statically kept at 5° C. for 10 hours, thereby giving a colorless crystal.

The data of NMR analysis confirmed that the obtained powder was a complex of lithium fluorosulfonate and dimethyl carbonate in a molar ratio of 1/1; and the data of ion chromatography confirmed the sulfate ion content of 0.12 mol/kg and the chloride ion content of 0.11 mol/kg.

The yield of lithium fluorosulfonate was 4.9 g. The yield in recrystallization was 72%, and the overall yield through the operation was 54%.

<Recrystallization 2>

The above lithium fluorosulfonate was again recrystallized in the same manner as above, by which was obtained lithium fluorosulfonate having a sulfate ion content of 0.062 mol/kg and a chloride ion content of 0.056 mol/kg, at a yield of 3.5 g. The overall yield through the operation was 39%.

Example 2-2

Here the process up to the <concentration> step was the same as in Example 2-1.

<Recrystallization 1>

The obtained crude product was dispersed in 50 ml of dimethyl carbonate in a dry inert gas atmosphere, then 140 μL, (1.2 molar times the chloride ion amount) of pure water was added thereto, and this was dissolved therein by heating and stirring at 60° C. for 30 minute. A slight amount of the undissolved powder was separated through filtration through a membrane filter (made of PTFE, having a nominal pore size of 0.5 μm). The resulting filtrate was left cooled to room temperature, and then statically kept at 5° C. for 10 hours, thereby giving a colorless crystal.

The data of NMR analysis confirmed that the obtained powder was a complex of lithium fluorosulfonate and dimethyl carbonate in a molar ratio of 1/1 like in Example 2-1; and the data of ion chromatography confirmed the sulfate ion content of 0.083 mol/kg and the chloride ion content of 0.0011 mol/kg.

<Recrystallization 2>

The above lithium fluorosulfonate was again recrystallized in the same manner as in Example 2-1 except that pure water was not added thereto, by which was obtained lithium fluorosulfonate having a sulfate ion content of 0.062 mol/kg and a chloride ion content of 0.00056 mol/kg, at a yield of 2.58 g. The overall yield through the operation was 29.8%.

<Dimethyl Carbonate Removal>

The obtained lithium fluorosulfonate was put into a vacuum vessel, degassed down to 100 Pa, and the kept heated at 40° C. for 4 hours, whereupon the proportion of dimethyl carbonate therein was 1.3 mol %.

Example 2-3

Here the <reaction> process is the same as in Example 2-1 except that 50 ml of acetonitrile was used in place of 125 ml of dimethyl carbonate as the solvent for the <reaction>, and it was confirmed that the reaction here went on at the same yield. Thereafter the same operation as in Example 2-1 was carried out except that the entire amount of the solvent was evaporated away during the <concentration>.

After recrystallization, 1.52 g of lithium fluorosulfonate having a sulfate ion content of 0.62 mol/kg and a chloride ion content of 0.056 mol/kg was obtained as a solid.

Comparative Example 2-1

Here the <reaction> operation was the same as in Example 2-1 except that water was used as the solvent.

The obtained concentrate was concentrated in the same manner as that for <concentration> operation in Example 2-1, but a solid did not precipitate.

As a result of ion chromatography analysis, it was confirmed that the entire amount of fluorosulfonic acid had been hydrolyzed into sulfuric acid.

Comparative Example 2-2

Here the <reaction> operation was the same as in Example 2-1 except that water was used as the solvent and that, in place of lithium chloride, lithium hydroxide, 4.4 g (104.8 mmol) of lithium chloride monohydrate was used for acid-base neutralization.

The obtained concentrate was concentrated in the same manner as that for the <concentration> operation in Example 2-1, but a solid did not precipitate. As a result of ion chromatography analysis, it was confirmed that the entire amount of fluorosulfonic acid had been hydrolyzed into sulfuric acid.

Comparative Example 2-3

Here the <reaction> operation was the same as in Example 2-1 except that 3.3 g (51.4 mmol, 102.8 mmol as the lithium amount) of lithium carbonate was used in place of lithium chloride.

As a result of ion chromatography analysis, it was confirmed that the entire amount of fluorosulfonic acid had been hydrolyzed into sulfuric acid. It is presumed that the hydrolysis would be caused by water that had formed as a by-product in neutralization of lithium carbonate.

Comparative Example 2-4

Here the <reaction> operation was the same as in Comparative Example 2-3 except that a sufficient amount of magnesium sulfate was suspended in the system for removing water that had formed as a by-product through the reaction.

As a result of ion chromatography analysis, it was confirmed that the entire amount of fluorosulfonic acid had been hydrolyzed into sulfuric acid. Use of the dewatering agent could not prevent the hydrolysis.

Examples 3-1 to 3-15, Comparative Examples 3-1 to 3-9

Test Example A

[Measurement of Sulfate Ion Fraction]

The sulfate ion content in lithium fluorosulfonate was measured through ion chromatography. The measurement results are shown in Table 1.

[Production of Battery]
[Formation of Negative Electrode]

100 parts by mass of an aqueous dispersion of sodium carboxymethyl cellulose (having a concentration of sodium carboxymethyl cellulose, 1% by mass) as a thickener, and 1 part by mass of an aqueous dispersion of styrene-butadiene rubber (having a concentration of styrene-butadiene rubber, 50% by mass) as a binder were added to 98 parts by mass of a carbonaceous material, and mixed with a disperser to form a slurry. The obtained slurry was applied onto a copper foil having a thickness of 10 μm, dried, and rolled with a pressing machine. This was cut into a piece having an active material layer size of 30 mm in width and 40 mm in length and having a non-coated part of 5 mm in width and 9 mm in length. This was used as the negative electrode in Examples and Comparative Examples.

[Formation of Positive Electrode]

90% by mass of lithium cobaltate as a positive electrode active material, 5% by mass of acetylene black as a conductive material and 5% by mass of polyvinylidene fluoride (PVdF) as a binder were mixed in a solvent N-methylpyrrolidone to form a slurry. The obtained slurry was applied onto an aluminium foil having a thickness of 15 μm, dried, and rolled with a pressing machine. This was cut into a piece having an active material layer size of 30 mm in width and 40 mm in length and having a non-coated part of 5 mm in width and 9 mm in length. This was used as the positive electrode in Examples and Comparative Examples.

[Production of Electrolytic Solution]

In a dry argon atmosphere, dried $LiPF_6$ was dissolved in a mixture of ethylene carbonate (EC) and ethylmethyl carbonate (EMC) (ratio by volume 30/70) to have a proportion of 1 mol/L therein, thereby preparing a basic electrolytic solution. Lithium fluorosulfonate produced according to the above-mentioned method was added to the basic electrolytic solution so that the content thereof could be 5% by mass.

[Production of Lithium Secondary Battery]

The above-mentioned positive electrode and negative electrode, and a polyethylene-made separator were laminated in an order of negative electrode, separator and positive electrode to construct a battery element. The battery element was inserted into a laminate film bag of which both surfaces of aluminium (thickness 40 μm) were coated with a resin layer, with the terminals of the positive electrode and the negative electrode kept protruded therein, and then the electrolytic solution mixed with the compound shown in the Table was injected into the bag and sealed up in vacuum to produce a sheet-like battery of Example 3-1 and Comparative Example 3-1.

[Initial Capacity Evaluation]

Kept sandwiched between glass plates so as to increase the adhesiveness between the electrodes therein, the lithium secondary battery was charged up to 4.1 V with a constant current corresponding to 0.2 C at 25° C., and then discharged down to 3.0 V at a constant current of 0.2 C. This cycle was repeated twice for two cycles to stabilize the battery, and in the third cycle, the battery was charged up to 4.2 V at a constant current of 0.2 C and then discharged at a constant voltage of 4.2 V so that the current value could reach 0.05 C, and further discharged down to 3.0 V at a constant current of 0.2 C. Afterwards, in the fourth cycle, the battery was charged up to 4.2 V at a constant current of 0.2 C and then discharged at a constant voltage of 4.2 V so that the current value could reach 0.05 C, and further discharged down to 3.0 V at a constant current of 0.2 C, and the initial discharge capacity of the battery was obtained. The evaluation results are shown in Table 1. 1 C means the current value for discharging the reference capacity of a battery for 1 hour; and 2 C is the current value of two times 1 C, and 0.2 C is the current value of ⅕ times 1 C.

[High-Temperature Storage Swelling Evaluation]

The battery after the initial discharge capacity evaluation test was charged up to 4.2 V at a constant current of 0.2 C, and then further charged at a constant voltage of 4.2 V until the current value thereof could reach 0.05 C. This was stored at 85° C. for 24 hours, then the battery was cooled and immersed in an ethanol bath, and its volume was measured. From the volume change before and after high-temperature storage, the generated gas amount was obtained. The evaluation results are shown in Table 1.

TABLE 1

| | Sulfate Ion Amount in $FSO_3Li$ (mol/kg) | Initial Discharge Capacity (mAh/g) | Gas Generation Amount (%) |
|---|---|---|---|
| Example 3-1 | 0.115 | 146.5 | 85 |
| Comparative Example 3-1 | 0.263 | 143.4 | 100 |

\* The gas generation amount is a relative value to the amount in Comparative Example 3-1, 100%.

From Table 1, it is known that, of the batteries using an electrolytic solution containing the same amount of lithium fluorosulfonate, one in which the sulfate ion amount in lithium fluorosulfonate is smaller has a higher initial discharge capacity and the gas generation amount from the battery in high-temperature storage is lower, or that is, the battery has excellent battery characteristics.

Test Example B

[Production of Electrolytic Solution]

In a dry argon atmosphere, dried $LiPF_6$ was dissolved in a mixture of ethylene carbonate (EC) and ethylmethyl carbonate (EMC) (ratio by volume 30/70) to have a proportion of 1 mol/L therein, thereby preparing a basic electrolytic solution. Lithium fluorosulfonate containing sulfate ions was added to the basic electrolytic solution in the ratio shown in Table 2.

[Production of Lithium Secondary Battery]

According to the same method as in Example 3-1 and Comparative Example 3-1, a sheet-like battery was produced and tested for the initial capacity evaluation and the high-temperature storage swelling evaluation. The evaluation results are shown in Table 2.

TABLE 2

| | Content in Electrolytic Solution | | Battery Characteristics | |
|---|---|---|---|---|
| | $FSO_3Li$ (mass %) | Sulfate Ion (mol/L) | Initial Discharge Capacity (mAh/g) | Gas Generation Amount (%) |
| Example 3-1 | 5 | $7.27 \times 10^{-3}$ | 146.5 | 85 |
| Example 3-2 | 2.5 | $8.23 \times 10^{-3}$ | 147.4 | 82 |
| Example 3-3 | 1 | $1.38 \times 10^{-3}$ | 147.7 | 66 |
| Example 3-4 | 1 | $8.19 \times 10^{-4}$ | 148.7 | 70 |
| Example 3-5 | 1 | $3.71 \times 10^{-5}$ | 148.8 | 57 |
| Example 3-6 | 0.2 | $7.55 \times 10^{-6}$ | 148.5 | 53 |
| Example 3-7 | 0.025 | $9.21 \times 10^{-7}$ | 148.7 | 49 |
| Comparative Example 3-2 | 0 | 0 | 145.8 | not measured |
| Comparative Example 3-3 | 5 | $1.67 \times 10^{-2}$ | 143.4 | 100 |

\* The gas generation amount is a relative value to the amount in Comparative Example 3-3, 100%.

From Table 2, it is known that, when the sulfate ion content in the produced electrolytic solution falls within a range of from $1.00 \times 10^{-7}$ mol/L to $1.00 \times 10^{-2}$ mol/L, then the initial discharge capacity is improved and the gas generation amount in high-temperature storage is lowered, and therefore the battery characteristics are improved.

Test Example C

[Measurement of Carboxylate Ion Fraction]

The acetate ion content in lithium fluorosulfonate was measured through ion chromatography. The measurement results are shown in Table 3.

[Production of Electrolytic Solution]

In a dry argon atmosphere, dried $LiPF_6$ was dissolved in a mixture of ethylene carbonate (EC) and ethylmethyl carbonate (EMC) (ratio by volume 30/70) to have a proportion of 1 mol/L therein, thereby preparing a basic electrolytic solution. Lithium fluorosulfonate produced according to the above-mentioned method was added to the basic electrolytic solution to be 1% by mass therein.

[Production of Lithium Secondary Battery]

According to the same method as in Examples 3-1 to 3-7 and Comparative Examples 3-1 to 3-3, a sheet-like battery was produced and tested for the initial capacity evaluation and the high-temperature storage swelling evaluation. The evaluation results are shown in Table 3.

TABLE 3

| | | Battery Characteristics | | |
|---|---|---|---|---|
| | Sulfate Ion Content in $FSO_3Li$ (mol/kg) | Initial Discharge Capacity (mAh/g) | Capacity Retention Ratio (%) | Gas Generation Amount (%) |
| Example 3-8 | 0.0135 | 148.8 | 91.5 | 82 |
| Comparative Example 3-4 | 0.0288 | 148.7 | 91.4 | 100 |

\* The gas generation amount is a relative value to the amount in Comparative Example 3-4, 100%.

From Table 3, it is known that, of the batteries using an electrolytic solution containing the same amount of lithium fluorosulfonate, one in which the acetate ion amount in lithium fluorosulfonate generates a smaller amount of gas in high-temperature storage and therefore has excellent battery characteristics.

Test Example D

[Production of Electrolytic Solution]

In a dry argon atmosphere, dried $LiPF_6$ was dissolved in a mixture of ethylene carbonate (EC) and ethylmethyl carbonate (EMC) (ratio by volume 30/70) to have a proportion of 1 mol/L therein, thereby preparing a basic electrolytic solution. Lithium fluorosulfonate containing acetate ions was added to the basic electrolytic solution in the ratio shown in the following Table.

[Production of Lithium Secondary Battery]

According to the same method as in Examples 3-1 to 3-8 and Comparative Examples 3-1 to 3-4 except that the above-mentioned negative electrode and positive electrode and the above-mentioned electrolytic solution were used here, a sheet-like battery was produced and tested for the initial capacity evaluation and the high-temperature storage swelling evaluation. The evaluation results are shown in Table 4.

TABLE 4

| | Content in Electrolytic Solution | | Battery Characteristics | | |
|---|---|---|---|---|---|
| | $FSO_3Li$ (mass %) | Acetate Ion (mol/L) | Initial Discharge Capacity (mAh/g) | Capacity Retention Rate (%) | Gas Generation Amount (%) |
| Example 3-9 | 2 | $1.26 \times 10^{-3}$ | 148.5 | 91.0 | 88 |
| Example 3-10 | 0.2 | $3.52 \times 10^{-4}$ | 148.2 | 91.3 | 68 |
| Example 3-11 | 0.2 | $7.62 \times 10^{-6}$ | 148.5 | 91.7 | 63 |
| Example 3-12 | 0.25 | $4.13 \times 10^{-6}$ | 148.7 | 91.9 | 58 |
| Comparative Example 3-5 | 0 | 0 | 145.8 | not measured | not measured |
| Comparative Example 3-6 | 5 | $5.27 \times 10^{-3}$ | 146.5 | 84.9 | 100 |

\* The gas generation amount is a relative value to the amount in Comparative Example 3-6, 100%.

From Table 4, it is known that, when the acetate ion content in the produced electrolytic solution falls within a range of from $1.00 \times 10^{-6}$ mol/L to $4.00 \times 10^{-3}$ mol/L, then the initial discharge capacity is high and the gas generation amount in high-temperature storage is small, and therefore the battery characteristics are improved.

Test Example E

[Measurement of Halogen Fraction]

The halide ion content in lithium fluorosulfonate was measured through ion chromatography. The measurement results are shown in Table 5. Any other halide ion than fluoride ion and chloride ion were not detected.

[Production of Electrolytic Solution]

In a dry argon atmosphere, dried $LiPF_6$ was dissolved in a mixture of ethylene carbonate (EC) and ethylmethyl carbonate (EMC) (ratio by volume 30/70) to have a proportion of 1 mol/L therein, thereby preparing a basic electrolytic solution. Lithium fluorosulfonate produced according to the above-mentioned method was added to the basic electrolytic solution to be 2.5% by mass therein.

[Production of Lithium Secondary Battery]

According to the same method as in Examples 3-1 to 3-12 and Comparative Examples 3-1 to 3-6, a sheet-like battery was produced and tested for the initial capacity evaluation. The evaluation results are shown in Table 5.

[Evaluation of High-Temperature Storage Characteristics]

The battery after the initial discharge capacity evaluation test was charged up to 4.2 V at a constant current of 0.2 C, and then further charged at a constant voltage of 4.2 V until the current value thereof could reach 0.05 C. This was stored at 85° C. for 24 hours, then the battery was cooled and discharged down to 3 V at a constant current of 0.2 C at 25° C. to measure the residual capacity. The capacity retention rate was calculated as (residual capacity/charged capacity)×100. The evaluation results are shown in Table 5.

TABLE 5

|  | Chloride Ion Amount in $FSO_3Li$ (mol/kg) | Initial Discharge Capacity (mAh/g) | Capacity Retention Rate (%) |
|---|---|---|---|
| Example 3-13 | $1.97 \times 10^{-4}$ | 147.4 | 90.7 |
| Comparative Example 3-7 | $1.55 \times 10^{-3}$ | 146.8 | 90.2 |

From Table 5, it is known that, of the batteries using an electrolytic solution containing the same amount of lithium fluorosulfonate, one in which the chloride ion amount in lithium fluorosulfonate is smaller obviously has a higher initial discharge capacity and a higher capacity retention rate, and has excellent battery characteristics.

Test Example F

[Production of Electrolytic Solution]

In a dry argon atmosphere, dried $LiPF_6$ was dissolved in a mixture of ethylene carbonate (EC) and ethylmethyl carbonate (EMC) (ratio by volume 30/70) to have a proportion of 1 mol/L therein, thereby preparing a basic electrolytic solution. Lithium fluorosulfonate containing chloride ions was added to the basic electrolytic solution in the ratio shown in the Table 6.

[Production of Lithium Secondary Battery]

According to the same method as in Examples 3-1 to 3-13 and Comparative Examples 3-1 to 3-7 except that the above-mentioned negative electrode and positive electrode and the above-mentioned electrolytic solution were used here, a sheet-like battery was produced and tested for the initial capacity evaluation and the high-temperature storage characteristics evaluation. The evaluation results are shown in Table 6.

TABLE 6

|  | Content in Electrolytic Solution | | Battery Characteristics | |
|---|---|---|---|---|
|  | $FSO_3Li$ (mass %) | Chloride Ion (mol/L) | Initial Discharge Capacity (mAh/g) | Capacity Retention Rate (%) |
| Example 3-14 | 1 | $1.91 \times 10^{-3}$ | 147.7 | 91.0 |
| Example 3-15 | 1 | $4.77 \times 10^{-6}$ | 148.4 | 91.5 |
| Comparative Example 3-8 | 0 | 0 | 145.8 | not measured |
| Comparative Example 3-9 | 5 | $3.03 \times 10^{-3}$ | 146.4 | 90.4 |

From Table 6, it is known that, when the chloride ion content in the produced electrolytic solution falls within a range of from $1.00 \times 10^{-6}$ mol/L to $1.00 \times 10^{-3}$ mol/L, then the battery characteristics such as the initial discharge capacity and the high-temperature storage characteristics are improved.

While the invention has been described in detail with reference to specific examples thereof, it will be apparent to one skilled in the art that various changes and modifications can be made therein without departing from the spirit and scope thereof.

The present application is based on a Japanese patent application filed on Apr. 11, 2011 (Application No. 2011-087281), a Japanese patent application filed on Apr. 13, 2011 (Application No. 2011-089341) and a Japanese patent application filed on Apr. 19, 2011 (Application No. 2011-093001), the contents of which are incorporated herein by reference.

INDUSTRIAL APPLICABILITY

According to the present invention, there can be produced lithium fluorosulfonate at high yield under a mild condition. In addition, lithium fluorosulfonate of the present invention, thus produced, has a high purity and is especially useful for nonaqueous electrolytic solutions of secondary batteries, etc.

Further, the nonaqueous electrolytic solution and the nonaqueous electrolytic solution secondary battery using it of the present invention are useful in various known applications. Specific examples include, for example, notebook-size personal computers, stylus-operated personal computers, mobile personal computers, electronic book players, portable telephones, portable facsimiles, portable copying machines, portable printers, headphone stereos, video movies, liquid-crystal televisions, handy cleaners, portable CDs, minidiscs, transceivers, electronic organizers, calculators, memory cards, portable tape recorders, radios, back-up power supplies, motors, automobiles, bikes, small motor vehicles, bicycles, illuminations, toys, gaming machines, watches, electric power tools, strobe lights, cameras, power sources for load leveling systems, natural energy storage power sources, etc.

The invention claimed is:
1. A nonaqueous electrolytic solution, comprising:
lithium fluorosulfonate,
wherein the nonaqueous electrolytic solution contains a sulfate ion in an amount of from $1.0 \times 10^{-7}$ mol/L to $1.0 \times 10^{-2}$ mol/L.

2. The nonaqueous electrolytic solution of claim 1, further comprising:
    a lithium salt other than the lithium fluorosulfonate; and
    a nonaqueous solvent,
    wherein the nonaqueous electrolytic solution contains the lithium fluorosulfonate in an amount of from 0.0005 mol/L to 0.5 mol/L.

3. The nonaqueous electrolytic solution according to claim 2, wherein the lithium salt other than the lithium fluorosulfonate is at least one of $LiPF_6$ and $LiBF_4$.

4. The nonaqueous electrolytic solution according to any one of claims 1, 2, and 3, further comprising:
    a cyclic carbonate having a fluorine atom.

5. The nonaqueous electrolytic solution according to claim 4, wherein the cyclic carbonate having a fluorine atom is contained in the nonaqueous electrolytic solution in an amount of from 0.001% by mass to 85% by mass.

6. The nonaqueous electrolytic solution according to any one of claims 1, 2, and 3, further comprising:
    a cyclic carbonate having a carbon-carbon unsaturated bond.

7. The nonaqueous electrolytic solution according to claim 6, wherein the cyclic carbonate having a carbon-carbon unsaturated bond is contained in the nonaqueous electrolytic solution in an amount of from 0.001% by mass to 10% by mass.

8. The nonaqueous electrolytic solution according to any one of claims 1, 2, and 3, further comprising:
    a cyclic sulfonate ester.

9. The nonaqueous electrolytic solution according to claim 8, wherein the cyclic sulfonate ester is included in the nonaqueous electrolytic solution in an amount of from 0.001% by mass to 10% by mass.

10. The nonaqueous electrolytic solution according to any one of claims 1, 2, and 3, further comprising:
    a compound having a cyano group.

11. The nonaqueous electrolytic solution according to claim 10, wherein the compound having the cyano group is included in the nonaqueous electrolytic solution in an amount of from 0.001% by mass to 10% by mass.

12. The nonaqueous electrolytic solution according to any one of claims 1, 2, and 3, further comprising:
    a diisocyanate compound.

13. The nonaqueous electrolytic solution according to claim 12, wherein the diisocyanate compound is included in the nonaqueous electrolytic solution in an amount of from 0.001% by mass to 5% by mass.

14. The nonaqueous electrolytic solution according to any one of claims 1, 2, and 3, further comprising:
    a lithium oxalate salt.

15. A nonaqueous electrolytic solution secondary battery, comprising:
    a negative electrode and a positive electrode capable of occluding and releasing lithium ions; and
    the nonaqueous electrolytic solution according to any one of claims 1, 2, and 3.

16. The nonaqueous electrolytic solution secondary battery according to claim 15,
    wherein the negative electrode has a negative electrode active material layer on a current collector, and
    the negative electrode active material layer contains a negative electrode active material that contains at least one of an elementary metal of silicon, an alloy of silicon, a compound of silicon, an elementary metal of tin, an alloy of tin, and a compound of tin.

17. The nonaqueous electrolytic solution secondary battery according to claim 15,
    wherein the negative electrode has a negative electrode active material layer on a current collector, and
    the negative electrode active material layer contains a negative electrode active material that contains a carbonaceous material.

18. The nonaqueous electrolytic solution secondary battery according to claim 15,
    wherein the negative electrode has a negative electrode active material layer on a current collector, and
    the negative electrode active material layer contains a negative electrode active material that contains a lithium titanium composite oxide.

19. The nonaqueous electrolytic solution secondary battery according to claim 15,
    wherein the positive electrode has a positive electrode active material layer on a current collector, and
    the positive electrode active material layer contains at least one selected from the group consisting of lithium/cobalt composite oxides, lithium/cobalt/nickel composite oxides, lithium/manganese composite oxides, lithium/cobalt/manganese composite oxides, lithium/nickel composite oxides, lithium/nickel/manganese composite oxides and lithium/nickel/cobalt/manganese composite oxides.

20. The nonaqueous electrolytic solution secondary battery according to claim 15,
    wherein the positive electrode has a positive electrode active material layer on a current collector, and
    the positive electrode active material layer contains $Li_xMPO_4$ where M represents at least one element selected from the group consisting of transition metals of Group 4 to Group 11 of the 4th Period of the Periodic Table, and $0<x<1.2$.

* * * * *